US00RE50444E

(19) United States
(12) Reissued Patent
Williams et al.

(10) Patent Number: US RE50,444 E
(45) Date of Reissued Patent: May 27, 2025

(54) FITTING ASSEMBLY EVALUATING APPARATUS AND METHODS

(71) Applicant: Swagelok Company, Solon, OH (US)

(72) Inventors: Peter C. Williams, Cleveland Heights, OH (US); Kennan J. Malec, Gates Mills, OH (US); William J. Menz, Akron, OH (US); Cal R. Brown, Lyndhurst, OH (US); Mark A. Clason, Orwell, OH (US); Jeffrey M. Rubinski, Novelty, OH (US); Raymond Scott Milhoan, Akron, OH (US); Michael Mussig, Painesville, OH (US); Jeffrey S. Rayle, Rocky River, OH (US)

(73) Assignee: Swagelok Company, Solon, OH (US)

(21) Appl. No.: 17/342,689

(22) Filed: Jun. 9, 2021

Related U.S. Patent Documents

Reissue of:
(64) Patent No.: 10,316,997
Issued: Jun. 11, 2019
Appl. No.: 15/408,477
Filed: Jan. 18, 2017

U.S. Applications:
(63) Continuation of application No. 14/645,517, filed on Mar. 12, 2015, now Pat. No. 9,556,979, which is a
(Continued)

(51) Int. Cl.
*F16L 19/02* (2006.01)
*B21D 39/04* (2006.01)
(Continued)

(52) U.S. Cl.
CPC ..... *F16L 19/0218* (2013.01); *B21D 39/048* (2013.01); *B23P 19/10* (2013.01);
(Continued)

(58) Field of Classification Search
CPC ..... F16L 19/0218; F16L 17/02; F16L 19/045; F16L 19/061; F16L 19/065; F16L 19/103;
(Continued)

(56) References Cited

U.S. PATENT DOCUMENTS 2,311,662 A 2/1943 Hunziker
3,103,373 A * 9/1963 Lennon ..... F16L 19/103 285/342
(Continued)

FOREIGN PATENT DOCUMENTS

CN 1061268 5/1992
CN 101018968 8/2007
(Continued)

OTHER PUBLICATIONS

Definition of "Tapered", from www.dictionary.com (Year: 2023).*
(Continued)

*Primary Examiner* — Terrence R Till
(74) *Attorney, Agent, or Firm* — Calfee, Halter & Griswold LLP

(57) ABSTRACT

The present application discloses methods and apparatus for installing fitting components, such as a conduit gripping device, on a conduit to form an assembly. The assembly is joinable with at least one other fitting component to form a fitting. The present application also discloses methods and apparatus for evaluating characteristics of components of a mechanically attached connection. Characteristics that may be evaluated include, but are not limited to, the position of a conduit gripping device on a conduit, an amount of axial compression or stroke of the conduit gripping device, an amount of clamping force applied to the conduit gripping device as the conduit gripping device is compressed, and an amount of torque applied to members that compresses the conduit gripping device.

29 Claims, 45 Drawing Sheets

Related U.S. Application Data continuation of application No. 13/201,936, filed as application No. PCT/US2010/024886 on Feb. 22, 2010, now Pat. No. 8,997,325.

(60) Provisional application No. 61/298,179, filed on Jan. 25, 2010, provisional application No. 61/154,144, filed on Feb. 20, 2009, provisional application No. 61/154,136, filed on Feb. 20, 2009, provisional application No. 61/154,165, filed on Feb. 20, 2009, provisional application No. 61/154,172, filed on Feb. 20, 2009, provisional application No. 61/154,139, filed on Feb. 20, 2009.

(51) Int. Cl.

| | |
|---|---|
| ***B23P 19/10*** | (2006.01) |
| ***F16L 17/02*** | (2006.01) |
| ***F16L 19/04*** | (2006.01) |
| ***F16L 19/06*** | (2006.01) |
| ***F16L 19/065*** | (2006.01) |
| ***F16L 19/10*** | (2006.01) |

(52) U.S. Cl.

CPC ..... *F16L 17/02* (2013.01); *F16L 19/045* (2013.01); *F16L 19/061* (2013.01); *F16L 19/065* (2013.01); *F16L 19/103* (2013.01); *F16L 2201/10* (2013.01); *Y10T 29/49826* (2015.01); *Y10T 29/49872* (2015.01); *Y10T 29/53022* (2015.01); *Y10T 29/53039* (2015.01); *Y10T 29/53061* (2015.01)

(58) Field of Classification Search

CPC .... F16L 2201/10; B21D 39/048; B23P 19/10; Y10T 29/4982; Y10T 29/49872; Y10T 29/53022; Y10T 29/53039; Y10T 29/53061

See application file for complete search history.

(56) References Cited

U.S. PATENT DOCUMENTS

| | | | | |
|---|---|---|---|---|
| 3,139,293 | A | 6/1964 | Franck | |
| 3,393,549 | A | 7/1968 | Gregg | |
| 3,662,452 | A | 5/1972 | Stonestrom | |
| 3,691,604 | A | 9/1972 | Spontelli | |
| 3,722,064 | A | 3/1973 | Spontelli | |
| 3,728,771 | A | 4/1973 | Spontelli | |
| 3,810,296 | A | 5/1974 | Spontelli | |
| 3,972,112 | A | 8/1976 | O'Sickey et al. | |
| 4,014,208 | A * | 3/1977 | Moore | G01L 5/246 73/610 |
| 4,230,349 | A * | 10/1980 | Normark | F16L 19/061 285/382.7 |
| 4,233,723 | A * | 11/1980 | Eshghy | B23P 19/066 173/183 |
| 4,573,359 | A * | 3/1986 | Carstensen | G01L 5/24 33/561.2 |
| 4,691,944 | A | 9/1987 | Biall, Jr. | |
| 4,870,866 | A * | 10/1989 | Slack | G01L 5/246 73/599 |
| 4,873,755 | A | 10/1989 | Johnston | |
| 5,027,489 | A | 7/1991 | Johnston | |
| 5,040,400 | A | 8/1991 | Nastasi | |
| 5,233,742 | A * | 8/1993 | Gray | B23P 19/066 29/237 |
| 5,357,666 | A | 10/1994 | El Dessouky et al. | |
| 5,765,428 | A | 6/1998 | Lallier | |
| 5,868,435 | A | 2/1999 | Bartholomew | |
| 6,102,636 | A | 8/2000 | Geise | |
| 6,345,845 | B2 * | 2/2002 | Johnston | F16L 19/103 285/342 |
| 6,463,778 | B1 | 10/2002 | Johnston | |
| 6,834,524 | B2 | 12/2004 | Johnston | |
| 7,066,496 | B2 | 6/2006 | Williams et al. | |
| 7,284,433 | B2 * | 10/2007 | Ales | G01N 29/043 285/93 |
| 7,497,483 | B2 | 3/2009 | Williams et al. | |
| 8,997,325 | B2 | 4/2015 | Williams et al. | |
| 9,556,979 | B2 | 1/2017 | Williams et al. | |
| 2004/0066040 | A1 | 4/2004 | Bennett et al. | |
| 2005/0189134 | A1 | 9/2005 | Pyron | |
| 2008/0048441 | A1 | 2/2008 | Bennett et al. | |
| 2009/0289452 | A1 | 11/2009 | Bennett et al. | |
| 2009/0299514 | A1 | 12/2009 | Williams et al. | |
| 2010/0213705 | A1 | 8/2010 | Williams et al. | |
| 2010/0320755 | A1 * | 12/2010 | Williams | F16L 19/086 285/335 |

FOREIGN PATENT DOCUMENTS

| | | | |
|---|---|---|---|
| CN | 100380041 | 4/2008 | |
| DE | 1957565 | 5/1971 | |
| DE | 3843450 | 6/1990 | F16I 19/08 |
| EP | 612467 | 1/2006 | |
| JP | 05-054890 | 7/1993 | |
| JP | 7-243564 | 9/1995 | |
| JP | 9-178062 | 7/1997 | |
| JP | 2003-509218 | 3/2003 | |
| JP | 2005036947 | 2/2005 | |
| JP | 2005-530155 | 10/2005 | |
| JP | 2005-305648 | 11/2005 | |
| JP | 2008-502868 | 1/2008 | |
| JP | 2008-286337 | 11/2008 | |
| WO | 01/20214 | 3/2001 | |
| WO | 02/063195 | 8/2002 | |
| WO | 03/106993 | 12/2003 | |
| WO | 05/124712 | 12/2005 | |
| WO | 2005/124712 | 12/2005 | G08B 21/00 |
| WO | 2008/051500 | 5/2008 | |
| WO | 2009/003016 | 12/2008 | |
| WO | 09/020900 | 2/2009 | |
| WO | 09/003016 | 12/2009 | |
| WO | 2010/096672 | 8/2010 | |
| WO | 2010/096675 | 8/2010 | |

OTHER PUBLICATIONS

Office action from Japanese Application No. 2014-148494 dated Aug. 26, 2015.

Office action from Canadian Application No. 2,726,045 dated Aug. 28, 2015.

Office action from Japanese Application No. 2014-157349 dated Aug. 21, 2015.

Office action from Japanese Application No. 2015-253056 dated Sep. 28, 2016.

Notice of Allowance from U.S. Appl. No. 14/337,356 dated Sep. 27, 2016.

Office action from U.S. Appl. No. 14/337,356 dated May 11, 2016.

Office action from Chinese Application No. 201510833340.7 dated Mar. 9, 2017.

Office action from Chinese Application No. 201510831387.X dated Mar. 17, 2017.

Office action from Canadian Application No. 2,726,045 dated Apr. 18, 2017.

Search Report from European Application No. 16160220.6 dated Jun. 27, 2016.

* cited by examiner

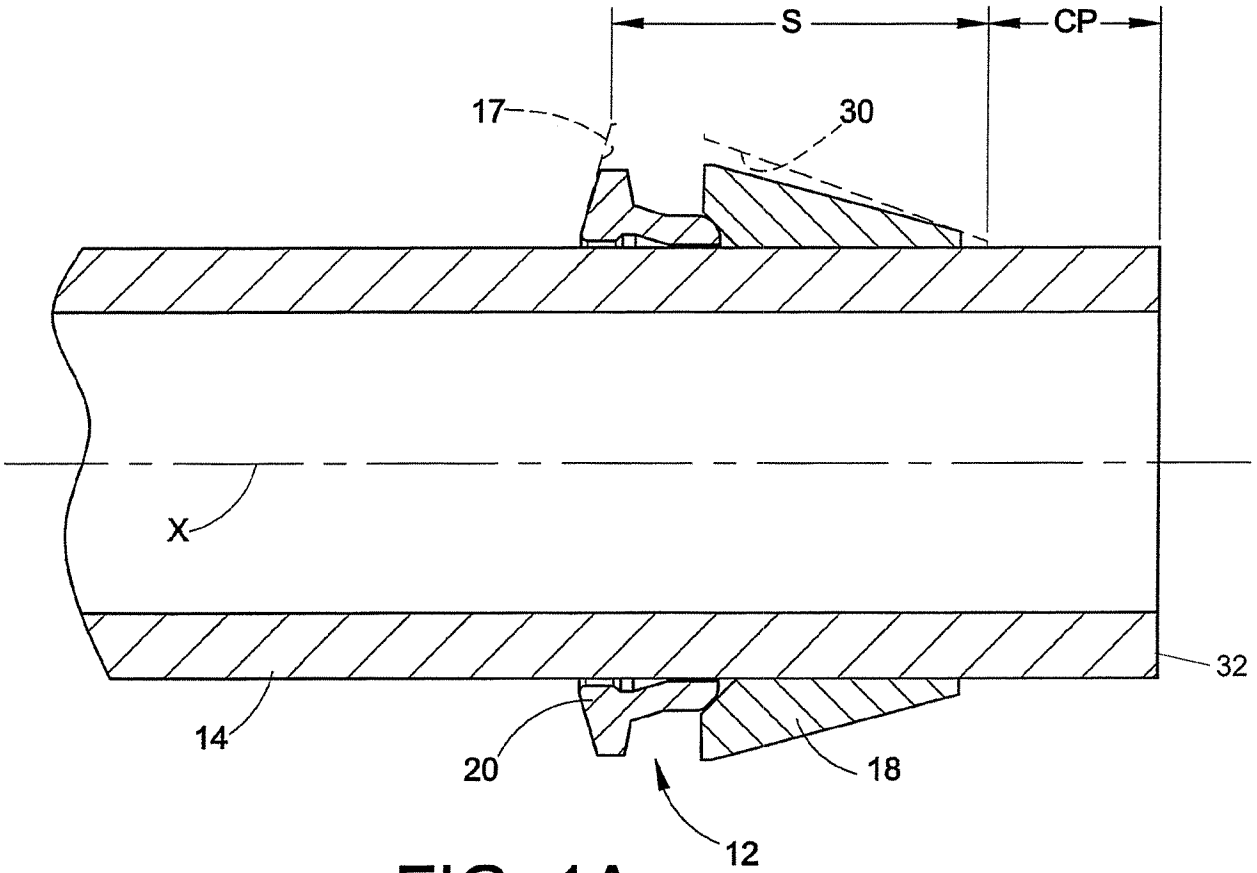
FIG. 1A
AMENDED

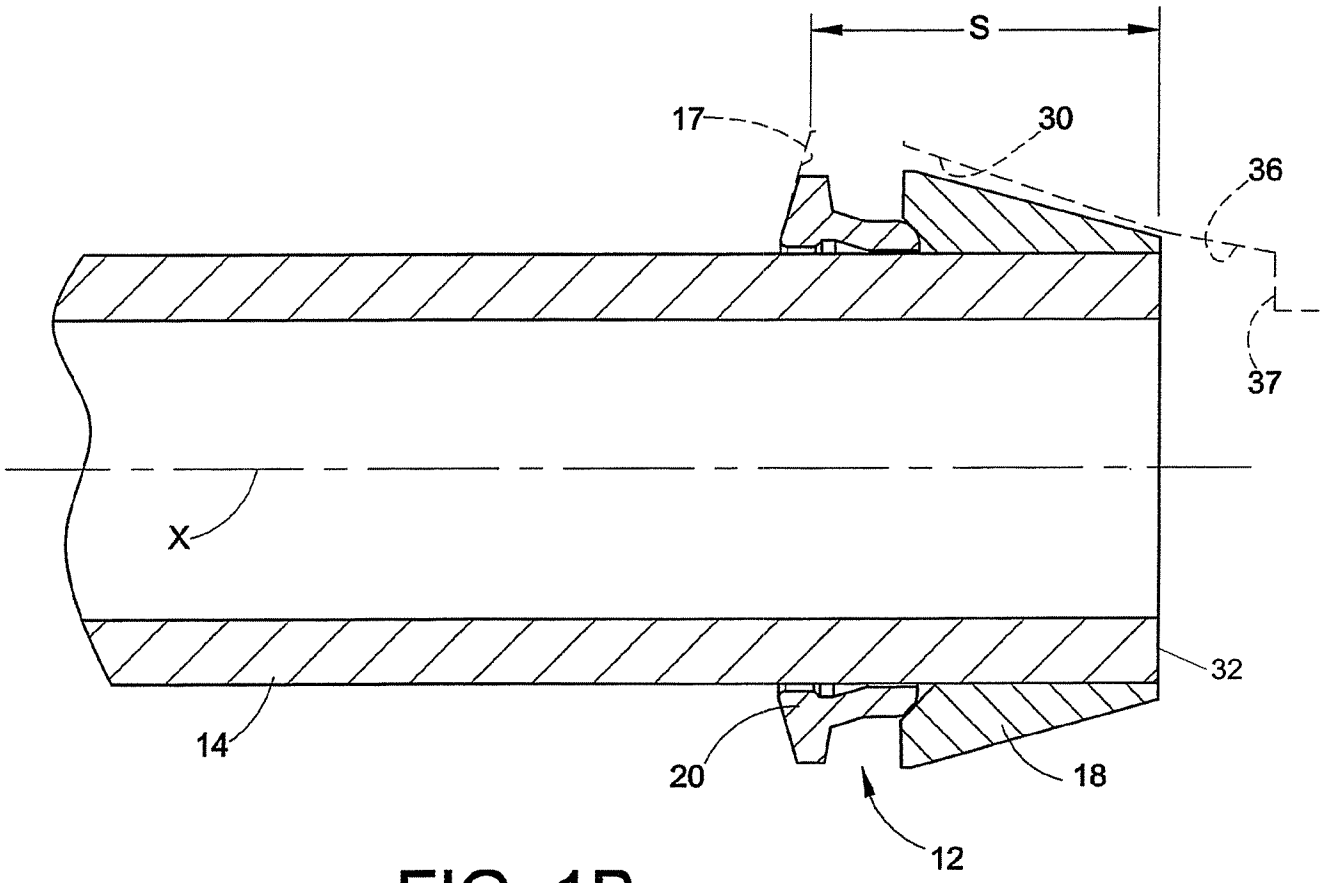
FIG. 1B
AMENDED

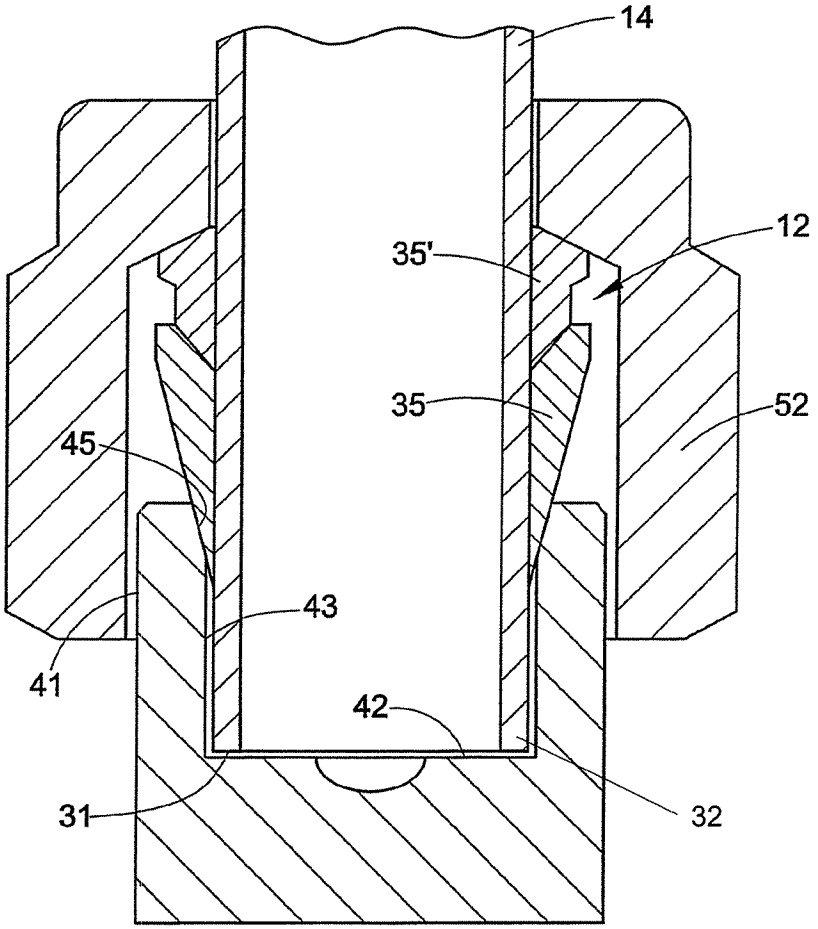
FIG. 2B
AMENDED

FITTING ASSEMBLY EVALUATING APPARATUS AND METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue of U.S. Pat. No. 10,316,997 titled FITTING ASSEMBLY EVALUATING APPARATUS AND METHODS and issued on Jun. 11, 2019 from U.S. application Ser. No. 15/408,477, filed Jan. 18, 2017, which* is a continuation application of pending U.S. Ser. No. 14/645,517, filed on Mar. 12, 2015, titled FITTING EVALUATING APPARATUS AND METHODS, *now U.S. Pat. No. 9,556,979,* which is a continuation of U.S. Ser. No. 13/201,936, filed Aug. 17, 2011, titled FITTING ASSEMBLY EVALUATING APPARATUS AND METHODS, now U.S. Pat. No. 8,997,325, which is the U.S. national phase entry of PCT/US2010/024886, with an international filing date of Feb. 22, 2010, expired, which claims the benefit of U.S. provisional patent application Ser. No. 61/298,179 filed on Jan. 25, 2010, expired, for APPARATUS FOR SWAGING FERRULES; U.S. provisional patent application Ser. No. 61/154,136 filed on Feb. 20, 2009, expired, for CONDUIT FITTING WITH SPLIT TORQUE COLLAR; U.S. provisional patent application Ser. No. 61/154,165 filed on Feb. 20, 2009, expired, for APPARATUS FOR SWAGING FERRULES; U.S. provisional patent application Ser. No. 61/154,172 filed on Feb. 20, 2009, expired, for APPARATUS FOR SWAGING FERRULES; U.S. provisional patent application Ser. No. 61/154,139 filed on Feb. 20, 2009, expired, for CONDUIT FITTING WITH GROOVED TORQUE COLLAR; and U.S. provisional patent application Ser. No. 61/154,144 filed on Feb. 20, 2009, expired, for CONDUIT FITTING WITH TORQUE COLLAR, the entire disclosures all of which are fully incorporated herein by reference.

FIELD OF THE INVENTION

The present application relates to methods and apparatus used to evaluate or determine the nature of a mechanically attached connection installed on a conduit. More particularly, the application relates to methods and apparatus for evaluating such an assembly by determining or evaluating one or more characteristics of a component of the mechanically attached connection, the conduit or both.

BACKGROUND

Mechanically attached connections such as fittings, joints, couplings, unions and so on are used in fluid systems to contain fluid flow. Such mechanically attached connections may be conduit fittings for tube, pipe or any other type of conduit. The conduit fittings may connect a conduit end to either another conduit end or to another portion of a fluid system. For simplicity and clarity, the term 'fitting' as used herein is intended to be all inclusive of other terms, for example coupling, connection, union, joint and so on, that could alternatively be used to refer to a mechanically attached connection. Such mechanically attached connections are characterized by a fluid tight seal and mechanical strength to hold the connection together including sufficient grip of the conduit under vibration, stress and pressure. Fluids may include gas, liquid and any variation or combination thereof.

Fluid systems typically use mechanically attached connections to interconnect conduit ends to each other and to flow devices which may control flow, contain flow, regulate flow, measure one or more characteristics of the fluid or fluid flow, or otherwise influence the fluid within the fluid system. The term 'mechanically attached connection' as used herein means any connection for or in a fluid system that involves at least one connection that is held in place by mechanically applied force, stress, pressure, torque, or the like, such as, for example, a threaded connection, a clamped connection, a bolted or screwed together connection and so on. This is distinguished from a metallurgical or chemical connection most commonly practiced as welding, brazing, soldering, adhesive and so forth. A connection may include a combination of mechanical and metallurgical connections, and often do, and such connections are also within the term 'mechanically attached connections' as they include at least one such connection.

One example of a mechanically attached connection involves a conduit gripping device, such as, for example, a collet or one or more ferrules, which may be installed on an outer surface of a conduit for assembly with a fitting. In a conventional ferrule type fitting, first and second coupling members (e.g., a fitting body and nut) may be assembled together and tightened (or pulled up) to install the ferrule or ferrules in gripping and sealing engagement with the conduit by plastically deforming the ferrule or ferrules on the conduit. The installed ferrule or ferrules provide a fluid tight seal with the assembled fitting, particularly under pressure, as well as adequate grip of the conduit and protection against vibration fatigue.

Ferrule type fittings are well known and characteristically include a threaded coupling nut, a threaded coupling body and one or more ferrules that fit inside the coupling nut. The coupling body typically includes a camming surface that engages a camming surface on a ferrule. A cylindrical conduit such as, for example, a tube end, is slid into the coupling body with the ferrules closely surrounding the outer wall of the conduit end. When the coupling nut is installed onto the threaded end of the coupling body (or vice versa when the coupling body includes female threads), an axial force is applied to the ferrule or ferrules which causes the camming surfaces of the ferrule and body to engage to produce a swaging action thereby causing a radial displacement of portions of each ferrule, causing the ferrules to tightly grip the outer wall of the conduit end. In many applications the fitting can be assembled with the use of simple hand tools such as wrenches.

In some circumstances, a fitting's conduit gripping device may be "pre-installed" or "pre-swaged" on a conduit (using, for example, the fitting with which the conduit gripping device is to subsequently be assembled, another fitting, or an installation tool) to facilitate subsequent installation of a fitting to the conduit in the fluid system. For example, tools may be used to "pre-install" or "pre-swage" the such one or more ferrules on the conduit, which holds the one or more ferrules and the coupling nut on the conduit as a subassembly. This subassembly of the ferrules, coupling nut, and the conduit are later assembled with a fitting body to form a final fitting assembly. One example of a tool for installing ferrules onto a conduit is disclosed by U.S. Pat. No. 6,834,524 to Johnston, titled "Apparatus for Swaging Ferrules," which is incorporated herein by reference in its entirety.

Another example of a mechanically attached connection is known as a flared fitting. In a flared fitting, an end of the tube that seals with a fitting body is flared radially outward. Some existing flared fittings include a body, a sleeve, and a nut. The nut and sleeve are placed over the tube and the tube end is flared radially outward. After the flaring operation, the flared tube end is clamped between the fitting body and the sleeve by the nut.

SUMMARY

The present application discloses methods and apparatus for installing fitting components, such as a conduit gripping device, on a conduit to form an assembly. The assembly is joinable with at least one other fitting component to form a fitting. The present application also discloses methods and apparatus for evaluating characteristics of components of a mechanically attached connection. Characteristics that may be evaluated include, but are not limited to, the position of a conduit gripping device on a conduit, an amount of axial compression or stroke of the conduit gripping device, an amount of clamping force applied to the conduit gripping device as the conduit gripping device is axially compressed, and an amount of torque applied to members that axially compresses the conduit gripping device.

In one embodiment, a conduit gripping device is installed on a conduit by applying the same predetermined torque that is used to pull up a fitting that includes the assembly. For example, a predetermined torque may be applied between a first fitting component and a member to axially advance the first fitting component with respect to the member. This axial advancing causes a first amount of compression of the conduit gripping device that causes the conduit gripping device to grip onto a conduit. The first fitting component is separated from the member and assembled with a second fitting component. The predetermined torque is applied between the first fitting component and the second fitting component to axially advance the first fitting component with respect to the second fitting component. This axial advancing causes a second amount of compression of the conduit gripping device that causes the conduit gripping device to grip and seal the conduit.

In another exemplary embodiment, torque is monitored to determine whether one or more conduit gripping device components are present, properly oriented, and/or in a proper order. For example, torque may be applied between a first member and a second member to cause relative axial movement of the first member toward the second member to clamp the conduit gripping device. A position of the first member with respect to the second member is monitored during the relative axial movement. Also, a torque applied between the first member and the second member is monitored during the relative axial movement. Whether one or more components of the conduit gripping device are disposed between the first member and the second member, are properly oriented and/or are properly ordered is determined based on the monitored position and the monitored torque.

BRIEF DESCRIPTION OF THE DRAWINGS

These and other inventive aspects and features of the present disclosure will become apparent to one skilled in the art to which the present invention relates upon consideration of the following description of the exemplary embodiments with reference to the accompanying drawings, in which:

FIG. 1A illustrates an exemplary conduit gripping device positioned around a conduit at a first axial location;

FIG. 1B illustrates the exemplary conduit gripping device positioned around the conduit at a second axial location;

FIG. 2B illustrates a side cross-sectional view of the apparatus of FIG. 2A, assembled with a conduit, conduit gripping device, and fitting coupling member;

DESCRIPTION OF THE EXEMPLARY EMBODIMENTS

Figure 1C:
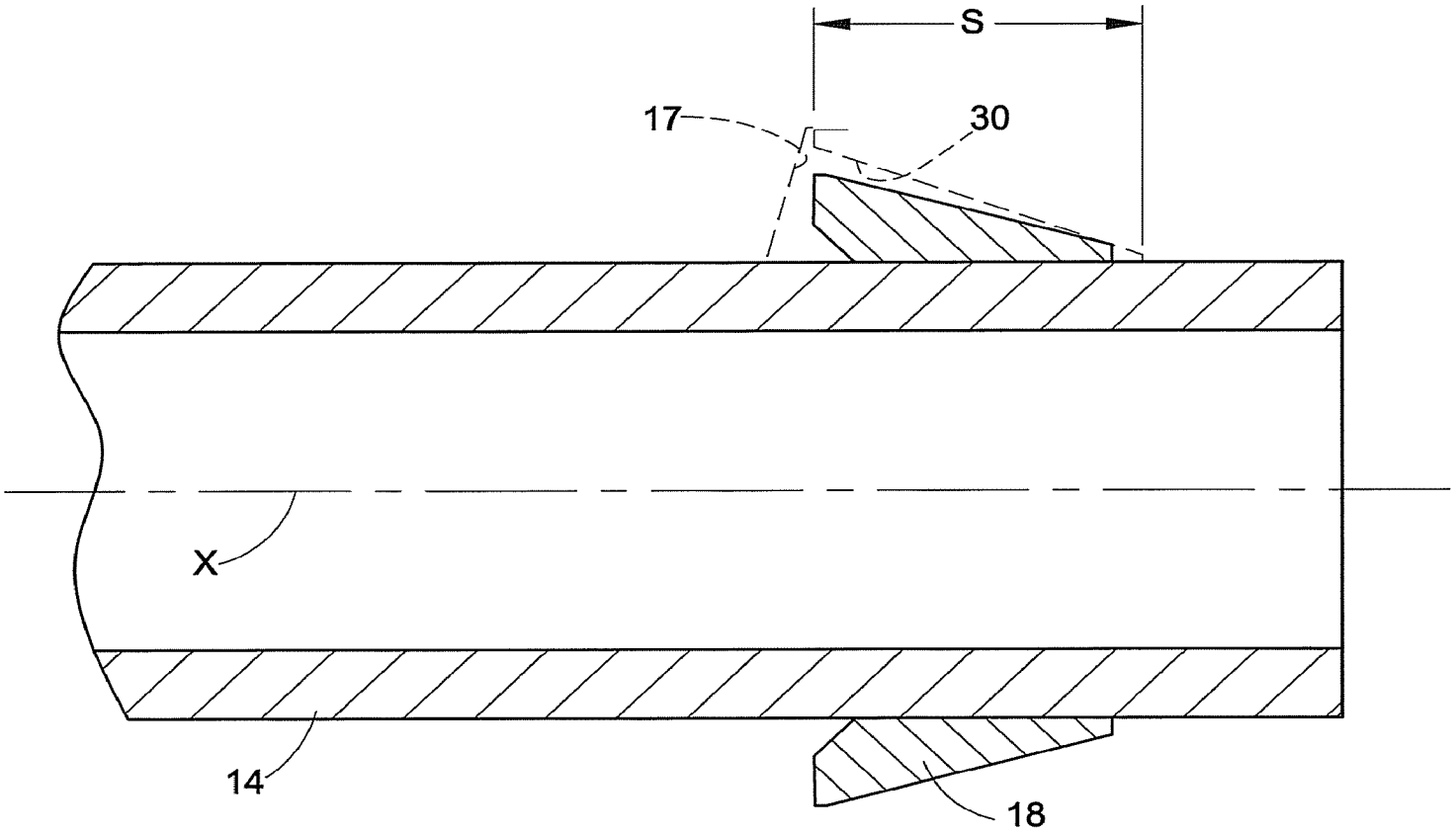
FIG. 1C illustrates a component of the exemplary conduit gripping device positioned around the conduit, while a second component of the conduit gripping device is missing.

While the inventions are described herein with specific reference to a variety of structural and material features, such descriptions are intended to be exemplary in nature and should not be construed in a limiting sense. For example, the exemplary embodiments are described primarily in terms of a stainless steel tube fitting utilizing two ferrules. Those skilled in the art, however, will readily appreciate that any one or more of the aspects and features of the inventions may be used with different mechanically attached connections for conduits, including but not limited to, other conduit gripping arrangements (e.g., single ferrule designs) and flared conduit fittings, with materials other than stainless steel, and with many different conduits including, but not limited to, tube or pipe. Moreover, many of the aspects of the inventions may be used for fittings intended for use in a variety of system pressures and temperatures, and with a variety of system fluids. Still further, many of the exemplary embodiments herein illustrate components of what is commonly known as a male-style fitting, meaning that a male (i.e. externally) threaded component receives and abuts the conduit end. Many aspects of the male-style embodiments will find application in female-style fittings as will be apparent to those skilled in the art. The inventions will also find application for fitting assemblies that do not require threaded connections between the fitting components, for example the inventions may be applied to clamped and/or bolted fittings. The inventions will also find application far beyond the exemplary embodiments herein as to mechanically attached connections that can be made to a wide and ever expansive variety of fluid components including, but not limited to, other conduits, flow control devices, containers, manifolds and so on.

Many types of fitting arrangements may be used to provide a fitting connection, including, for example, push-to-connect, tool-tightened (e.g., crimping or clamping), or threaded arrangements. Referring to FIG. 1A, an exemplary fitting assembly includes a conduit gripping device 12 positioned around a conduit 14. The illustrated conduit gripping device 12 includes a front ferrule 18 and a rear ferrule 20. However, the conduit gripping device 12 may take any form and may include any number of ferrules when the conduit gripping device is a ferrule-type conduit gripping device. The conduit gripping device 12 is positioned between a drive surface 17 and a camming surface 30. The drive surface 17 and the camming surface 30 are moved relatively toward one another to engage the conduit gripping device 12 and drive the conduit gripping device into gripping and/or sealing engagement with the conduit by plastically deforming the conduit gripping device. This relative axial movement is referred to herein as "stroke" or "axial stroke".

The movement of the drive surface 17 toward the camming surface 30 will cause the conduit gripping device 12 to become attached to the conduit 14. This attachment is referred to herein as installation or pre-installation. The amount of axial movement or stroke of the drive surface 17 toward the camming surface 30 needed to attach the conduit gripping device 12 to the conduit 14 may be less than the amount of axial movement or stroke needed to cause the conduit gripping device to seal with the conduit. A conduit 14 with pre-installed conduit gripping device 12 may be assembled with a fitting body and nut such that the conduit gripping device grips and seals the conduit and seals with the fitting body to form a pulled-up fitting.

The attachment of the conduit gripping device 12 to the conduit 14 may be achieved during a clamping operation, where a drive surface 17 is forced relatively toward the camming surface 30 or stroked by a pre-installation apparatus. The pre-installation apparatus may include a pre-installation drive surface 17 and/or camming surface 30 or the drive surface 17 and/or the camming surface 30 may be the drive surface and/or camming surface of a later pulled-up fitting assembly. The pre-installation surface 17 may be moved linearly along the axis X, or the preinstallation drive surface 17 may be rotated to axially advance the preinstallation drive surface 17 along the axis (i.e. the pre-installation drive surface 17 may be part of a threaded member).

The present application relates to methods and apparatus for installing a conduit gripping device 12 on a conduit 14 and methods and apparatus for evaluating one or more characteristics of a conduit gripping device 12 installed or being installed on an end portion of a conduit 14. The conduit gripping device 12 may be, for example, used with one or more coupling members of an associated fitting. A wide variety of characteristics of the conduit and/or conduit gripping device may be evaluated. Examples of characteristics of the conduit 14 and/or conduit gripping device that may be evaluated include, but are not limited to, the position of the conduit gripping device 12 on the conduit 14, an amount of compression or clamping of the conduit gripping device, an amount of rotation/axial advance of a threaded member, and an amount of force and/or torque applied during the compression or clamping. The characteristic(s) can be evaluated after the conduit gripping device grips the end of the conduit and/or can be evaluated during installation of the conduit gripping device on the end of the conduit.

In FIG. 1A, the position of the conduit gripping device 12 on the conduit 14 is represented by the dimension labeled CP. In the illustrated example, the conduit position CP is a relative distance between the conduit end 32 and the conduit gripping device 12 (determined based on a relative distance between the conduit end and the camming surface 30). The stroke of compression or clamping of the conduit gripping device 12 can be determined based on the position of the drive surface 17 relative to the camming surface 30. The position of the drive surface 17 relative to the camming surface 30 is represented by the dimension labeled S in FIG. 1A.

In an exemplary embodiment, the conduit position CP is evaluated to determine whether the conduit is positioned within a predetermined range of acceptable conduit positions. This may be done for a variety of different reasons. For example, the conduit position CP may be evaluated to confirm or ensure proper bottoming of the conduit 14 in a fitting body. For example, the fitting body may have a stop shoulder 37 that the conduit abuts when the fitting is pulled-up and/or the fitting body may have a tapered surface 36 axially inward of the camming mouth that the conduit engages when the fitting is pulled-up (See FIG. 1B). The conduit is properly "bottomed" if the conduit engages the stop shoulder 37 or engages the tapered surface 36. FIG. 1B illustrates an example of a situation where the conduit end 32 has not reached an acceptable position relative to the conduit gripping device 12. Since the conduit end 32 does not extend all the way through the conduit gripping device 12, it does not "bottom" on the tapered surface, or the shoulder.

In an exemplary embodiment, the relative position S is evaluated to determine whether the drive surface 17 is positioned within a predetermined range of acceptable positions with respect to the camming surface 30. This may be done for a variety of different reasons. The relative position S may be evaluated to confirm or ensure proper compression of the conduit gripping device 12 on the conduit 14. In one exemplary embodiment, a clamping force between the drive surface 17 and the camming surface 30 is evaluated while the relative position S is evaluated. In another embodiment, a torque applied between a first member and a second member required to axially advance the drive surface 17 relatively toward the camming surface 30 is evaluated while the relative position S is evaluated. The monitoring of the clamping force and/or the torque required for axial advancement may be performed for a variety of different reasons. For example, by evaluating both the clamping force and/or torque and the relative position S, missing components can be detected, too many components can be detected, incorrect component positioning can be detected, and incorrect component orientation can be detected.

In FIG. 1C, the rear ferrule 20 is missing. This condition can be detected by evaluating the clamping force and/or torque and the relative position S. The clamping force and/or torque required for further axial advancement would be expected to rise (or be required to rise) at the relative position S where the front ferrule 18 and the rear ferrule 20 are first engaged by the drive surface 17 and the camming surface 30. Since rear ferrule 20 is not present, the clamping force and/or torque will not increase at the expected position S and the missing ferrule condition is indicated. A missing front ferrule 18 can be detected in the same manner.

Similarly, the condition where more than the prescribed number of ferrules are present can be detected by evaluating the clamping force and/or torque and the relative position S. The clamping force would be expected to rise (or be required to rise) at the relative position S where the front ferrule 18 and the rear ferrule 20 are first engaged by the drive surface 17 and the camming surface 30. Since an additional ferrule is present, the clamping force and/or torque will increase earlier than the expected position S and the additional ferrule condition is indicated.

Figure 1D:
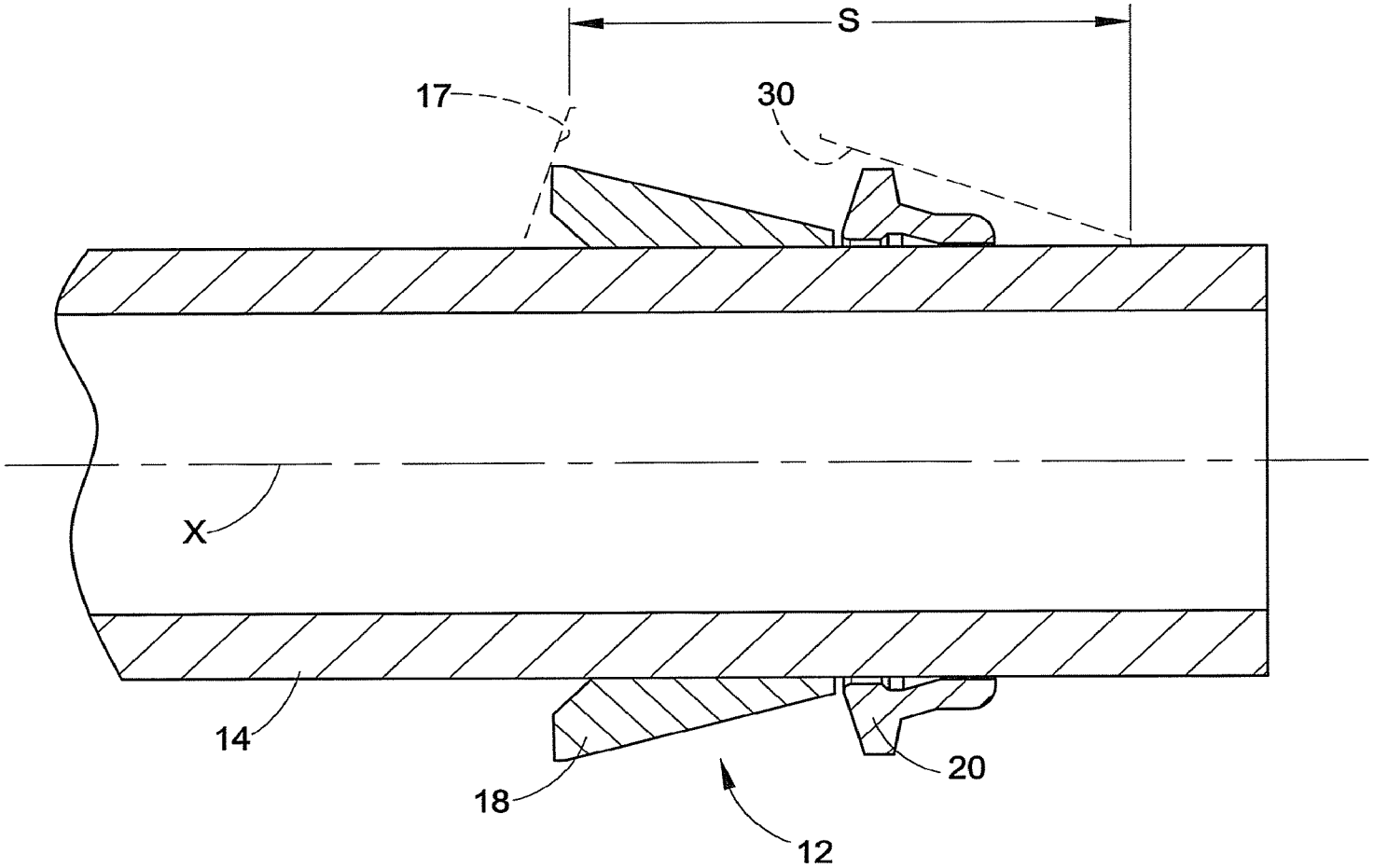
FIG. 1D illustrates the exemplary conduit gripping device positioned around the conduit, with the order of the components of the conduit gripping device reversed.

In FIG. 1D, the front ferrule 18 is positioned behind the rear ferrule 20. This condition can be detected by evaluating the clamping force and/or torque and the relative position S. The clamping force and/or torque would be expected to rise (or be required to rise) by a predetermined amount at the relative position S where the front ferrule 18 and the rear ferrule 20 are first engaged by the drive surface 17 and the camming surface 30. The clamping force and/or torque will increase at a position S that is different than expected and/or by a different amount than expected and the incorrect component positioning is indicated.

Figure 1E:
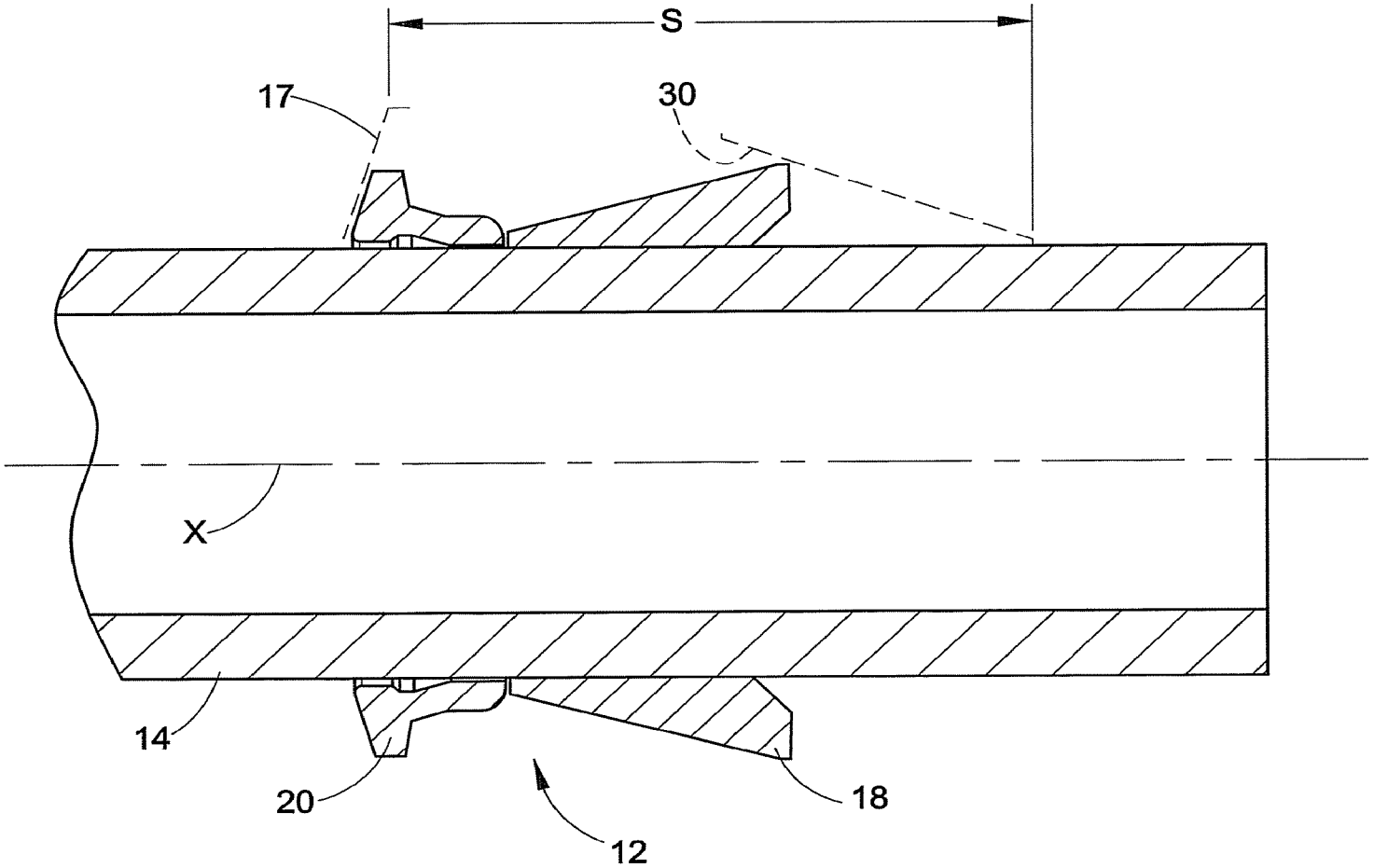
FIG. 1E illustrates the exemplary conduit gripping device positioned around the conduit, with an orientation of a front ferrule of the conduit gripping device reversed.
Figure 1F:
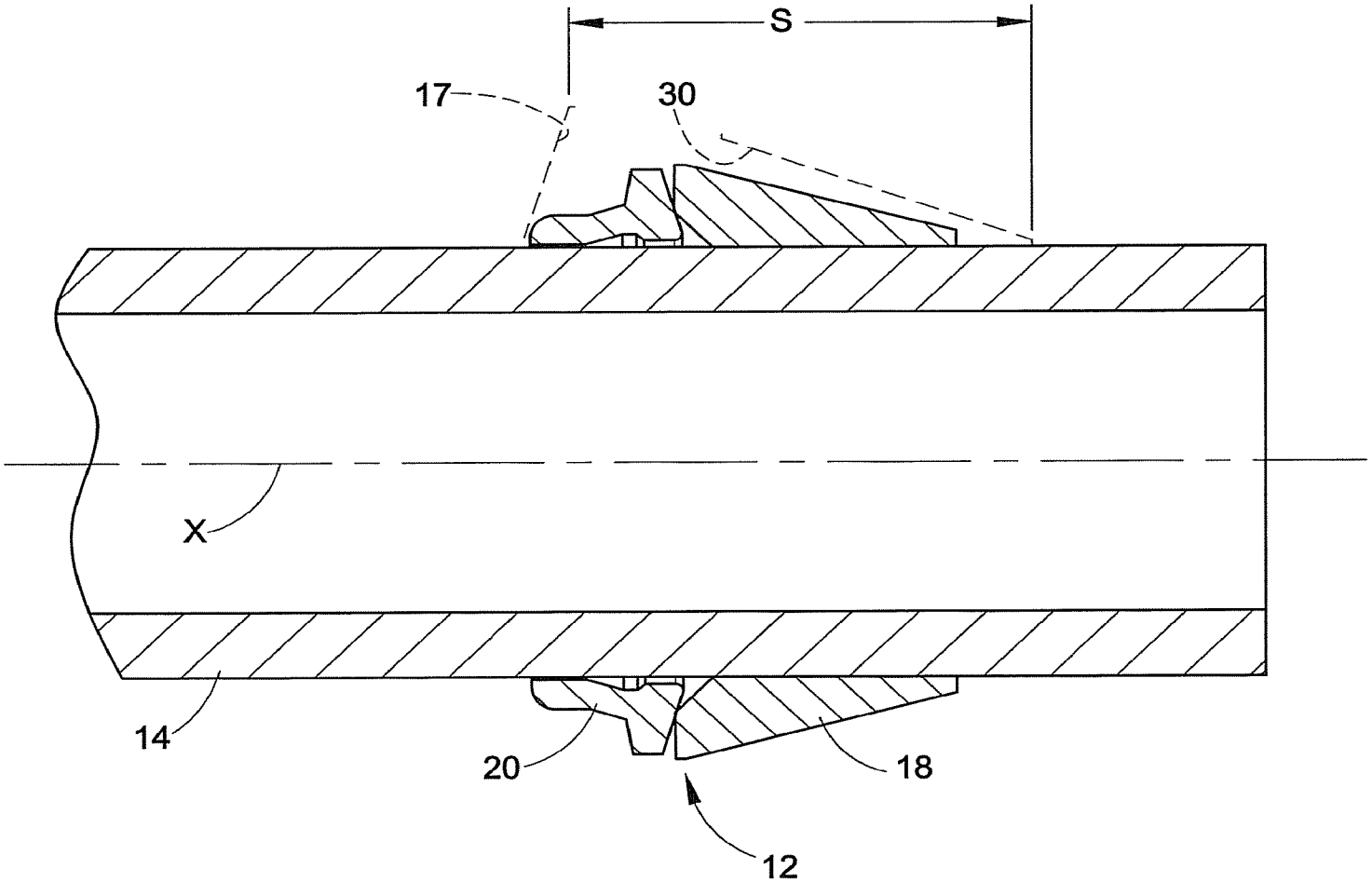
FIG. 1F illustrates the exemplary conduit gripping device positioned around the conduit, with an orientation of a rear ferrule of the conduit gripping device reversed.
Figure 1G:
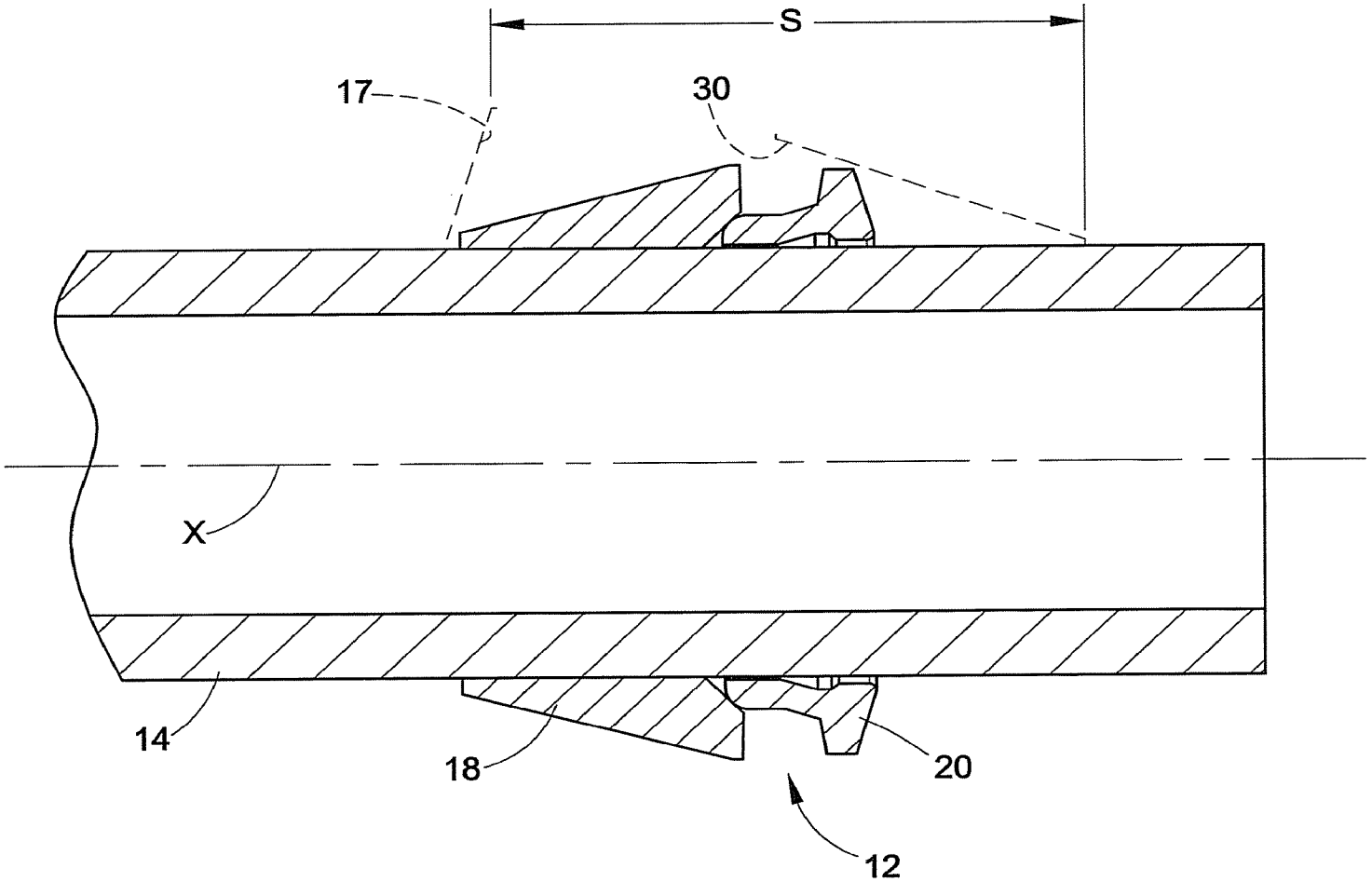
FIG. 1G illustrates the exemplary conduit gripping device positioned around the conduit, with an orientation of a front ferrule and a rear ferrule of the conduit gripping device reversed.

In FIG. 1E, the front ferrule 18 is oriented backwards. In FIG. 1F, the rear ferrule 20 is oriented backwards. In FIG. 1G, both the front and rear ferrules are oriented backwards. Each of these conditions can be detected by evaluating the clamping force and the relative position S. The clamping force would be expected to rise (or be required to rise) at the relative position S where the front ferrule 18 and the rear ferrule 20 are first engaged by the drive surface 17 and the camming surface 30. The clamping force will increase at a position S that is different than expected and/or by a different amount than expected and the incorrect component orientation is indicated.

In some circumstances, the conduit gripping device, such as a ferrule or ferrules, may be pre-installed or "pre-swaged" onto the conduit prior to final assembly of the fitting body with the conduit. The conduit gripping device may be "pre-installed" on a conduit by camming a portion or portions of the conduit gripping device into gripping engagement with the conduit, creating a conduit, conduit gripping device and nut (optional) pre-assembly or subassembly that may be assembled with a fitting body to form a final fitting. For example, the fitting may be assembled by tightening a fitting body and nut of the pre-assembly. By pre-tightening or pre-installing the conduit gripping device on the conduit and optionally retaining the nut on the conduit with the conduit gripping device, the time and/or effort to assemble the final fitting in a fluid system may be reduced.

Pre-installation of the conduit gripping device on the conduit may, but need not, include pre-camming a portion or portions of the conduit gripping device against the conduit and optionally retaining the nut on the conduit with the conduit gripping device. The pre-camming is provided by an axial stroke of a drive surface 17 relatively toward a camming surface 30 (i.e. a reduction of the dimension S in FIG. 1). The drive surface 17 and/or camming surface 30 may be the same surfaces of a final fitting (i.e. a drive surface of a fitting nut and a camming surface of a fitting body), or one or both of the surfaces may be part of a pre-installation apparatus. The axial stroke provides a gripping force of the conduit gripping device with the conduit 14. The axial stroke and gripping force is less than the axial stroke and resulting gripping force of the conduit gripping device in a finally assembled fitting. The pre-installation axial stroke and resulting gripping force is sufficient to retain the conduit gripping device on the conduit as a subassembly. In such an arrangement, an additional axial stroke that results in additional gripping force may be applied to the conduit gripping device when the fitting body is assembled with the conduit and ferrule sub-assembly. The fitting may be configured such that a predetermined amount of axial stroke of the drive surface 17 toward the camming surface is sufficient for proper make-up of the fitting.

In one exemplary method, by "pre-installing" the conduit gripping device with a predetermined axial stroke between a drive surface 17 and a camming surface 30, proper subsequent make-up of a fitting may be achieved by tightening a fitting nut a predetermined number of turns beyond a finger tight position. In one exemplary embodiment, the fitting may be configured to be pulled up by a first predetermined number of turns if there is no "pre-installation" of the conduit gripping device onto the conduit and the fitting and the pre-installation assembly may be configured such that the fitting is pulled up by a second, smaller, predetermined number of turns if the conduit gripping device is "pre-installed" onto the conduit. For example, a fitting may be configured to be pulled up by tightening the fitting nut with respect to the fitting body 1¼ to 1½ turns past finger tight if there is no pre-installation of the conduit gripping device onto the conduit. The "pre-installation" may be configured such that, after the conduit gripping device is pre-installed onto the conduit, the fitting may be pulled up by tightening the fitting nut with respect to the fitting body by ½ turn. That is, the axial stroke of the drive surface 17 with respect to the camming surface 30 during the pre-installation operation corresponds the axial stroke achieved by rotating the fitting nut with respect to the fitting body a predetermined number of turns. For example, when a fitting is normally (without pre-installation) pulled up by tightening 1¼ turns past finger tight and a corresponding pre-installed fitting is pulled up by tightening ½ turns past finger tight, the pre-installation operation is configured to compress the conduit gripping device substantially the same amount as the conduit gripping device would have normally been compressed by tightening a non-pre-installed fitting ¾ turns past finger tight.

This "pre-installation" of a conduit gripping device 12 to a conduit 14 may be performed using fitting coupling components, such as a fitting body and nut, assembled with the conduit and the conduit gripping device. One or both of the fitting body and nut used for pre-installing may be the same fitting body and/or nut subsequently used with the conduit in a final fluid assembly. Alternatively, one or both of the fitting body and nut may be replaced by another fitting body and/or nut when the conduit is assembled in the fluid system. In other ferrule pre-installation arrangements, a tool or anvil may be used to "pre-install" a conduit gripping device onto a conduit. The anvil may be any type of member or assembly that includes a camming surface. Many different types of tools may be used to "pre-install" a conduit gripping device onto a conduit, including, for example, electrical installation tools, pneumatic installation tools, hydraulic installation tools, and manually operated installation tools. One such exemplary installation tool includes a clamping device that axially compresses or strokes the conduit gripping device against a camming surface 30 to radially compress at least a portion of the conduit gripping device to "pre-install" the conduit gripping device to grip the conduit at a desired axial position of the conduit 14. Another exemplary installation tool is configured to rotate a threaded fitting body, fitting nut, and/or anvil to axially compress or stroke at least a portion of the conduit gripping device against a camming surface to radially compress at least a portion of the conduit gripping device to "pre-install" the conduit gripping device to grip the conduit at a desired axial position of the conduit 14.

The installation tool may be provided in many different configurations for "pre-installing" a conduit gripping device (e.g., a ferrule or ferrules) onto a conduit, including, for example, a clamping arrangement with first and second clamping members that move axially toward one another without substantial relative rotation, compressing arrangements with radially inward clamping member(s) that radially compress the conduit gripping device without substantial axial movement of the clamping member(s), or threaded arrangements with first and second clamping members that rotate to move axially toward one another. In one embodiment, the installation tool may be provided with threaded portions and internal surface geometries configured to "install" a conduit gripping device onto a conduit. As described herein, threaded components may include, for example, the body and nut of a fitting or the body portion and an anvil of an installation tool. However, it should be noted that many of the inventive aspects described herein may also be applied to other installation processes for conduit gripping devices involving, for example, clamping or compressing components (as opposed to threaded components), and hydraulic, pneumatic, or electric installation apparatus, other manual installation apparatus, or compressing of a conduit gripping device by pull-up of a fitting.

The present application contemplates evaluation, verification, or inspection of the axial position of an installed conduit gripping device on a conduit, whether the conduit gripping device is installed on the conduit during final assembly of the associated fitting or in a "pre-installation" operation prior to subsequent fitting assembly. The evaluation, verification, or inspection may occur after the assembly or pre-assembly is complete, and/or the evaluation, inspection, or verification may be performed while the conduit gripping device is being "swaged" or "pre-installed" onto the conduit. A variety of axial positions of an installed conduit gripping device may be desired for a variety of reasons. In one embodiment, the installed conduit gripping device is positioned such that the end of the conduit abuts or bottoms against a shoulder and/or engages a tapered surface in the fitting body during fitting installation. According to an inventive aspect of the present application, an apparatus may be provided for evaluating the axial position of the installed or pre-installed conduit gripping device on the conduit end (after the installation or pre-installation and/or during the installation or pre-installation), for example, to verify that the conduit end was or will be bottomed in the fitting body.

Embodiments of methods and apparatus for installing conduit gripping devices onto a conduit will be described herein in an exemplary manner for causing two ferrules of a conventional conduit fitting to grip a conduit end at a desired axial location. However, this is for purposes of illustration and explanation and should not be construed in a limiting sense. Those skilled in the art will readily appreciate that the installation methods and apparatus described herein can be used to pre-install single ferrules onto conduit ends, and further can be used to pre-install ferrules onto cylindrical members other than just conduit ends, among them being cylindrical members such as tubing extensions on flow control devices to name one example. Further, the pre-installation operation may take place at the site where final assembly with a fitting body occurs or the pre-installation operation may take place at a first site to form a pre-assembly that includes a conduit, conduit gripping device, and nut that is transported to a second site where the pre-assembly is assembled with a fitting body.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
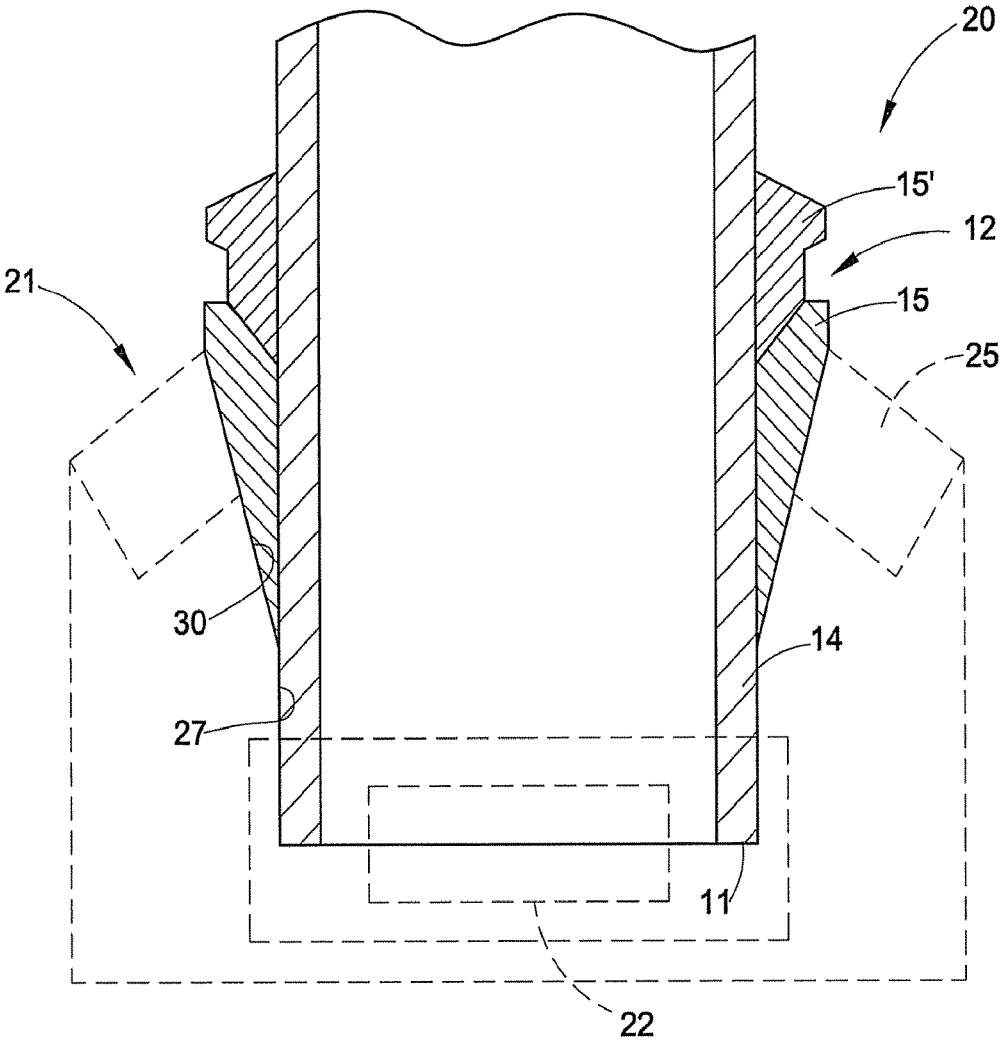
FIG. 2 illustrates a side cross-sectional schematic view of a fitting assembly evaluation apparatus assembled with a conduit and conduit gripping device.

FIG. 2 illustrates a schematic view of an apparatus 20 for evaluating the axial position of a conduit gripping device 12 (e.g., ferrules 15, 15') installed on a conduit 14. The apparatus 20 may conveniently be realized in the form of a tool, such as a hand-held tool. When the apparatus is configured as a hand-held tool, the apparatus is portable and may be used at a wide variety of different locations to evaluate fitting characteristics.

The apparatus 20 may include a conduit end accepting portion 21 having one or more conduit gripping device engaging features 25 configured to engage a portion of the conduit gripping device 12 to limit axial movement of the conduit gripping device and attached conduit 14 with respect to the conduit end accepting portion 21. The conduit end accepting portion 21 may be provided with many different structures or arrangements shaped to accommodate a conduit end, including, for example, a bore, recess, or planar wall. Likewise, the conduit gripping device engaging feature 25 may be provided in many different configurations, including, for example, a ridge, shoulder, or projection. In one embodiment, a conduit end accepting portion includes a bore 27 sized to receive an end of the conduit 14 and a camming surface 30 extends from the bore 27. The camming surface 30 may function as the schematically illustrated conduit gripping device engaging feature 25.

The exemplary apparatus 20 may include a conduit position reference feature, shown schematically at 22. According to an inventive aspect of the present application, the conduit position reference feature 22 may be positioned such that an axial distance (or range of distances) defined between the conduit gripping device engaging feature 25 and the conduit position reference feature 22 corresponds to a distance (or range of distances) between a desired axial position of the conduit gripping device 12 and a reference position (for example, a marked position or an end face 11) of the conduit 14. This axial distance or range of distances may correspond to acceptable conduit position dimensions CP (see FIG. 1). As a result, when the assembly of the conduit 14 and conduit gripping device 12 is positioned such that the conduit gripping device engages the conduit gripping device engaging feature 25, as shown in FIG. 2, alignment of the conduit end face 11 (or other predetermined reference point of the conduit) with the conduit position reference feature 22 is an indication that the conduit gripping device 12 was installed in a desired axial position on the conduit. If the conduit end face 11 (or other predetermined reference point of the conduit) does not align with the conduit position reference feature 22 upon engagement of the conduit gripping device 12 with the conduit gripping device engaging feature 25, the misalignment is an indication that the conduit gripping device 12 is not in a desired axial position on the conduit. As used herein, "alignment" of the conduit end face 11 with the conduit position reference feature 22 may include, for example, abutment against or contact with the position reference feature, a visible overlap with the position reference feature, or obscuring of the position reference feature. The position reference feature may take a wide variety of different forms. For example, the position reference feature may include a stop shoulder, a tapered surface, and may be fixed or moveable between a predetermined range of positions. In one exemplary embodiment, the apparatus 20 is a unitary structure that includes both the gripping device engaging feature 25 and the position reference feature 22.

The position reference feature 22 may be provided in many different configurations, and may provide for many different types of evaluation, verification, or inspection of axial position of the conduit gripping device 12. As one example, the position reference feature 22 may include a visible marking, projection or other such feature that provides a visible indication of the axial position of the conduit gripping device 12 relative to the conduit end face 11. In this example, the position reference feature 22 and the conduit end face may both be visible to the user, allowing the user to visually determine whether or not the axial position CP (see FIG. 1) of the conduit 14 relative to the conduit gripping device 12 is a desired predetermined position. In one example, an aperture (e.g., a hole, slot, or cut-out) may be provided in the apparatus through which the conduit end face 11 and position reference feature 22 may be viewed to provide a visible indication of the axial position of the conduit gripping device 12 relative to the conduit end face 11.

As another example, the position reference feature 22 may include a projection, abutment or other surface feature that provides a tactile indication of the axial position of the conduit gripping device 12 relative to the conduit end face 11. In this example, the position reference feature may contact the conduit to allow the user to feel whether or not the axial position CP (see FIG. 1) of the conduit 14 relative to the conduit gripping device 12 is a desired predetermined position. For example, the position reference feature 22 may include a "no-go" pin that is prevented from full insertion in an opening in the apparatus when the conduit gripping device 12 is installed in the desired axial position. As still another example, a position reference feature 22 may include a slidable or rotatable stop collar assembled with the apparatus 20, such that the conduit end face 11 abuts the stop collar when the conduit gripping device 12 is installed in the desired axial position (or within an acceptable range of positions), impeding movement of the stop collar to indicate positioning of the conduit end at the desired axial position (or range of positions).

As still another example, the position reference feature 22 may include a mechanical or electrical gauging mechanism, such as, for example, a micrometer gauge, a spring-loaded dial gauge, an electrical switch, sensor, or other such electrical mechanism that generates an electrical signal to provide an indication of the axial position of the conduit gripping device 12 relative to the conduit end face 11 (e.g., when the conduit end face 11 contacts the electrical mechanism). In these examples, the position reference feature 22 is configured to sense the position of the conduit end face 11 and provide an output that indicates to the user whether or not the axial position CP (see FIG. 1) of the conduit 14 relative to the conduit gripping device 12 is a desired predetermined position. The position reference feature 22 may be configured to generate an electrical signal that indicates the axial position of the conduit gripping device 12 with respect to the conduit end face 11. An electronic interface of the position reference feature 22 may provide a visible or audible indication of the axial position based on the electrical signal.

Figure 2A:
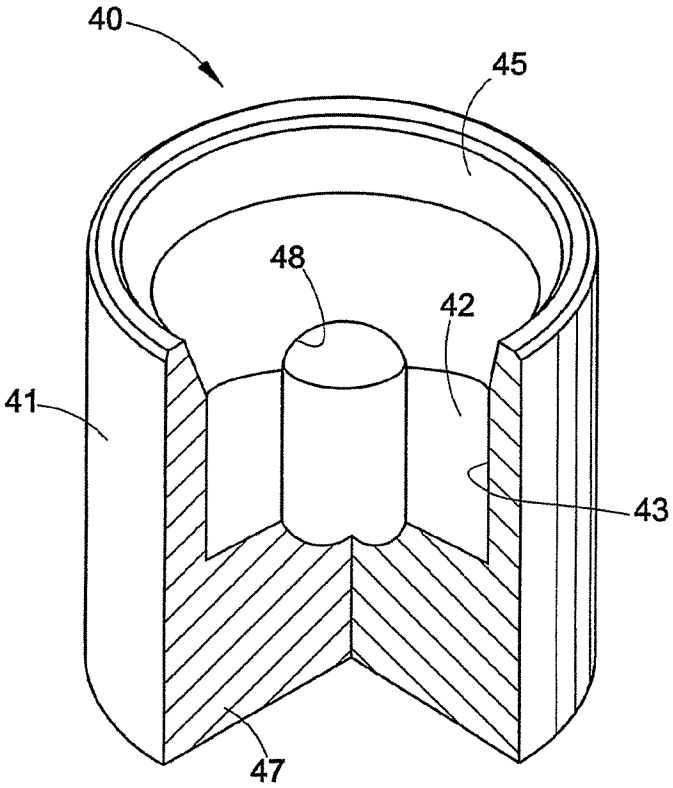
FIG. 2A illustrates a perspective view of an exemplary embodiment of a fitting assembly evaluation apparatus.

FIGS. 2A and 2B illustrate an exemplary embodiment of a fitting assembly evaluation apparatus 40 for evaluating the axial position of a conduit gripping device 12, such as ferrules 35, 35', installed on a conduit 14 (see FIG. 2B). The fitting assembly evaluation apparatus may be used to verify that the ferrules are properly pre-installed on the conduit. For example, the apparatus may be used to determine whether the distance between the drive surface 17 and the camming surface 30 is within an acceptable range and/or whether the position of the conduit gripping device 12 on the conduit is within an acceptable range (See FIG. 1A). As shown, the apparatus 40 includes a conduit end accepting portion 41 that defines a bore 43 in which the conduit end [14] *32* may be inserted. At an outer end of the bore 43, a conduit gripping device engaging portion 45 of the apparatus 40 is positioned to engage the conduit gripping device 12 (for example, ferrules 35, 35') when the conduit end is inserted in the bore 43. As shown, the conduit gripping device engaging portion 45 may be tapered to accommodate (e.g., to prevent marring of) the conduit gripping device 12. In one example, the tapered surface may match or otherwise accommodate an outer profile of the conduit gripping device (e.g., a tapered outer surface of a front ferrule 35). In some fitting assemblies, the installed conduit gripping device may experience some elastic relaxation or "spring-back" upon loosening the assembled fitting or installation apparatus. Accordingly, the depth of the bore 43 and the contour of the conduit gripping device engaging portion 45 may be configured to allow the conduit gripping device 12 to be forced back into an axial position of pre-determined gripping engagement (i.e. either a fully swaged or installed position—the position of the ferrules corresponding to an initial pull-up or a pre-installation position—the position of the ferrules corresponding to a pre-installation operation) with the conduit 14. The apparatus may be used to check for proper axial stroke of the drive surface 17 relative to the camming surface 30 after the pre-installation process.

The conduit end accepting portion 41 may be sized to accommodate a fitting coupling member [32] *52* (e.g., a female threaded fitting nut) that remains captive on the conduit 14 upon installation of the conduit gripping device 12 on the conduit. For example, the outer diameter of the conduit end accepting portion 41 may be sized such that the open end of a female threaded fitting nut [32] *52* fits over the conduit end accepting portion 41.

To verify the axial position of the conduit gripping device 12 on the conduit 14 (for example, with respect to the conduit end face), a position reference feature 22 may be positioned such that the axial distance (CP in FIG. 1) between the conduit gripping device engaging portion 25 and the position reference feature 22 corresponds to the axial distance (or range of acceptable distances) between a correctly installed conduit gripping device 12 and the conduit end face 31.

As shown in FIGS. 2A and 2B, a position reference feature 22 may include a radially extending base portion 42 of the apparatus 40. The base portion 42 is positioned such that when the conduit 14 is inserted in the bore 43 and the conduit gripping device 12 engages the conduit gripping device engaging portion 45, abutment of the conduit end face 31 with the base portion 42 or positioning of the conduit end face within a predetermined distance of the base portion 42 provides an indication that the conduit gripping device 12 has been installed on the conduit 14 in a desired axial position (e.g., a position consistent with bottoming of the conduit end [14] *32* in a fitting body). To facilitate visual verification of the position of the conduit end face 31 with respect to the base portion 42, one or more inspection apertures may be provided in the apparatus. For example, as shown in FIGS. 2A and 2B, one or both of a wedge shaped slice 47 and a radially extending hole 48 may be provided in the apparatus 40 to intersect the bore 43 for visual verification of the position of the conduit end face 31 with respect to the base portion 42. While the exemplary wedge-shaped slice 47 extends approximately 90° around the circumference of the apparatus 40, different sized slices may be utilized.

In an embodiment where the apparatus is used to confirm proper axial stroke and/or conduit position during the pre-installation process, a slice 47 will typically not be included. Rather, the hole 48 may be included for visual confirmation of the positioning of the conduit before the clamping of the pre-installation operation begins. This allows for a camming surface that extends completely around a perimeter of the apparatus.

According to another inventive aspect of the present application, a fitting assembly evaluation apparatus may additionally or alternatively be provided for evaluating an amount of axial compression of the conduit gripping device 12 (i.e. the reduction of the dimension S of FIG. 1) during installation of a conduit gripping device on a conduit end. In many fitting assemblies, as the conduit gripping device (e.g., ferrule or ferrules) is plastically deformed on the conduit during pull-up, the axial position of the fitting coupling member being tightened (e.g., a fitting nut and/or fitting body) with respect to the conduit gripping device changes. As such, an amount of axial stroke may be verified by inspecting the axial position of the fitting coupling member with respect to the conduit gripping device.

Figure 3:
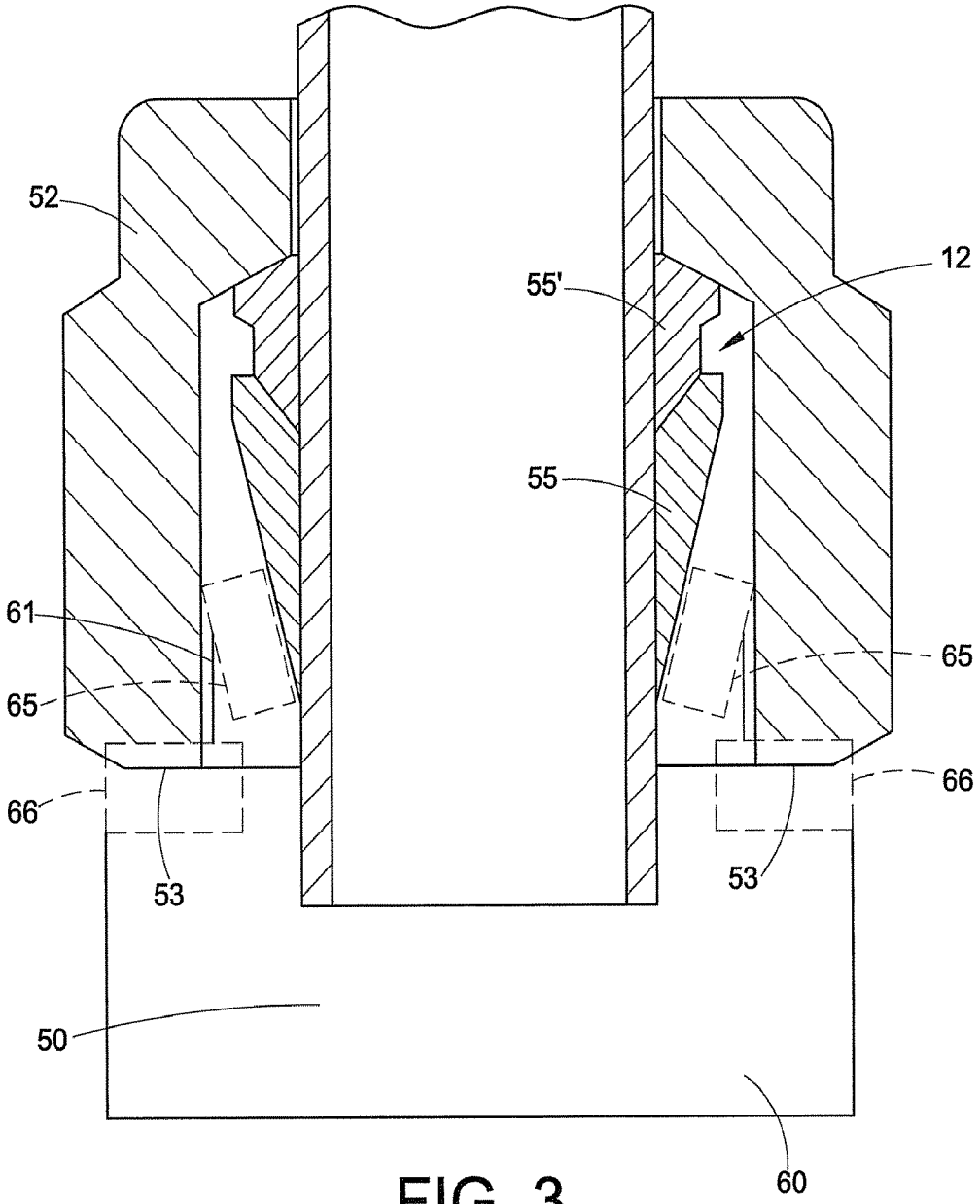
FIG. 3 illustrates a side cross-sectional schematic view of another fitting assembly evaluation apparatus, assembled with a conduit, conduit gripping device, and fitting coupling member.

A fitting assembly evaluation apparatus may also be utilized to evaluate an amount of axial stroke of a fitting coupling member during installation of a conduit gripping device on a conduit. This may be done concurrently with the installation and/or after the fitting assembly or installation apparatus has been separated from the conduit gripping device. In one such embodiment, the amount of axial advance or stroke may be gauged without threading the coupling member onto a mating coupling component. FIG. 3 illustrates a schematic view of [a] *an* apparatus 60 for monitoring fitting member axial stroke during (i.e. while the conduit gripping device is being axially compressed by the drive surface 17 and the camming surface [17] *30*) installation of a conduit gripping device (e.g., ferrules 55, 55') on a conduit 50 or for confirming fitting member axial stroke after (i.e. after the pre-installation clamping operation) installation of the conduit gripping device on the conduit. The apparatus 60 includes a conduit end accepting portion 61 having one or more conduit gripping device engaging features 65 configured to engage a portion of the conduit gripping device 12 (for example, ferrules 55, 55') to limit axial movement of the conduit gripping device 12 with respect to the conduit end accepting portion 61. The conduit end accepting portion 61 may be provided with many different structures or arrangements shaped to accommodate a conduit end, including, for example, a bore, recess, or planar wall. Likewise, the conduit gripping device engaging feature 65 may be provided in many different configurations, including, for example, a ridge, shoulder, or projection. In one embodiment, a conduit end accepting portion includes a bore sized to receive a conduit end, with an outer end of the bore including an edge or surface that functions as a conduit gripping device engaging feature. As shown, the apparatus 60 may be configured to accommodate a fitting coupling member 52 (e.g., a female threaded fitting nut) engaged with the conduit gripping device 12.

The exemplary apparatus 60 also includes an installation inspection feature, shown schematically at 66. According to an inventive aspect of the present application, the inspection feature 66 may be positioned such that an axial distance (or range of distances) between the conduit gripping device engaging feature 65 and the axial advance or stroke inspection feature 66 corresponds to a distance (or range of acceptable distances) between an axial position of the conduit gripping device 12 and a reference portion 53 (e.g., a leading end) of a coupling member 52 engaged with the conduit gripping device 12 when the coupling member has been axially advanced or stroked to a predetermined position during installation of the conduit gripping device 12. As a result, when the conduit 50 is positioned to engage the conduit gripping device 12 with the fitting engaging feature 65, as shown in FIG. 3, the coupling member leading end 53 aligns with the axial advance or stroke inspection feature 66 to provide an indication that the coupling member was axially advanced a predetermined amount during installation of the conduit gripping device 12 on the conduit 50. If the coupling member leading end 53 does not align with the axial advance or stroke inspection feature 66 upon engagement of the conduit gripping device 12 with the fitting engaging feature 65, an indication that the predetermined axial advance or stroke is not correct is provided. As used herein, "alignment" of the coupling member leading end 53 with the axial advance or stroke inspection feature 66 may include, for example, abutment against or contact with the axial advance inspection feature, a visible overlap with the axial advance or stroke inspection feature, or obscuring of the axial advance or stroke inspection feature.

The axial advance evaluation feature 66 may be provided in many different configurations, and may provide for many different types of verification of axial position of the coupling member 52 relative to the conduit gripping device 12. As one example, the axial advance evaluation feature 66 may include a visible marking, projection or other such feature that provides a visible indication of the axial position of the coupling member 52 relative to the conduit gripping device 12. As another example, the axial advance or stroke evaluation feature 66 may include a projection, abutment or other surface feature that provides a tactile indication of the axial position of the coupling member 52 relative to the conduit gripping device 12. As still another example, the axial advance or stroke inspection feature 66 may include a mechanical or electrical gauging mechanism, such as, for example, a micrometer gauge, a spring-loaded dial gauge, an electrical switch, sensor, or other such electrical mechanism that generates an electrical signal to provide an indication of the axial position of the coupling member 52 relative to the conduit gripping device 12 (e.g., when the coupling member 52 contacts the electrical mechanism 66).

Figure 4:
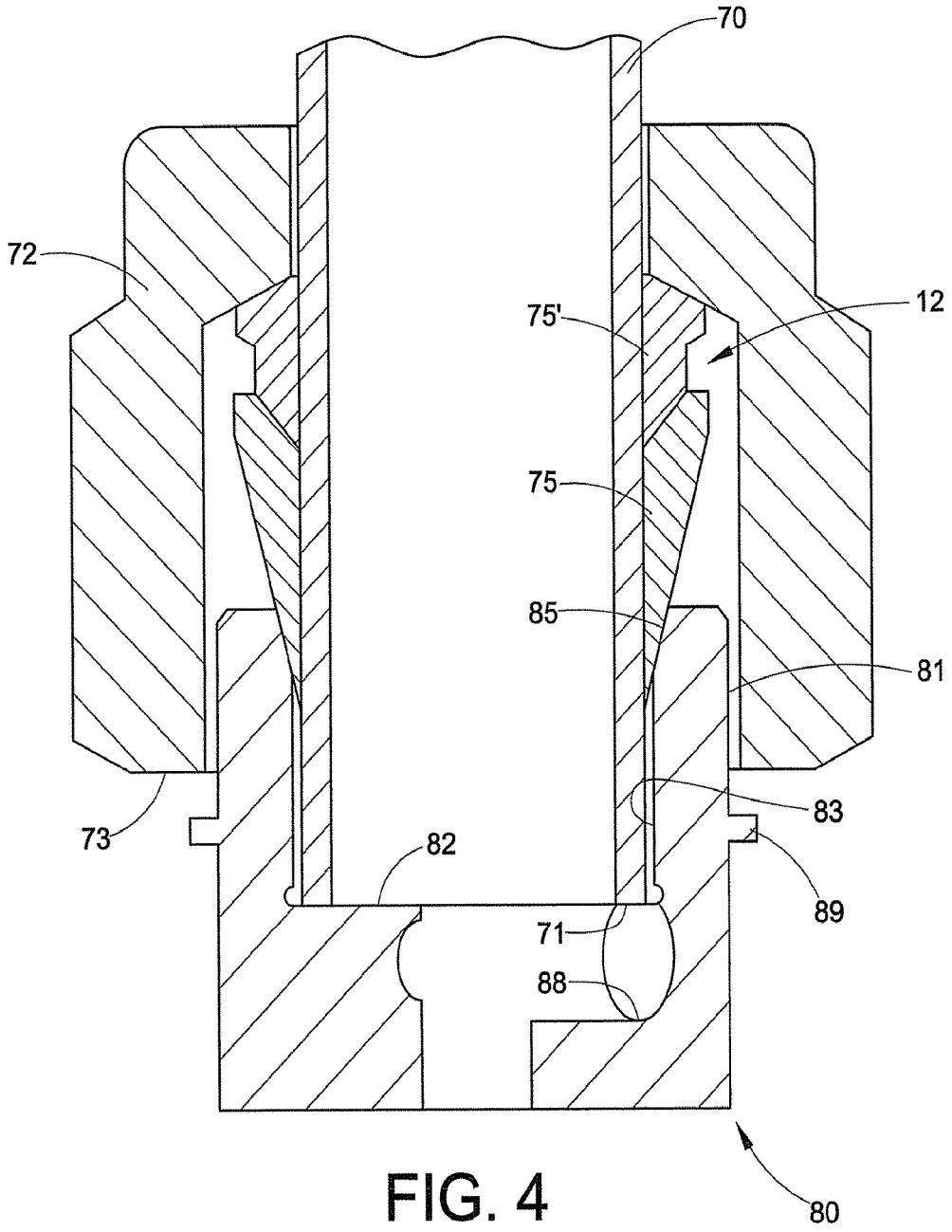
FIG. 4 illustrates a side cross-sectional view of an exemplary embodiment of a fitting assembly evaluation apparatus, assembled with a conduit, conduit gripping device, and fitting coupling member.

FIG. 4 illustrates an exemplary embodiment of a fitting assembly evaluation apparatus 80 for verifying an amount of axial advance or stroke of a fitting coupling member after installation (i.e. after a clamping operation where the conduit gripping device is compressed by axial advance of the drive surface 17 relatively toward the camming surface 30) or during installation (i.e. during the clamping operation) of a conduit gripping device 12 (e.g., ferrules 75, 75') on a conduit 70. As shown, the apparatus 80 includes a conduit end accepting portion 81 that defines a bore 83 in which the conduit end 70 may be inserted. At an outer end of the bore 83, a conduit gripping device engaging portion 85 of the apparatus 80 is positioned to engage the conduit gripping device 12 when the conduit end 70 is inserted in the bore 83. As shown, the conduit gripping device engaging portion 85 may be tapered to accommodate (e.g., to prevent marring of) the conduit gripping device and/or to act as the camming surface for pre-installing the conduit gripping device onto the conduit. In one example, the tapered surface of the engaging portion 85 may accommodate an outer profile of the conduit gripping device 12 (e.g., a tapered outer surface of a front ferrule 75). In some fitting assemblies, the installed conduit gripping device may experience some elastic relaxation or "spring-back" upon spreading apart of the drive surface and camming surface of the assembled fitting or installation apparatus. Accordingly, the position of the bore 83 and the contour of the fitting engaging portion 85 may be configured to allow the conduit gripping device to be forced back into an axial position of full previous gripping engagement with the conduit. Further, the conduit end accepting portion 81 is sized to accommodate a fitting coupling member 72 (e.g., a female threaded fitting nut) that remains captive on the conduit 70 upon installation of the conduit gripping device 12 on the conduit. In the illustrated embodiment, the outer diameter of the conduit end accepting portion 81 may be sized such that the open leading end 73 of the coupling member 72 fits over the conduit end accepting portion 81.

An axial advance or stroke inspection feature 89 is included to evaluate whether the fitting coupling member is axially advanced or stroked by the predetermined amount during installation of the conduit gripping device 12 on the conduit 70 (by gauging the axial position of the coupling member with respect to the conduit gripping device). The axial advance or stroke inspection feature 89 comprises a radially extending shoulder in FIG. 4. The axial advance inspection feature 89 may be positioned such that the leading end of the coupling member 72 is in engagement with or is within a predetermined distance of the inspection feature when a conduit gripping device has been axially compressed a predetermined distance or within a predetermined range of distances.

As shown in FIG. 4, the apparatus 80 may, but need not, also be configured to allow for verification of the axial position of a conduit gripping device installed on the conduit, consistent with the apparatus 40 of FIG. 2. As such, the apparatus 80 may include a position reference feature (such as, for example, a radially extending base portion 82) positioned such that when the conduit is inserted in the bore 83 to engage the conduit gripping device with the fitting engaging portion 85 of the apparatus 80, abutment of the conduit end face 71 with the base portion 82 or positioning of the conduit end face 71 within a predetermined distance from the base portion provides an indication that the conduit gripping device has been installed on the conduit in a desired axial position (e.g., a position consistent with bottoming of the conduit end in a fitting body). To facilitate visual verification of the position of the conduit end face with respect to the base portion 82, one or more evaluation apertures may be provided in the apparatus 80. For example, one or both of a wedge shaped slice (not shown) and a radially extending hole 88 may be provided in the apparatus 80 to intersect the bore 83 for visual verification of the position of the conduit end face with respect to the base portion 82.

Figure 5:
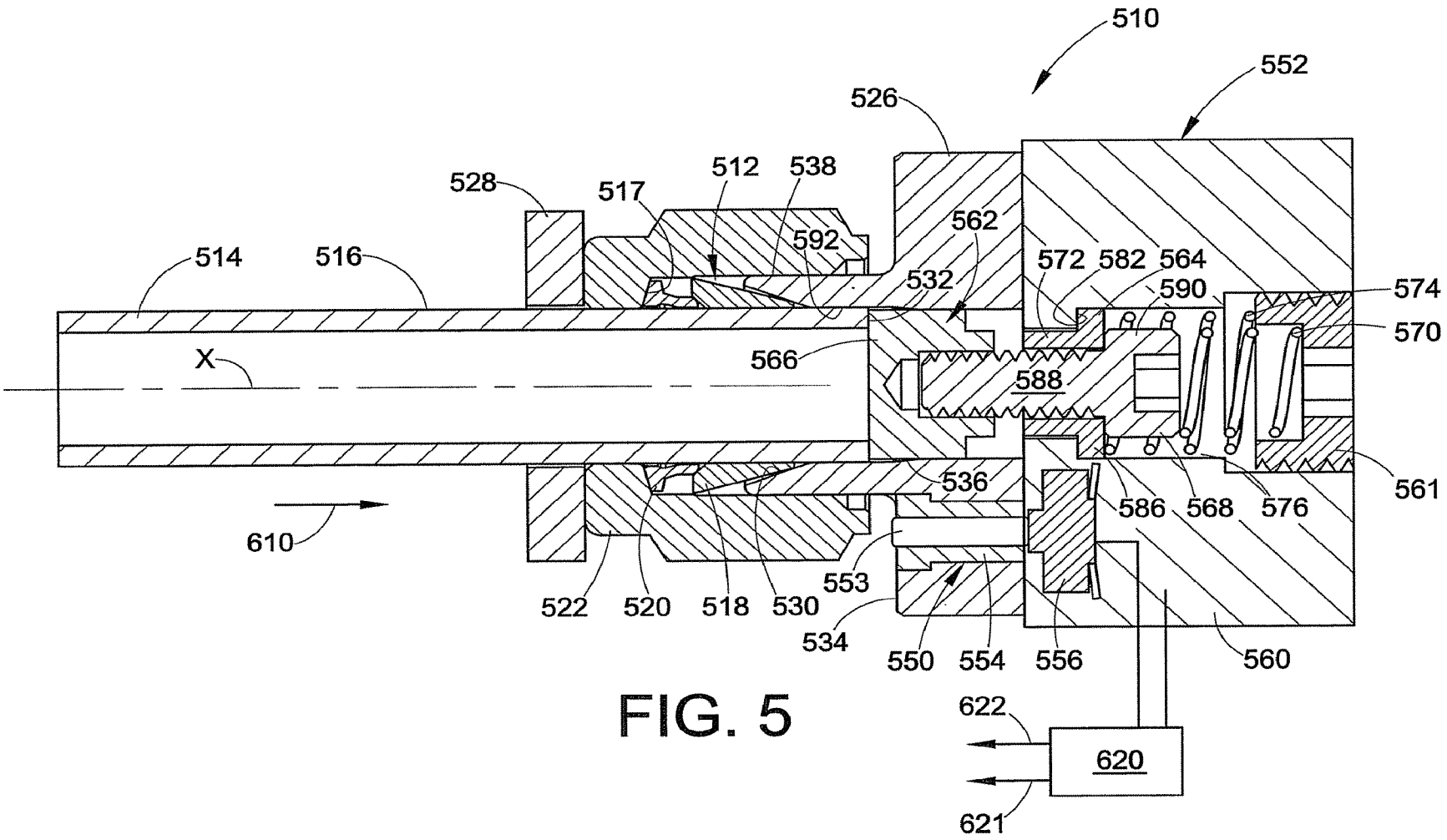
FIG. 5 is a cross-sectional view of a conduit gripping device disposed around a conduit in an apparatus for installing conduit gripping devices on conduits of a first exemplary embodiment.

FIGS. 5-16 illustrate an exemplary embodiment of an apparatus 510 for pre-installing a conduit gripping device 512 onto an outer wall 516 of a conduit 514 where a position of a drive surface 517 and/or a position of an end 532 of the conduit is sensed during the pre-installation. In the example illustrated by FIGS. 5-16, the drive surface 517 is the drive surface of a fitting nut 522. A such, the position of the drive surface 517 may be sensed by sensing the position of the fitting nut 522. In one exemplary embodiment, the position of the fitting nut 522 and/or the position of the conduit end 532 relative to a camming surface 530 for pre-installing the conduit gripping device 512 is sensed. In the example illustrated by FIGS. 5-16, the camming surface 530 is a surface of an anvil 526. These positions may be sensed by a nut position sensor 550 and a conduit end position sensor 552. Referring to FIG. 5, the conduit gripping device 512 includes a front ferrule 518, and a rear ferrule 520. However, as is noted above, the conduit gripping device 512 can take a wide variety of different forms. The conduit gripping device 512 can be any arrangement that grips a conduit 514 and facilitates fluid tight sealing with a fitting body (see FIG. 23A, ref no. 2312). In the illustrated embodiment, the fitting nut 522 is disposed around the conduit 514 and the conduit gripping device 512. The fitting nut 522 facilitates assembly of the conduit gripping device 512 and the conduit 514 with a fitting body as is well known in the art. The illustrated fitting nut 522 is a female threaded nut with internal threads, but could also be a male threaded nut with external threads.

Figure 7:
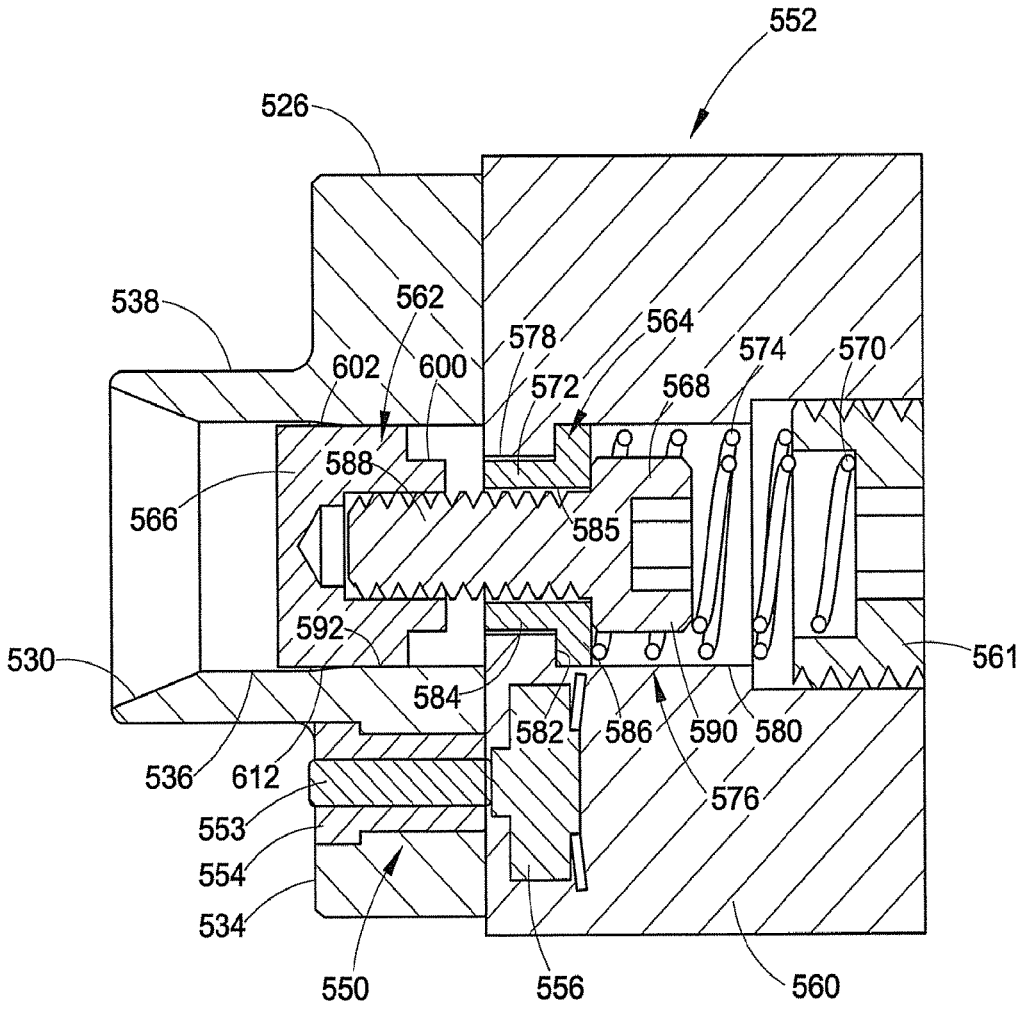
FIG. 7 is a cross-sectional view of an anvil and sensor assembly of the apparatus as shown in FIG. 5.
Figure 8:
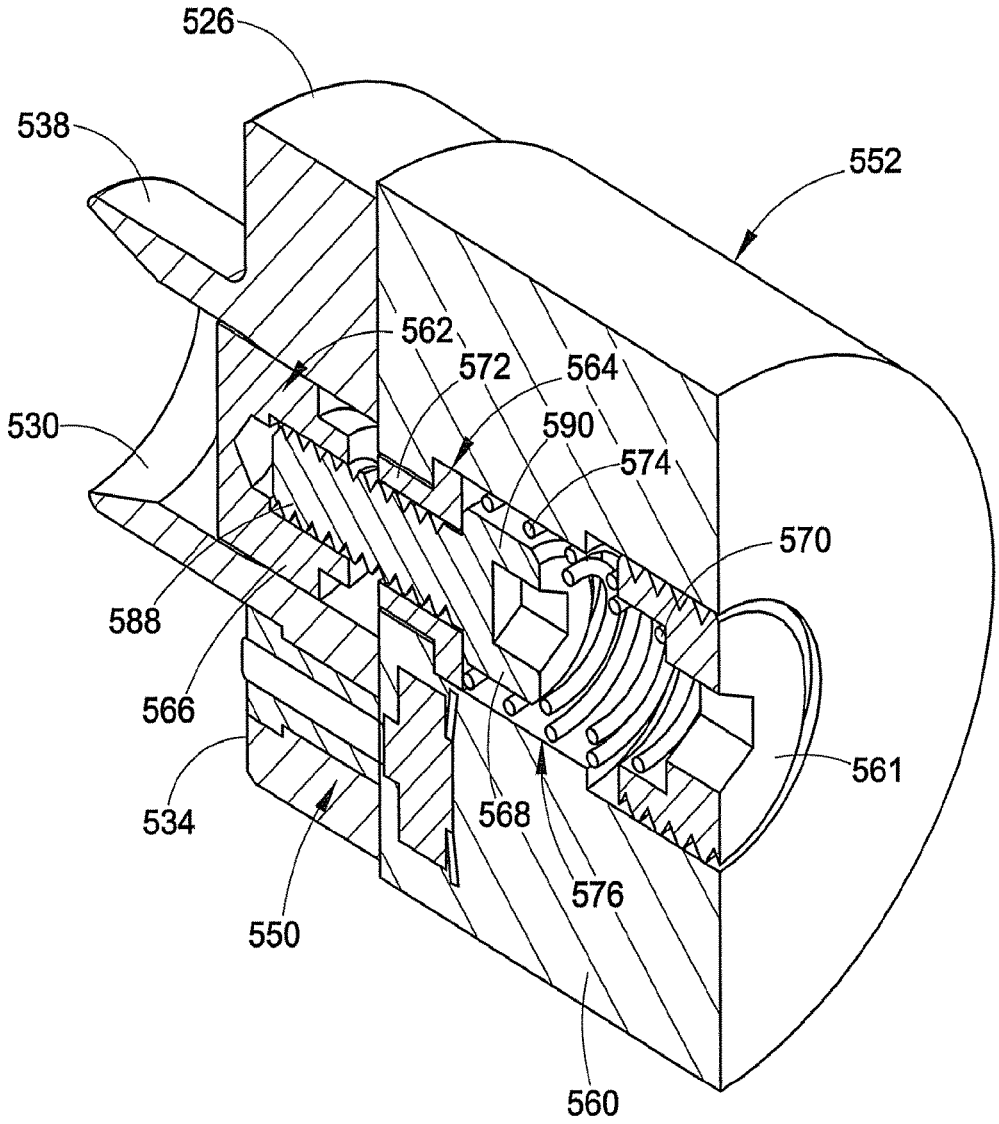
FIG. 8 is a sectioned perspective view of the anvil and sensor assembly as shown in FIG. 7.
Figure 11:
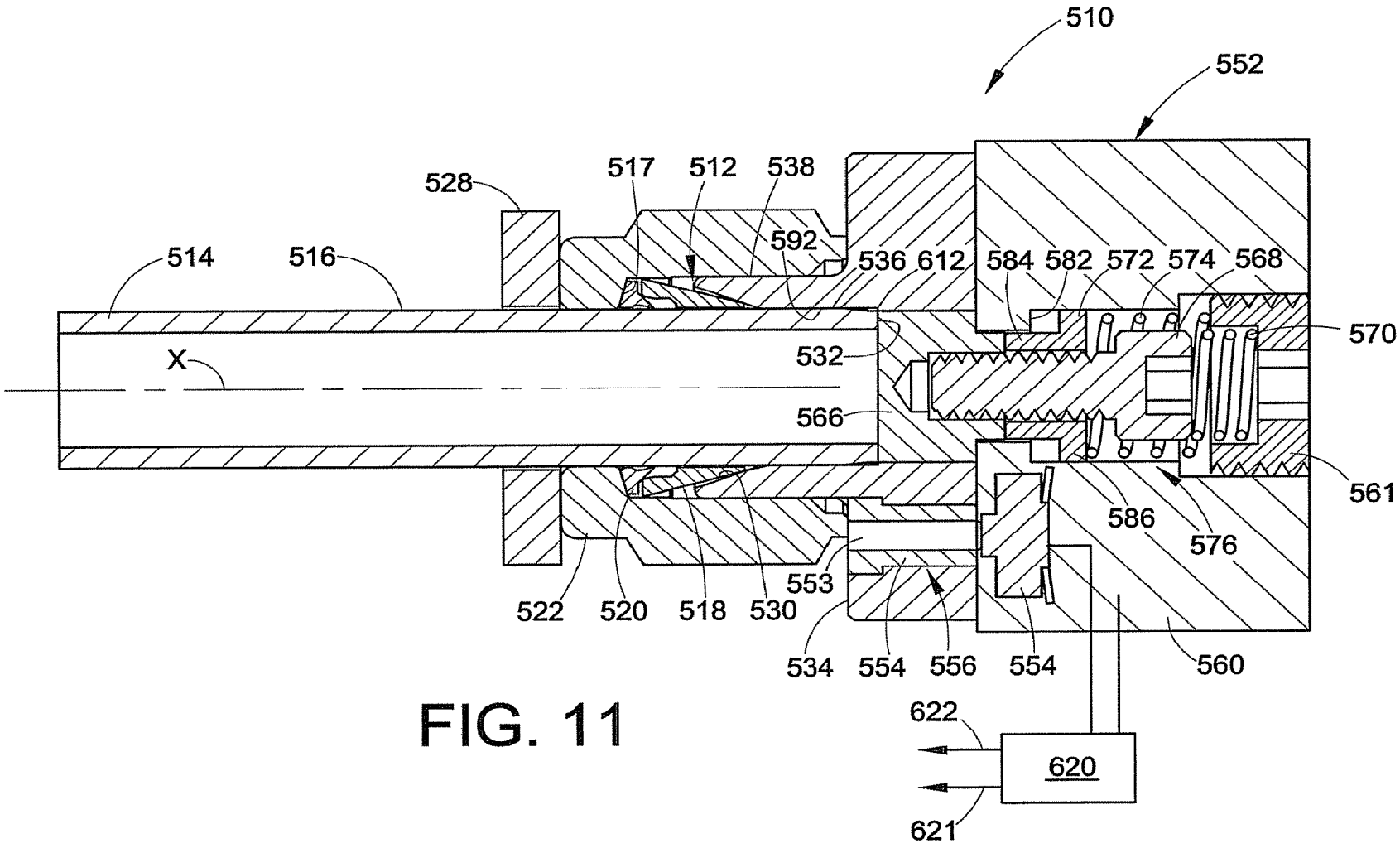
FIG. 11 is a cross-sectional view of the apparatus of FIG. 5 in a clamped position that causes the conduit gripping device to be installed on the conduit end.
Figure 12:
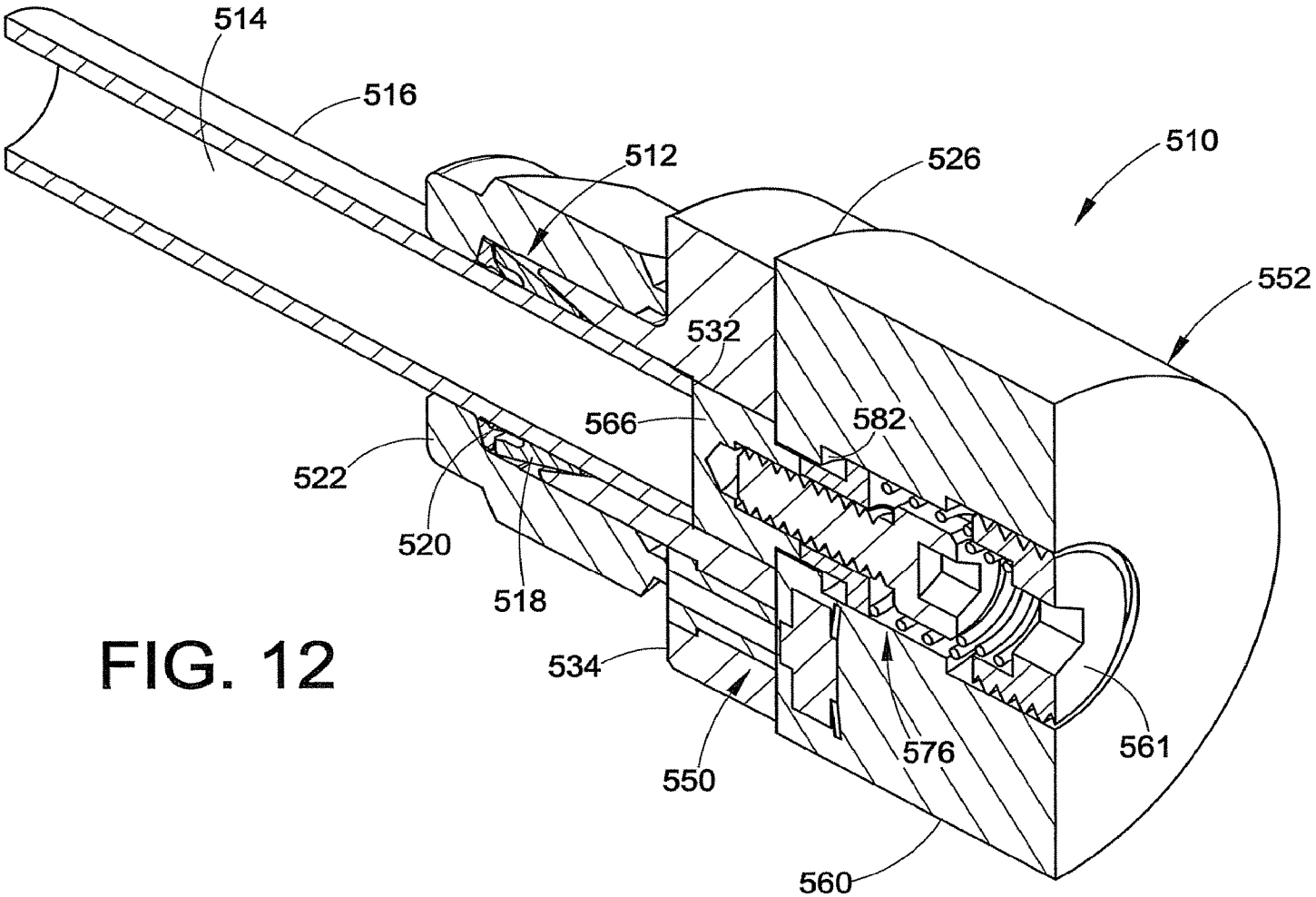
FIG. 12 is a sectioned perspective view of the apparatus shown in FIG. 11.

Referring to FIGS. 5 and 11, the apparatus 510 includes the anvil 526 and a clamping device 528. The anvil 526 can take a wide variety of different forms and can be used with or without the nut position sensor 550 and/or the conduit end position sensor 552. For example, the anvil 526 can take any configuration that forces at least a portion of the conduit gripping device 512 radially inward to retain the conduit gripping device 512 on the conduit. The anvil 526 may be any member or assembly that includes a camming mouth or surface. In an exemplary embodiment, the anvil 526 is configured such that after the conduit gripping device 512 is retained on the conduit 514, the conduit gripping device 512 can be assembled with a fitting body (not shown) and be forced further radially inward such that the conduit gripping device grips and seals the conduit and forms a seal with the fitting body. Referring to FIGS. 7 and 8, the illustrated anvil 526 includes a frusto-conical camming mouth 530 that forms a camming angle with respect to a longitudinal axis X (See FIG. 5) of the conduit 514. In an exemplary embodiment, the angle that the camming mouth 530 forms with respect to the longitudinal axis X is the same angle that a camming mouth of a fitting body (not shown) will form with respect to the conduit when the conduit gripping device 512 is assembled with the fitting body. However, in other embodiments, the camming mouth 530 may be formed at a different angle than the camming mouth of the fitting body that the conduit gripping device will be assembled in.

In one exemplary embodiment, the anvil 526 is optionally configured to control the stroke of the nut 522 during the clamping operation of the apparatus 510. Referring to FIGS. 5 and 11, the stroke is the axial distance the nut 522 moves toward the anvil 526 as the nut drives the rear ferrule 520, which drives the front ferrule 518 into the camming mouth 530.

In many applications, proper assembly of conduit fittings is ensured by controlling axial advancement of the nut toward the fitting body. This can be done in a variety of different ways. For example, a fitting that has not been pre-installed onto the conduit by the apparatus of the present application or by another pre-installing apparatus can be installed on a conduit and the nut is tightened to a finger tight position. Then, the nut is tightened a specified number of turns (one and a half turns, for example) to axially advance the nut a controlled distance and ensure proper pull-up of the fitting (i.e. to ensure proper gripping and sealing of the conduit gripping device with the conduit and proper sealing of the conduit gripping device with the fitting body, typically at the caroming mouth 30). However, when the conduit gripping device 512 is pre-installed or on the conduit 514, the axial advance needed to properly pull-up the fitting is less than the axial advance of the nut that is needed when the conduit gripping device is not pre-installed on the conduit. In the embodiment illustrated by FIGS. 5 and 6, the anvil 526 includes a stop surface 534 that controls the stroke of the nut during clamping by the apparatus 510, for example by engaging the nut at the appropriate stroke. This engagement controls the amount of compression of the conduit gripping device. The position of the stop surface 534 may be set at any predetermined position such that after the conduit gripping device 512 is installed by the apparatus 510, a predetermined additional axial advance needed to properly pull-up the fitting is set. For example, the position of the stop surface 534 may be set such that when the pre-installed conduit gripping device 512 is installed in a fitting body, the nut is assembled to a finger tight position and then rotated a prescribed number of turns (½ turn for example) to properly pull-up the fitting. Alternatively, the position of the stop surface 534 may be set such that when the pre-installed conduit gripping device 512 is installed in a fitting body a predetermined torque (which may be a discrete value or range of torque values to account for tolerances in torque application tools) may be applied to properly pull up the fitting.

Other manners in which the axial advance of the nut with respect to the fitting body can be controlled are providing the fitting with a positive stop or a torque rise at a predetermined axial advance. Examples of ways a fitting may provide a positive stop include, but are not limited to, configuring the nut to engage the fitting body or engage a stop ring assembled with the fitting body at the predetermined axial advance. Examples of ways a fitting may provide a torque rise include, but are not limited to, configuring the nut to engage the fitting body at the predetermined axial advance, configuring the nut to engage a stop ring assembled with the fitting body at the predetermined axial advance, providing inclined surfaces that are engaged at the predetermined axial advance, configuring the nut to engage a stop ring that has one or more inclined surfaces that is assembled with the fitting body at a predetermined axial advance, providing a member that is elastically or plastically deformed at the predetermined axial advance. The structures disclosed in U.S. Pat. No. 7,066,496, for FITTING WITH SEPARABLE GRIPPING DEVICE FOR PIPE AND TUBE, U.S. Pat. No. 7,497,483 for FITTING FOR TUBE AND PIPE WITH CARTRIDGE, United States Patent Application Publication Pub. No.: 2009/0289452 for PULL-UP BY TORQUE FITTING, World Intellectual Property Organization International Publication Number WO 2009/020900 A2, U.S. provisional patent application Ser. No. 61/154,144 filed on Feb. 20, 2009, for CONDUIT FITTING WITH TORQUE COLLAR, U.S. provisional patent application Ser. No. 61/154,139 filed on Feb. 20, 2009, for CONDUIT FITTING WITH GROOVED TORQUE COLLAR, U.S. provisional patent application Ser. No. 61/154,136 filed on Feb. 20, 2009, for CONDUIT FITTING WITH SPLIT TORQUE COLLAR, U.S. patent application Ser. No. 12/709,084 filed on Feb. 19, 2010, for CONDUIT FITTING WITH TORQUE COLLAR, International application no. PCT/US10/24767 filed on Feb. 19, 2010 for CONDUIT FITTING WITH TORQUE COLLAR, and International application no. PCT/US10/24770 filed on Feb. 19, 2010 for CONDUIT FITTING WITH SPLIT TORQUE COLLAR are adapted to control axial advance of a nut with respect to a fitting body or may be adapted to control axial advance of a nut with respect to a fitting body, and are all fully incorporated herein by reference in their entirety.

Figure 23A:
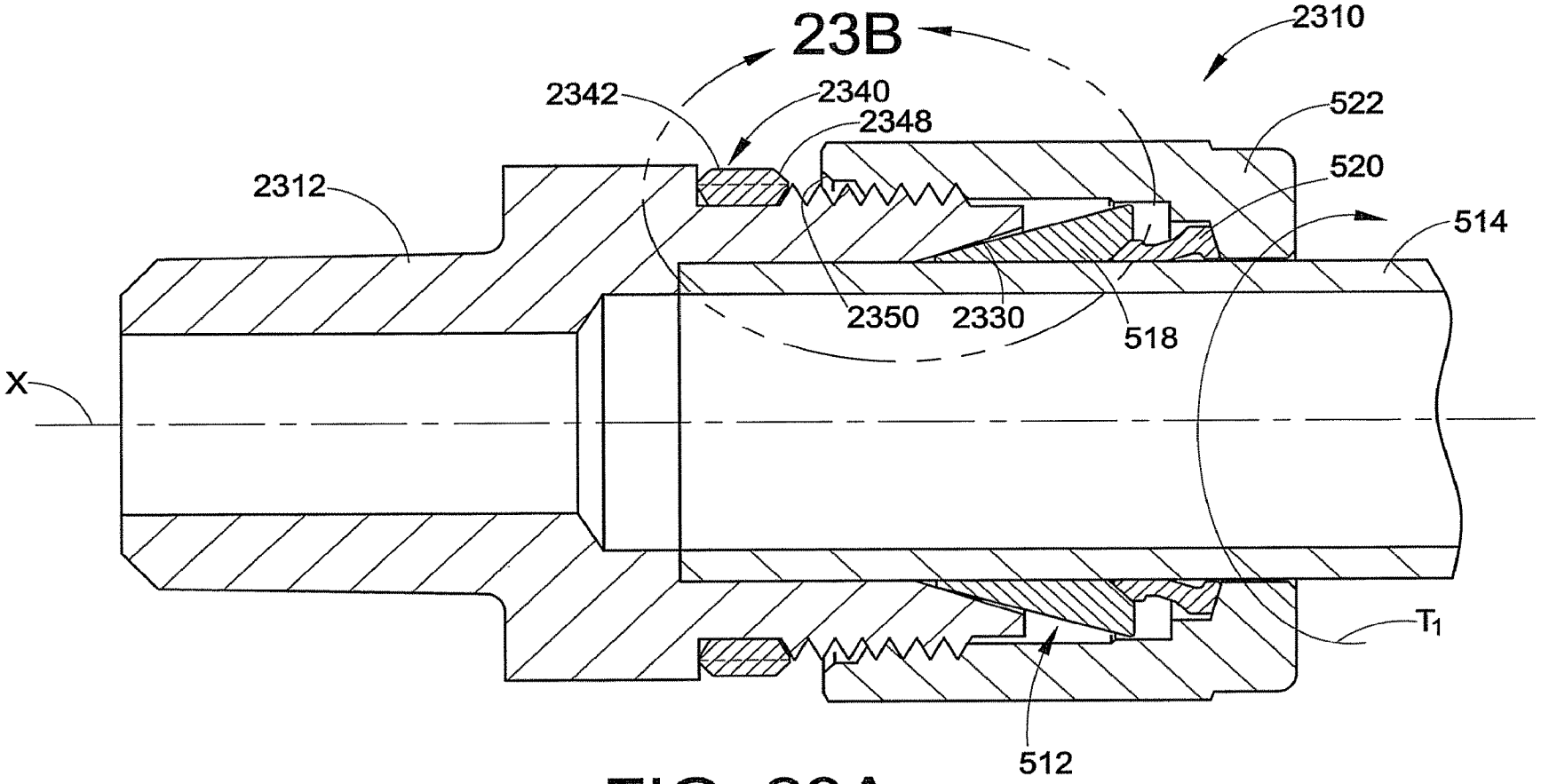
FIG. 23A is a sectional view of a ferrule-type fitting that is adapted to provide a torque rise that is indicative of completed pull-up at an appropriate predetermined axial advance
Figure 23B:
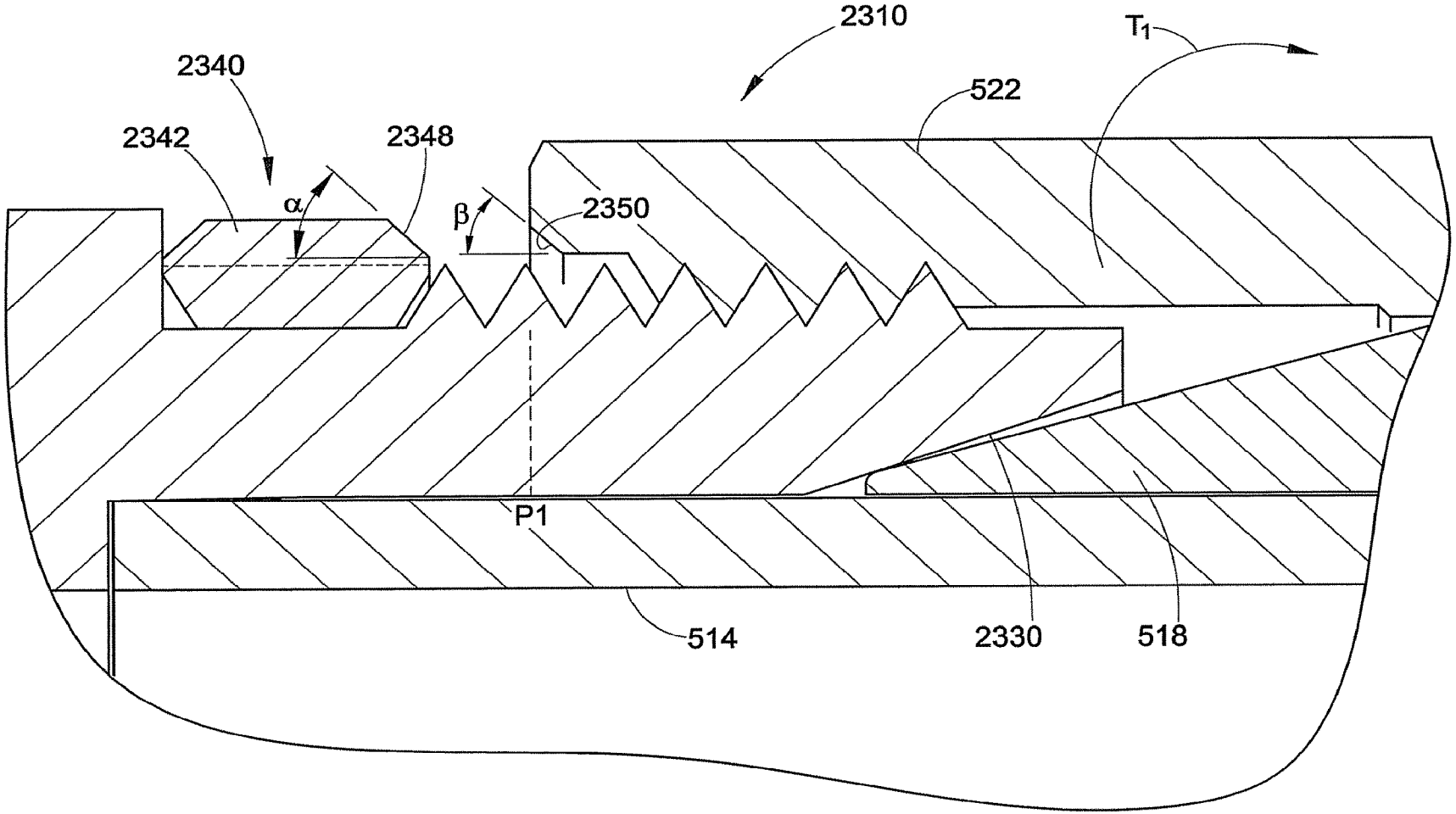
FIG. 23B is an enlarged view showing the portion indicated in FIG. 23A.
Figure 23C:
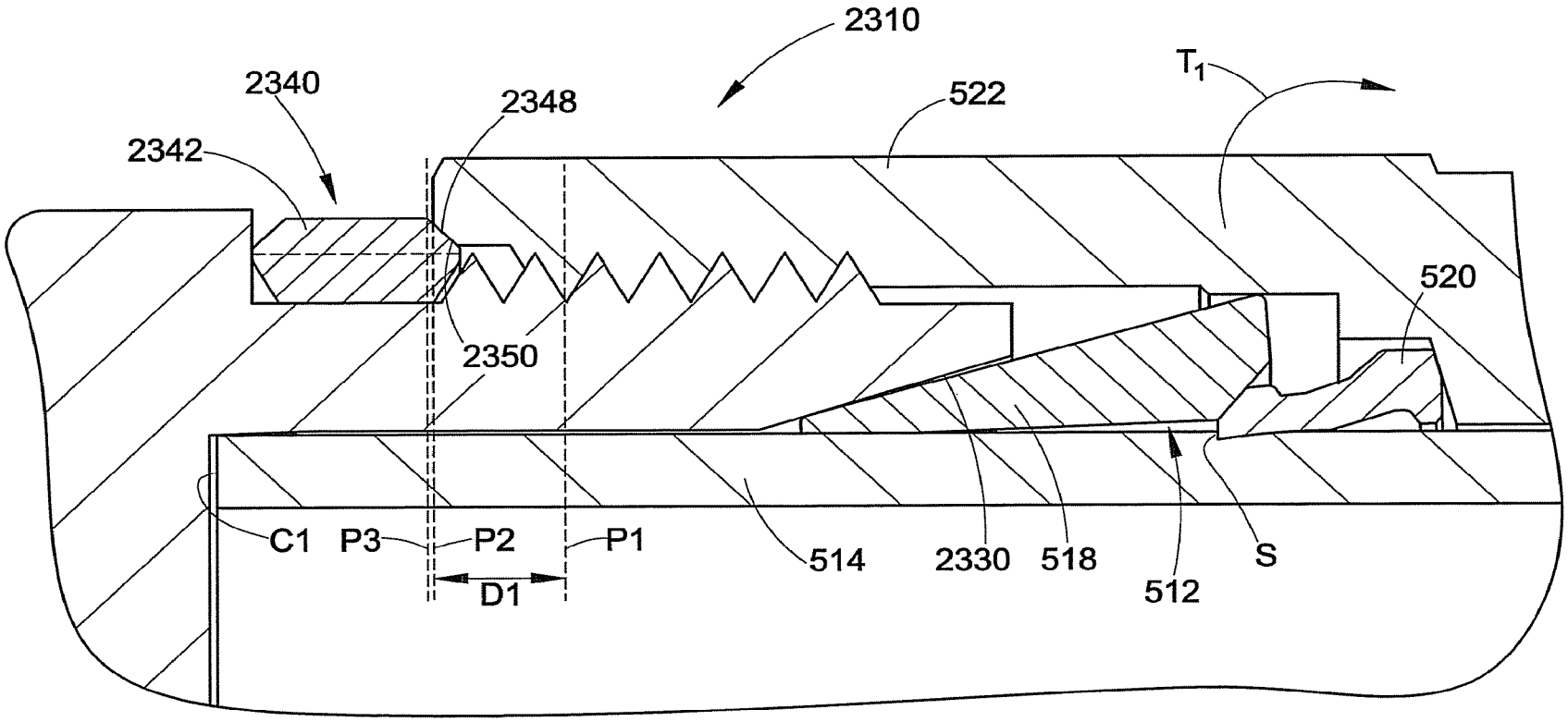
FIG. 23C is a view similar to FIG. 23B showing the fitting in a pulled-up position.

FIGS. 23A-23C illustrate one of the many ways a fitting may be adapted to provide a torque rise that is indicative of completed pull-up at an appropriate predetermined axial advance. In one embodiment, a torque collar 2340 may be included with a fitting 2310 to facilitate pull up by torque. The torque collar 2340 may be realized for example, in the form of an annular ring-like body 2342.

The torque collar 2340 concept works in part because the torque collar achieves two interrelated effects. First, during pull up and/or after a desired amount of axial displacement or stroke of the nut relative to the body, the torque collar 2340 will come into contact with the nut 522, thus establishing a known axial displacement or stroke of the nut 522 relative to a fitting body 2312 past the finger-tight position. As is explained above, the finger tight position may be the position where the nut 522 first begins compressive engagement of the conduit gripping device 512 after pre-installation on a conduit 514. Alternatively, the finger tight position may be the position where the nut 522 first begins compressive engagement of the conduit gripping device 512 that has not been pre-installed on a conduit. Second, the torque collar 2340 will effect a significant and perceptible increase in pull up torque when the nut 522 has advanced sufficiently to assure that the fitting 2310 has been completely pulled up. This torque increase will be sensed as a distinct and optionally sharp rise in torque needed to further turn the nut 522 relative to the body 2312. Stated another way, the assembler will feel or sense a significant increase in resistance of the nut 522 to turning relative to the body 2312. There will be a distinct limiting of the stroke of the nut 522 accompanied by a readily apparent increase in torque that would be needed to try to further advance the nut. This distinct rise in torque will be preferably greater than the usual increase in torque that naturally occurs as a fitting is tightened to its final completed pulled up position, but in any event will be accompanied by a limiting of the nut stroke.

As is described in U.S. patent application Ser. No. 12/709,084 filed on Feb. 19, 2010, for CONDUIT FITTING WITH TORQUE COLLAR, International application no. PCT/US10/24767 filed on Feb. 19, 2010 for CONDUIT FITTING WITH TORQUE COLLAR, and International application no. PCT/US10/24770 filed on Feb. 19, 2010 for CONDUIT FITTING WITH SPLIT TORQUE COLLAR the fitting may be pulled up or pulled up and remade one or more times before the toque collar 2340 is engaged to provide a further torque rise. For example, the fitting may be pulled up by turns with a space or gap remaining between the torque collar and the fitting body and/or a gap remaining between the torque collar and the nut. One or more additional remakes by turns or by applying a predetermined torque may be possible before the torque collar is engaged. Further, the fitting may be pulled up by torque with a space or gap remaining between the torque collar and the fitting body and/or a gap remaining between the torque collar and the nut. One or more additional remakes by turns or by applying a predetermined torque may be possible before the torque collar is engaged. The torque collar 2340 may be integral with the fitting body and/or the nut or the torque collar may be separate. Details of this embodiment are disclosed in the applications referred to above that were filed on Feb. 19, 2010, and is therefore not repeated here.

The illustrated torque collar 2340 also includes a wedge surface 2348 that contacts a nut taper surface 2350 at the open end of the nut 522. The wedge surface [2350] *2348* may be, for example, a frusto-conical surface although other shapes and profiles may be used as needed. The nut taper surface 2350 may also be frusto-conical or any other shape as needed. As viewed in cross-section, the wedge surface 2348 may be formed at an angle $\alpha$ relative to the central axis X (FIG. 23B) of the torque collar 2340. As viewed in cross-section, the nut taper surface 2350 may be formed at an angle $\beta$ relative to the central longitudinal axis of the nut, which in the case of most fittings is also the axis X.

As evident from FIGS. 23A and 23B, when the fitting 2310 is in the finger-tight position, the nut taper surface 2350 is axially spaced from the wedge surface 2348, and after a completed pull up, the nut taper surface 2350 is axially pressed against the wedge surface 2348. We refer to the torque collar surface 2348 as a wedge surface because that surface acts to significantly resist axial advance of the nut after the nut taper surface 2350 first makes contact with the wedge surface 2348. This contact produces a distinct and optionally sharp increase in torque that can be either sensed by the assembler or that will allow a torque wrench to be used to make up the fitting 2310. The angles α and β may be but need not be the same. We have found that an angle α of about 45 degrees works particularly well, but many different angle values may be used. As the angle α approaches ninety degrees, the torque collar 2340 basically acts as a positive stop. While this is acceptable for an initial pull up by torque, it does not allow for remakes, especially a number of remakes of about twenty-five or more. As the angle α approaches zero, the torque collar 2340 will present less and less resistance to axial advancement of the nut 522 relative to the body and therefore might not present a distinct enough limit on the stroke of the nut with increasing torque. However, depending on the material of the torque collar 2340 and the surface 2348 hardness and friction (similarly for the nut taper surface 2350), shallow angles as low as ten degrees may work fine in many applications. The upper bound on the angle α will also depend on the desired number of remakes and the amount of torque increase that is desired, but angle values for a may be as high as seventy-five degrees or more depending on the overall required performance.

The nut taper surface 2350 will initially contact the wedge surface 2348 as the fitting 2310 is pulled up. Further advance of the nut 522 relative to the body 2312 will cause the forward portion 2356 of the torque collar 2340 to enter the frusto-conical recess defined by the nut taper surface 2350 with tighter and tighter engagement between the wedge surface 2348 and the nut taper surface 2350. This will result in a distinct and significant increase in torque compared to the torque that would otherwise be noted for the same nut stroke if the torque collar 2340 were not present. The torque collar 2340 and the nut 522 cooperate during pull up to produce a distinct and perceptible increasing torque to a torque value that will correspond with proper make up of the fitting 2310. In other words, the torque collar 2340 and the nut 522 are designed to produce a distinct torque value due to the increasing load between the nut 522 and the torque collar 2340 that corresponds to a desired or needed axial displacement or stroke of the nut 522 relative to the body to effect proper conduit grip and seal for a completely made up fitting.

As illustrated in FIG. 23C, this cooperation between the torque collar 2340 and the nut 522 may result in significant surface to surface contact and load between the wedge surface 2348 and the nut taper surface 2350, but this drawing is only intended to be exemplary. The actual amount of contact for initial pull up as well as one or more remakes will be determined by overall design criteria for the fitting 2310.

As illustrated in FIG. 23C, upon complete pull up, the front ferrule 518 has been radially compressed by the body camming surface 2330 to form a fluid-tight seal against the camming surface 2330 and against the conduit 514. A forward portion of the back ferrule 20 has also been radially compressed so that the back ferrule preferably bites into the conduit 514 to form the shoulder S (see FIG. 23C). However, the inventions herein may be used with fitting designs in which the back ferrule does not necessarily bite into the conduit.

Another aspect of the torque collar 2340 is to allow remakes of the fitting 2310. This is accomplished by designing the torque collar 2340 to allow further axial advance of the nut 522 relative to the body 2312 for each remake, relative to the axial position of the nut 522 relative to the body 2312 for the just prior remake. For example, assume that FIG. 23C represents the initial or first complete pull up of the fitting 10. The nut 522 has axially advanced from a position P1 when the fitting 2310 was in the finger-tight position (FIG. 23B) to a position P2 for the fitting 2310 in the complete pulled up position. At the complete pulled up position P2, the conduit gripping device 512 is compressed by an amount that causes the conduit gripping device to grip and seal the conduit. The distance D1 (from P1 to P2) corresponds then to the axial advance of the nut 522 relative to the body 512 for a complete pull up. Next assume the fitting 2310, having been initially pulled up, is then disassembled. For remake of the fitting 2310, the parts are reassembled and the nut 522 typically can be easily turned to position the nut 522 at P2 because the conduit and ferrules have already been compressed and plastically deformed somewhat. This will also mean that the torque collar 2340 is in contact with the nut 522, but there likely will be a rather low load between the two. The nut 522 can then be further axially advanced until the torque again distinctly increases. For example, the nut 522 may advance to position P3 in order to effect adequate seal and grip (i.e. remake). At the remake position P3, the conduit gripping device 512 is compressed by an amount that causes the conduit gripping device to grip and reseal the conduit. The amount of compression of the conduit gripping device 512 at the position P3 is greater than the amount of compression of the conduit gripping device at position P2. In FIG. 23C the distance from P2 to P3 is exaggerated for clarity. In practice, each remake typically causes a small further axial advance of the nut 522 relative to the body 2312. For example, for a quarter inch tube fitting (meaning for example that the nominal conduit outside diameter is about a quarter inch), each remake may require further advance of about 0.1 thousandth of an inch to about ten thousandths of an inch to properly remake the fitting 2310.

In this embodiment then, the wedge surface 2348 thus allows for remakes by allowing for further axial advance of the nut 522 relative to the body 2312. However, other surface profiles may be used to provide the desired torque increase relative to stroke of the nut while also allowing for one or more remakes. We have found that the angle α of about forty-five degrees can result in twenty-five or more remakes. The torque increase is also a function of the shape of the nut taper surface 2350. The designer may choose those shapes and angles that best achieve the desired performance for pull up by torque and remakes.

Many factors will influence the final design, including but not limited to the hardness of the torque collar 2340, surface characteristics of the wedge surface 2348 and the nut taper surface 2350 to effect desired friction between the torque collar 2340 and the nut 522, and the angles α and β. As general criteria, for fittings that will be used with high strength alloy metal conduits such as stainless steel, the body and nut are commonly also made of stainless steel. The torque collar 40 will therefore need to be able to withstand the rather substantial loads that will be incurred as the fitting 2310 is pulled up. A torque collar 2340 may then typically be made of stainless steel as well, and in some cases hardened stainless steel, so as to provide low creep with a desired amount of friction when in contact with the nut 522. The torque collar 2340 should be able to withstand the loads applied to it when the fitting 2310 has been fully assembled, and also have a high yield strength in order to be able to withstand remakes of the fitting 2310. But, the torque collar 2340 must also provide for allowing further axial advance of the nut relative to the body should remakes by torque be desired. Of course, the strength of the torque collar and its material characteristics will depend on the performance criteria of the fitting 2310 itself and the nature of the materials of the fitting parts and the conduit.

Because the torque collar 2340 allows for one or more remakes, the wedge surface 2348 may be thought of as a dynamic wedge in that the torque collar permits additional axial advance or stroke of the nut for each remake, meaning that the contact position of the nut taper surface 2350 against the wedge surface 2348 will change, even ever so slightly, with each remake. The torque collar 2340 therefore will preferably be characterized by a high yield strength but will yield somewhat, especially axially, to facilitate remakes when such is a desired performance characteristic of the fitting 2310.

We have found that the dynamic wedge concept optionally facilitates another inventive aspect. Not only may the fitting 2310 be initially pulled up by torque, and remade by torque, but significantly and quite unexpectedly the fitting 2310 may be initially pulled up and remade multiple times to the same torque value. We have achieved this even if the fitting is pulled up one or more times by turns. This aspect has tremendous advantages for low cost implementation in that assemblers need only have a single torque wrench or other tool to pull up the fitting 2310.

Referring again to FIG. 5, when the axial advance of the nut with respect to the fitting body is controlled by providing a positive stop or a torque rise, the apparatus 510 may not need to control the stroke of the nut 522 as precisely during the clamping operation. For example, the apparatus 510 may be configured to provide sufficient stroke to cause the conduit gripping device 512 to maintain its position on the conduit when the conduit gripping device is removed from the apparatus and configured to limit stroke to allow for enough axial movement of the nut and conduit gripping device toward the fitting body to grip and seal the conduit when assembled with the fitting body. As such, when axial advance of the nut with respect to the fitting body are controlled by providing the fitting with a positive stop or a torque rise, the stroke of the apparatus 510 can optionally be set to have a relatively wide acceptable range. For example, the stroke can be set to the minimum stroke needed to keep the conduit gripping device on the conduit, can be set to the maximum stroke that still allows the conduit gripping device to grip and seal the conduit when assembled with a fitting body, or any stroke in between.

In an exemplary embodiment, the anvil 526 is also configured to set the position of the end 532 of the conduit 514 such that the end 532 is at an appropriate position relative to the conduit gripping device 512. For example, the anvil 526 can be configured to allow the conduit 514 to extend through the conduit gripping device 512 and to prevent the conduit end 532 from moving more than a predetermined axial distance past the conduit gripping device. In one embodiment, the anvil 526 is configured to set the position of the end 532 of the conduit 514 to appropriately "bottom" in the fitting body when the conduit gripping device is assembled in the fitting body. The term "bottom" means that the end 532 of the conduit is at an acceptable axial position with respect to the fitting body when the fitting is pulled up. For example, the fitting body may have a stop shoulder that the conduit abuts when the fitting is pulled-up and/or the fitting body may have a tapered surface axially inward of the camming mouth that the conduit engages when the fitting is pulled-up. In an exemplary embodiment, when the fitting body has a tapered surface for bottoming of the conduit, the conduit is properly "bottomed" if the conduit engages the tapered surface at any point along the length of the tapered surface.

Figure 13:
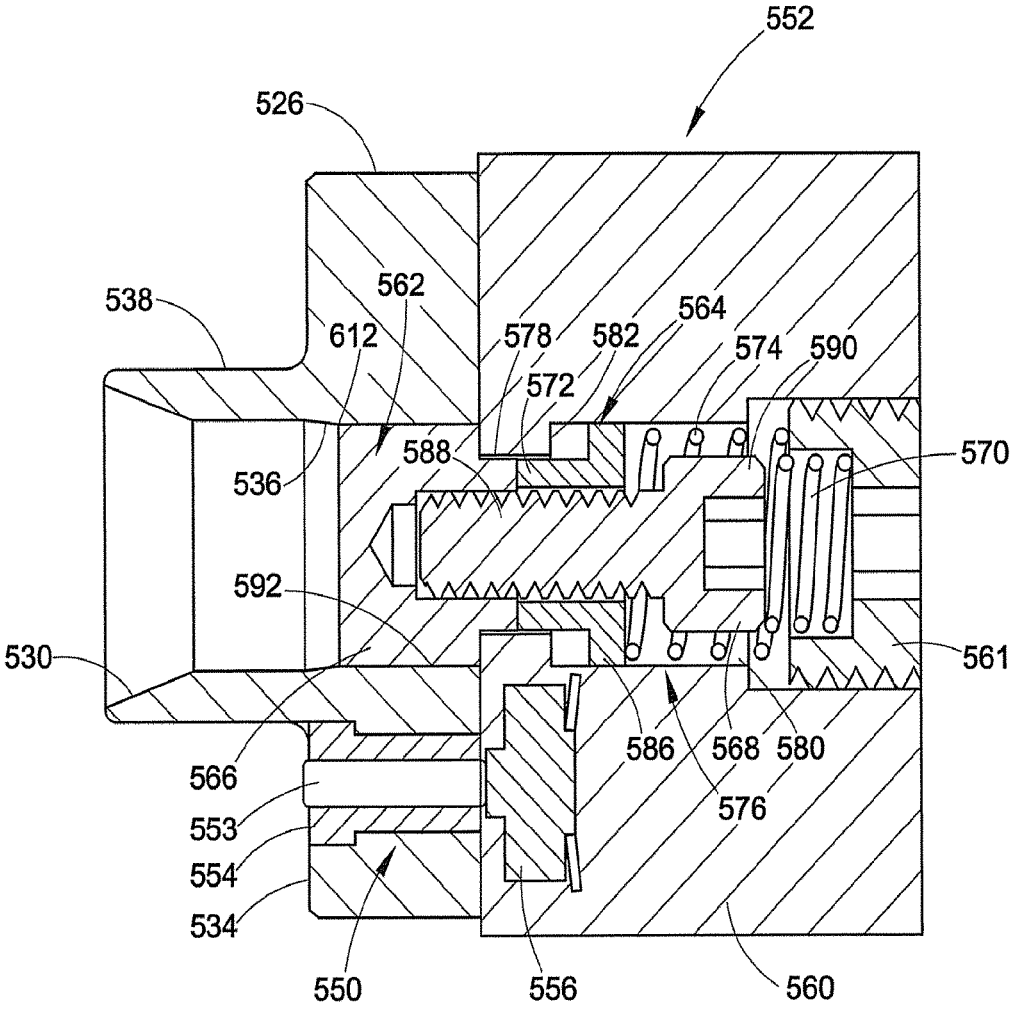
FIG. 13 is a cross-sectional view of an anvil and sensor assembly of the apparatus as shown in FIG. 11.
Figure 14:
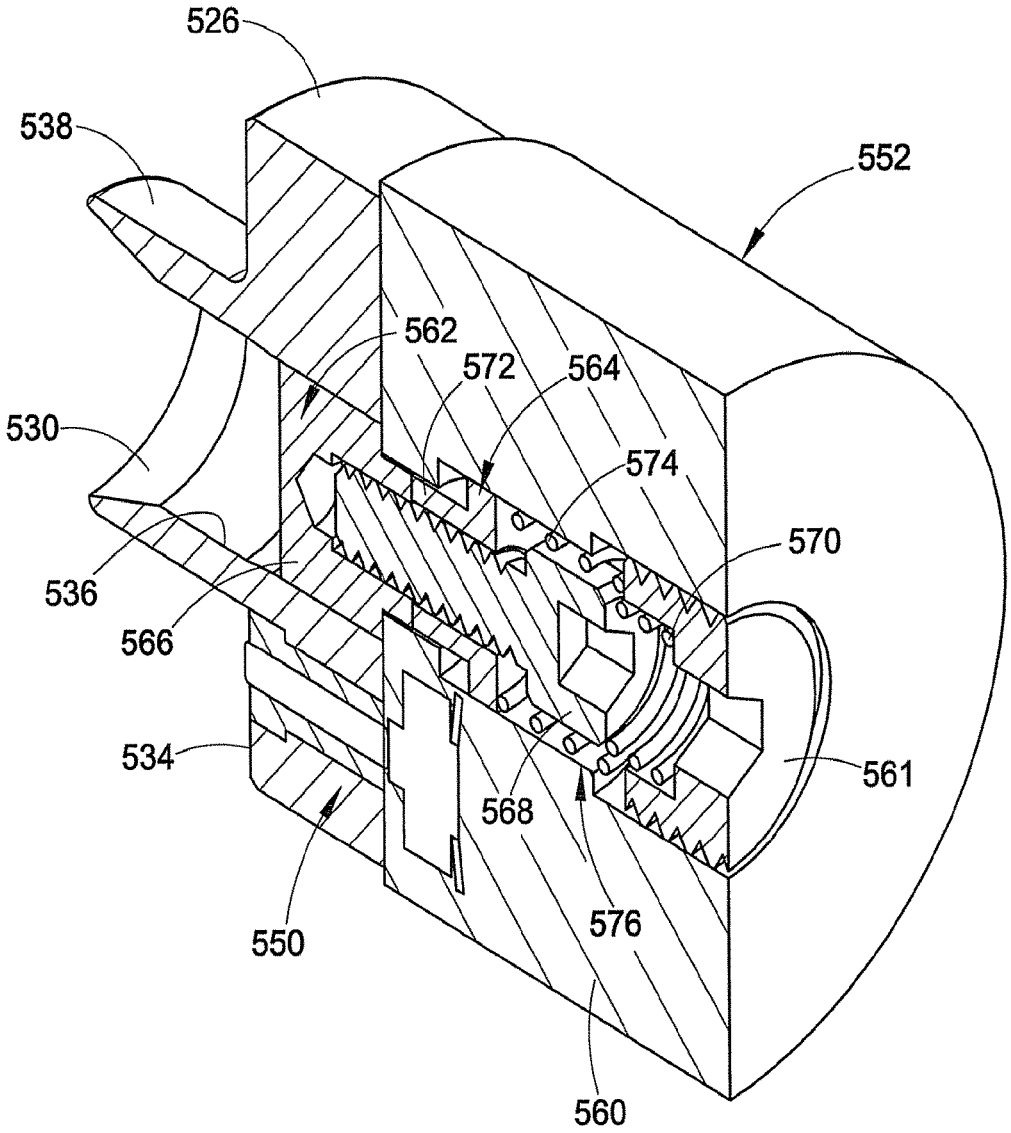
FIG. 14 is a sectioned perspective view of the anvil and sensor assembly as shown in FIG. 13.
Figure 15:
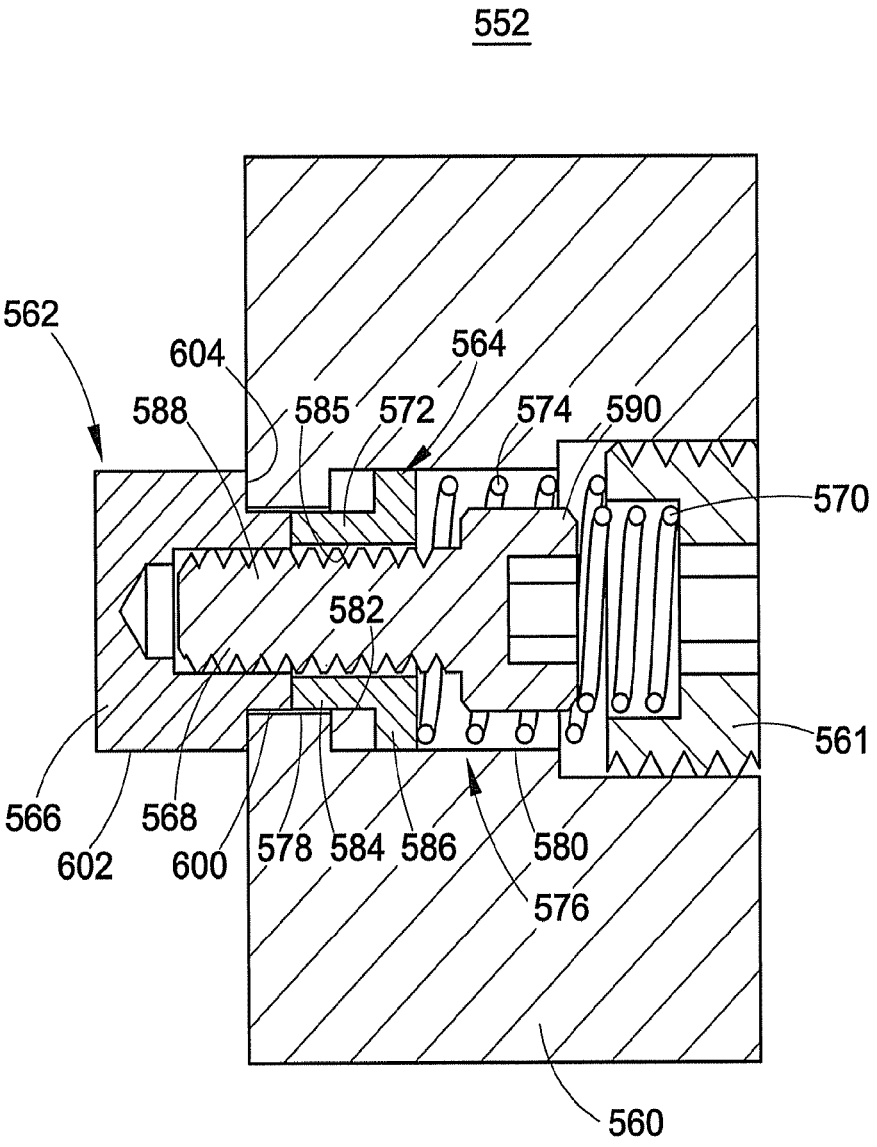
FIG. 15 is a cross-sectional view of a conduit sensor assembly of the anvil and sensor assembly as shown in FIG. 13.
Figure 16:
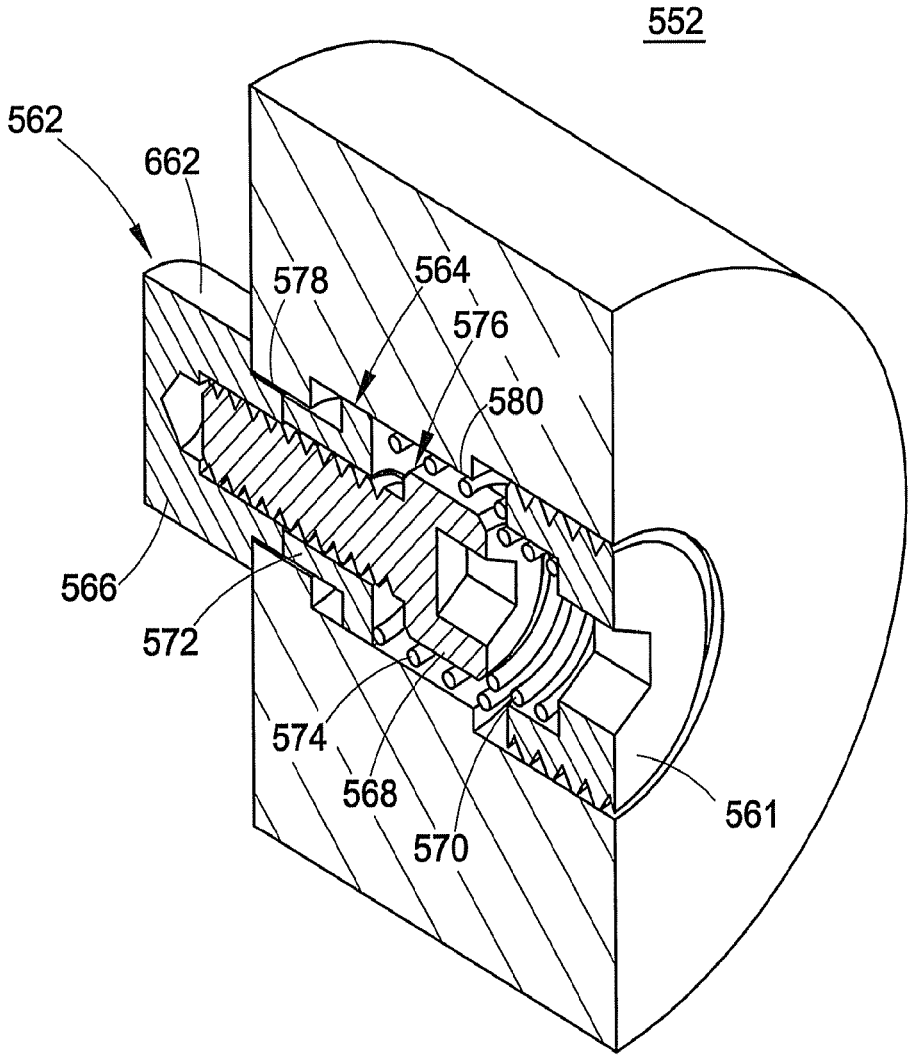
FIG. 16 is a sectioned perspective view of the conduit sensor assembly as shown in FIG. 15.

Referring to FIG. 13, the illustrated anvil 526 may include a tapered conduit bottoming surface 536 that forms a camming angle with respect to the longitudinal axis X of the conduit 514. In an exemplary embodiment, the angle that the tapered conduit bottoming surface 536 forms with respect to the longitudinal axis X may be the same angle that a tapered conduit bottoming surface of a fitting body (not shown) will form with respect to the conduit when the conduit gripping device 512 is assembled with the fitting body. Also, the axial length and position of the tapered conduit bottoming surface 536 of the anvil 526 may be the same as the length and position of the tapered conduit bottoming surface of the fitting body. As such, the interior surfaces of the anvil 526 may match or substantially match the interior surfaces of the fitting body that the conduit 514 and conduit gripping device 512 will be installed in. However, in other embodiments, one or more interior surfaces of the anvil 526 may be different than the interior surfaces of the fitting body that the conduit 514 and conduit gripping device 512 will be installed in. For example, the angle, length or position of the conduit bottoming surface 536 may be different than the conduit bottoming surface of the fitting body that the conduit gripping device will be assembled in.

The clamping device 528 can take a wide variety of different forms. For example, the clamping device 528 can be any arrangement that forces the anvil 526 relatively toward the fitting nut 522. Examples of acceptable clamping devices include, but are not limited to, mechanisms that axially force the fitting nut 522 relatively toward the anvil 526 by rotating the nut and mechanisms that axially force the fitting nut toward the anvil without rotation of the nut.

In the embodiment illustrated by FIGS. 5 and 11, the clamping device 528 is a mechanism that axially forces the fitting nut 522 toward the anvil 526 without rotation of the nut. In this embodiment, a cylindrical outer wall 538 of the anvil 526 is sized to clear the threads of the nut 522. However, the illustrated clamping device 528 can be replaced with a device that rotates the nut to axially force the nut toward the anvil 526. For example, the outer wall 538 can be provided with threads that mate with threads of the nut, with the clamping device 528 configured to rotate the nut.

The clamping device 528 is illustrated schematically in FIGS. 5 and 11. A wide variety of different clamping devices 528 can be used to force the nut 522 relatively toward the anvil 526. The clamping device 528 may comprise a hydraulic actuator, a pneumatic actuator, a pneumatic over hydraulic actuator, an electric actuator, or any other manual or powered actuator capable of forcing the nut 522 relatively toward the anvil 526 and/or capable of rotating the nut 522. A wide variety of different existing presses, actuators, and rotary tools can be adapted to be used as the clamping device shown schematically in FIGS. 5 and 11. When the clamping device 528 is operated, the clamping device applies a clamping force that forces the anvil relatively toward the fitting nut. The movement of the anvil 526 relatively toward the nut 522 compresses the conduit gripping device 512 to force at least a portion of the conduit gripping device radially inward to retain the conduit gripping device on the conduit 514 at a desired axial position on the conduit. The clamping device 528 then returns to its initial position, and the preassembly of the nut, conduit gripping device, and conduit are removed from the apparatus.

Figure 5A:
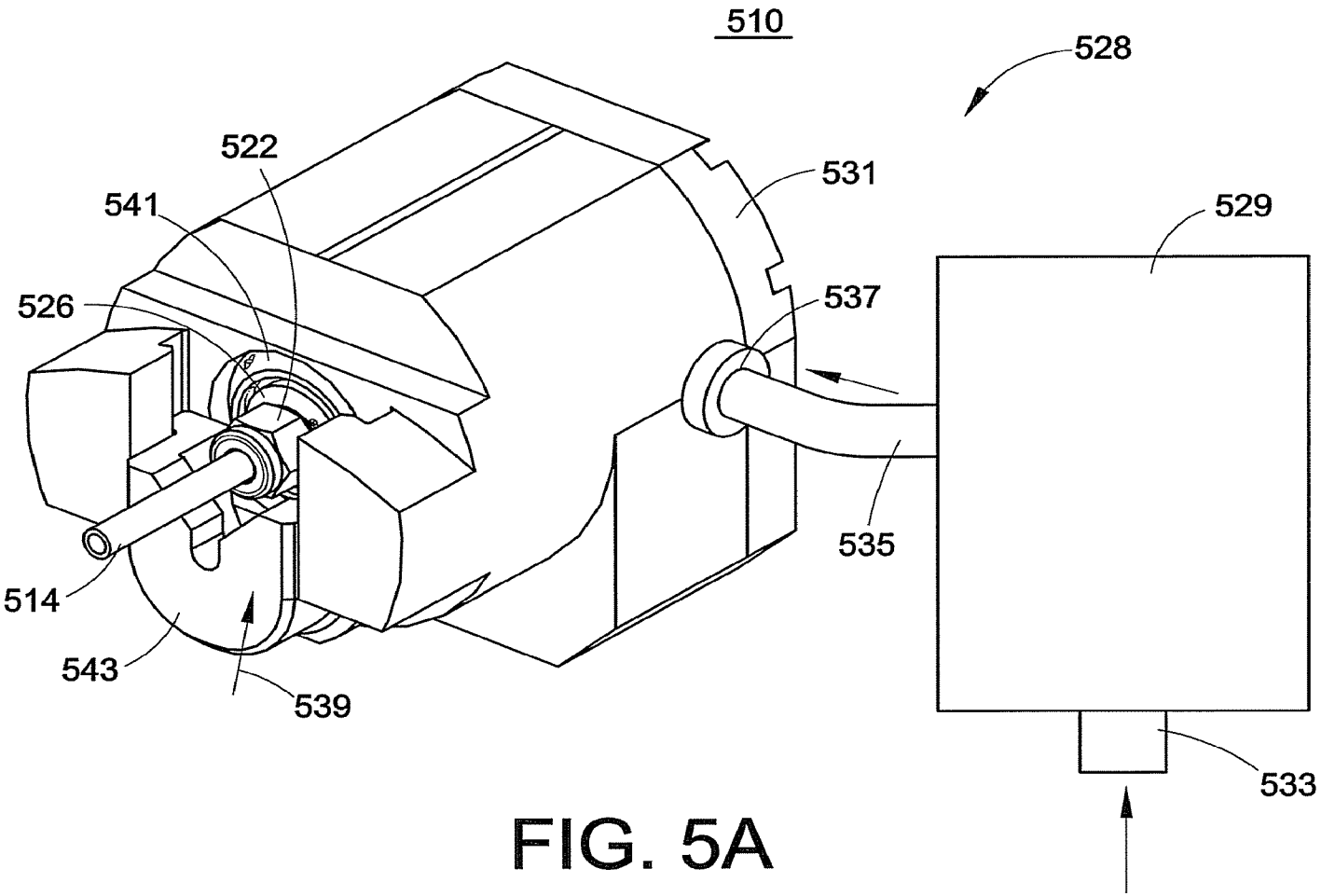
FIG. 5A is a perspective view of an exemplary embodiment of a clamping device used in an apparatus for installing conduit gripping devices on conduits.

FIG. 5A illustrates an embodiment of the apparatus 510 that includes a clamping device 528 that comprises a pump 529 and an actuator 531. The pump 529 provides fluid under pressure to the actuator 531 to move a first clamping member 541, which is coupled to the anvil 526, relative to a second clamping member 543, which is positioned behind the nut 522 (the clamping member 543 is moved downward to a disengaged position in FIG. 5A). The pump 529 may take a wide variety of different forms. For example, any arrangement that provides pressurized fluid to the actuator 531 may be used. In the example illustrated by FIG. 5A, the pump 529 uses air pressure to pressurize hydraulic fluid that is provided to the actuator 531. The pump 529 includes an inlet port 533 that receives the pressurized air and an outlet port 535 that delivers the pressurized hydraulic fluid to the actuator 531. The actuator 531 may take a wide variety of different forms. The illustrated actuator 531 includes an inlet port 537 that receives the hydraulic fluid under pressure. When the hydraulic fluid under pressure is provided to the actuator, the actuator may be operated to move the anvil 526 relative to the clamping member 543 to pre-install the conduit gripping device (under the nut 522 in FIG. 5A).

In one exemplary embodiment, the clamping member 543 that drives the nut can be moved to a position that makes it easier to load and remove the conduit 514, conduit gripping device 512, and nut 522 into the apparatus 510 and makes it easier to remove the assembly from the apparatus 510. For example, the clamping member 543 can be moved up, down, left, right, split or moved in any manner that makes positioning the conduit 514, conduit gripping device 512, and nut 522 in the apparatus for installation and/or removing the assembly from the apparatus after the installation clamping easier. In the example illustrated by FIG. 5A, the clamping member 543 slides up and down between a lowered conduit accepting position, that makes it easier to load the conduit 514, conduit gripping device 512, and nut 522 into the apparatus 510 and unload assembly from the apparatus 510 and a raised installation position (indicated by arrow 539), where the clamping member can be moved into clamping engagement with the nut.

Figure 5B:
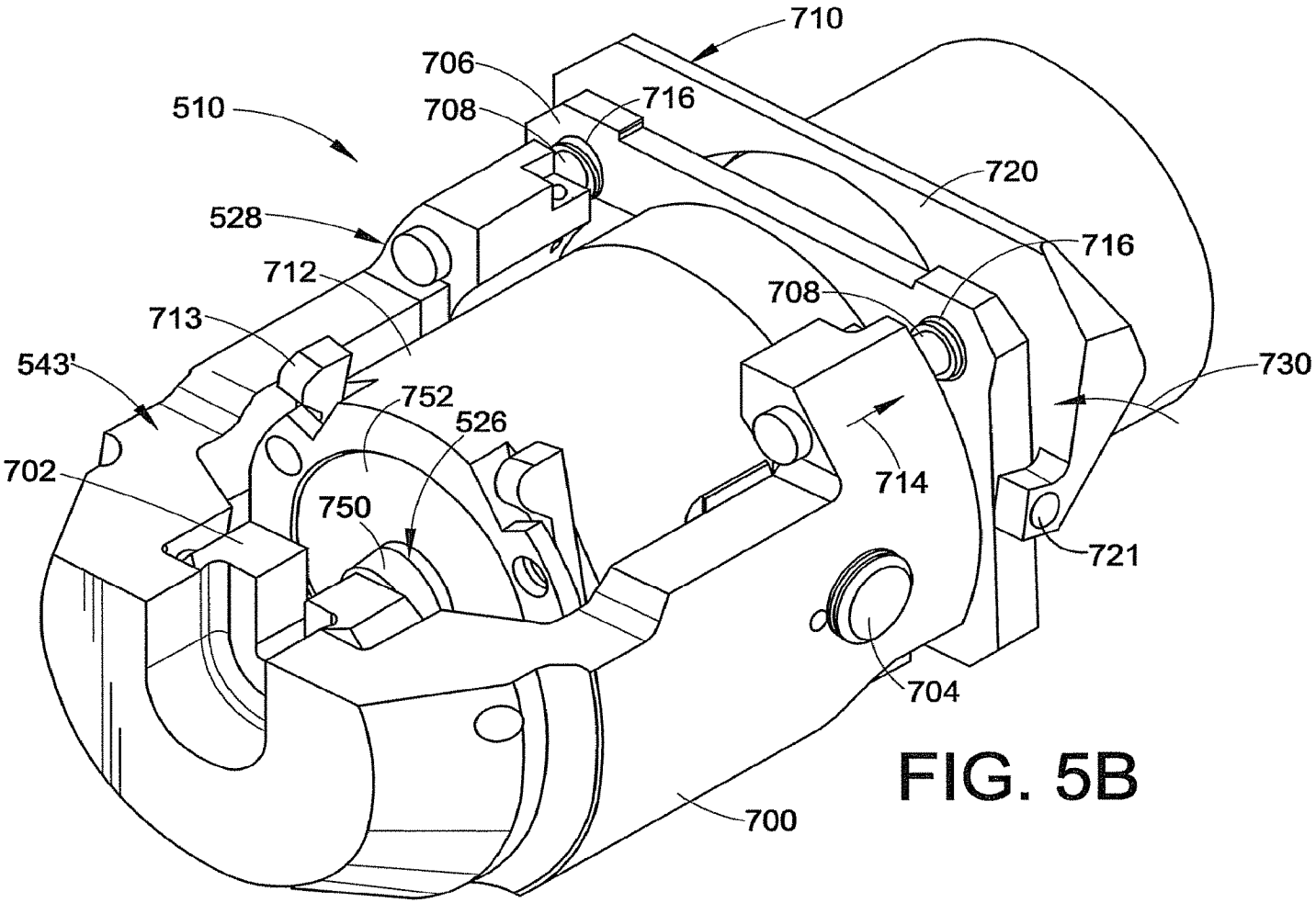
FIG. 5B is a perspective view of another exemplary embodiment of a clamping device used in an apparatus for installing conduit gripping devices on conduits, in an installation position.
Figure 5C:
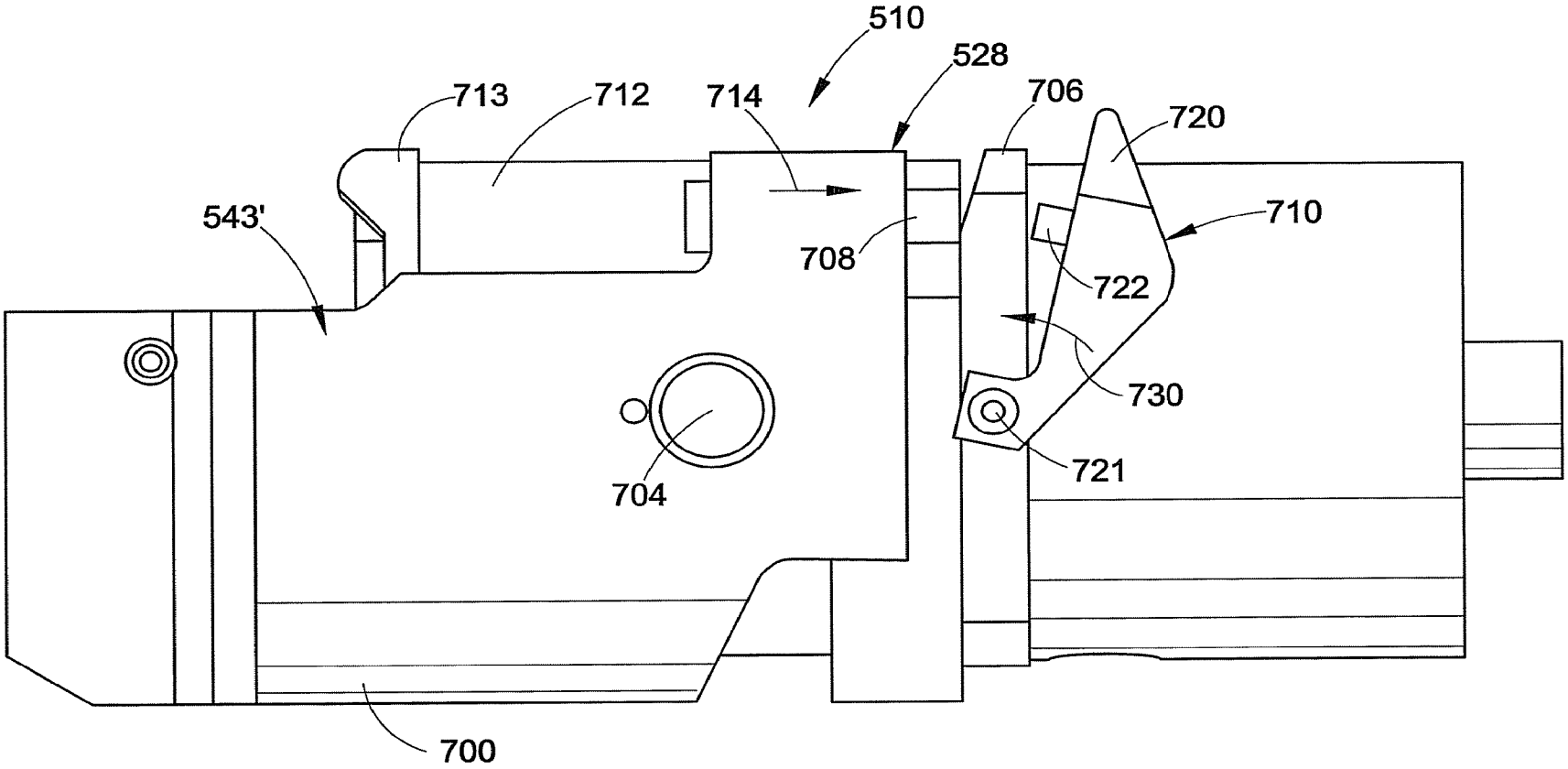
FIG. 5C is a side view of the clamping device shown in FIG. 5B.
Figure 5D:
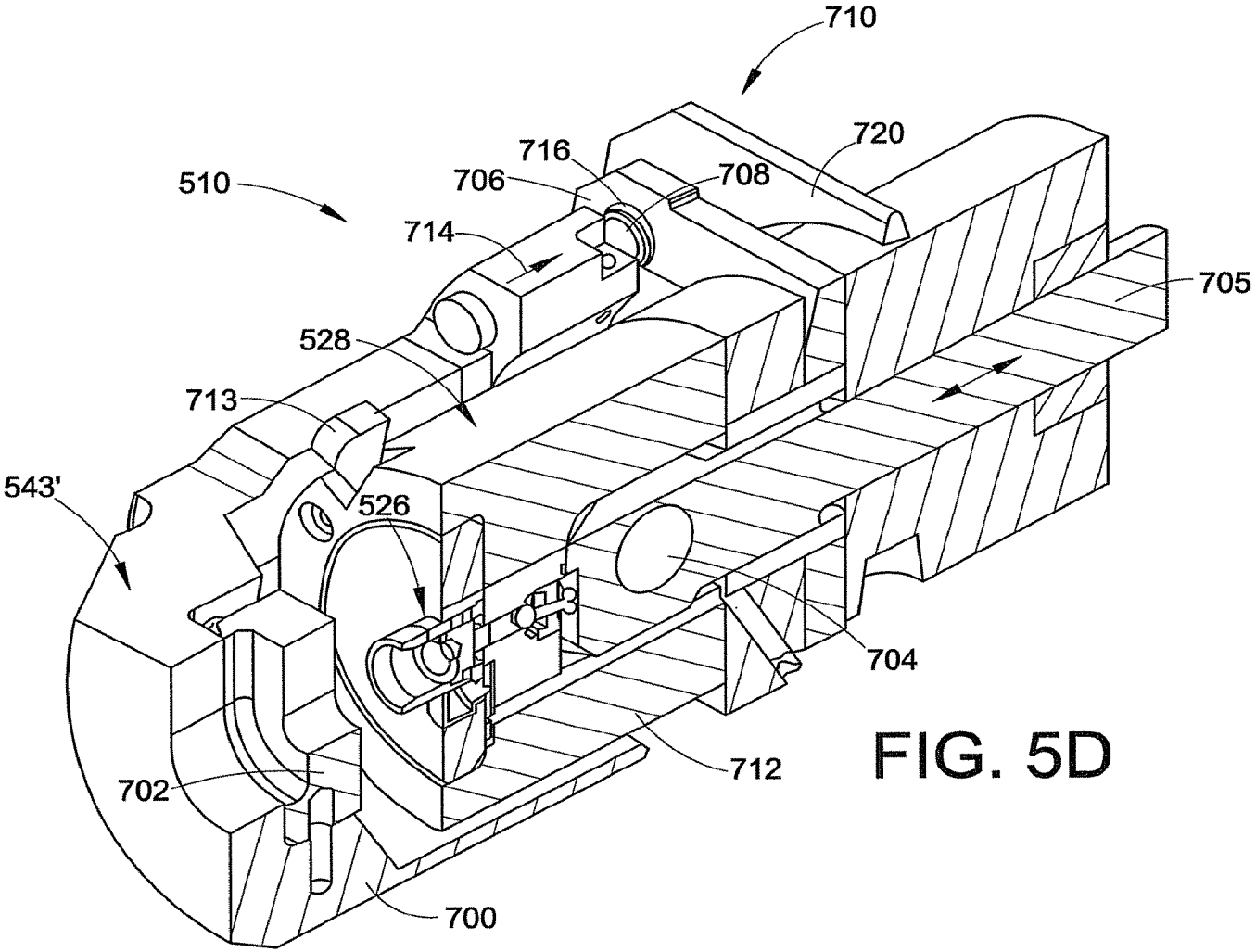
FIG. 5D is a sectioned perspective view of the clamping device shown in FIG. 5B.
Figure 5E:
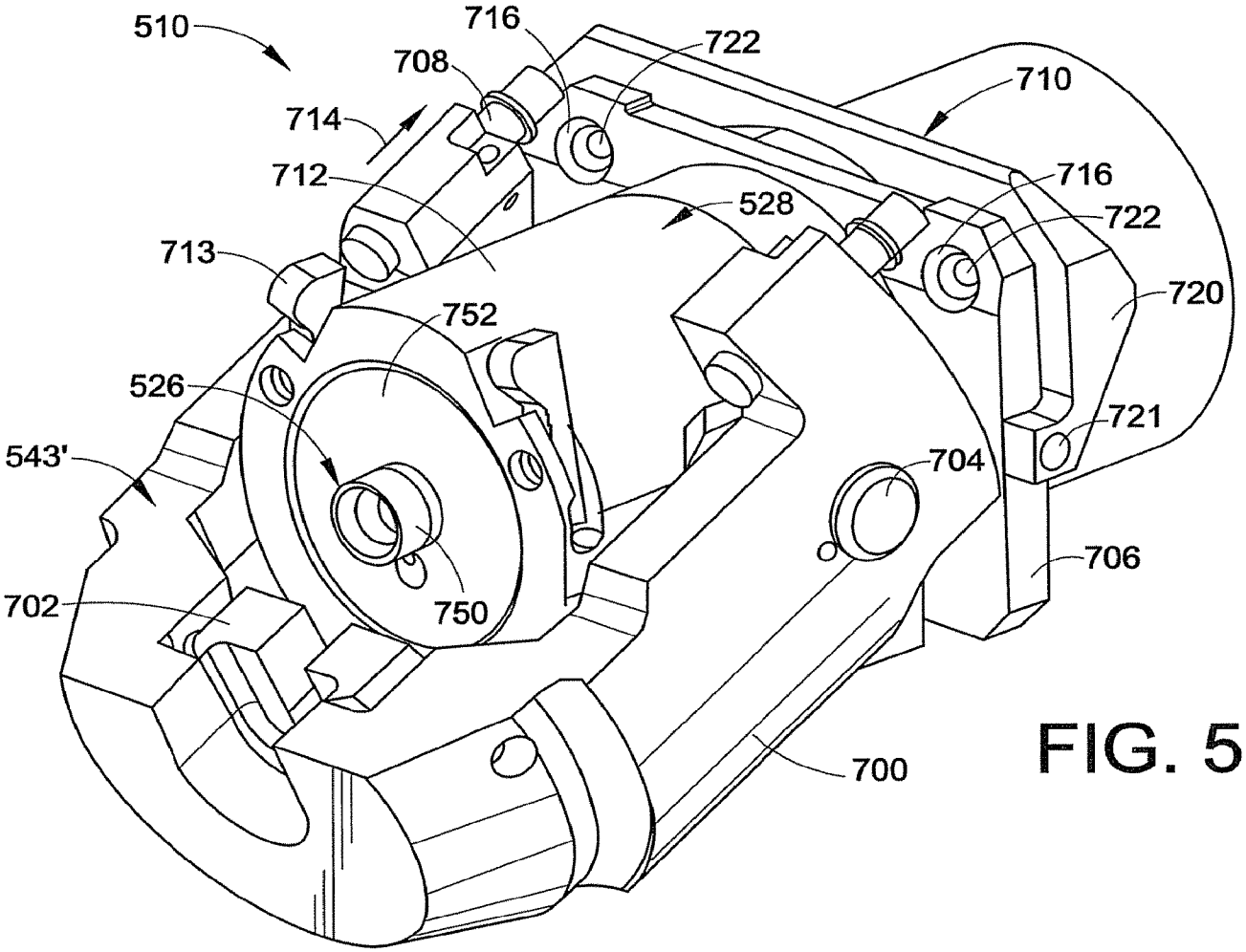
FIG. 5E is a perspective view of the clamping device shown in FIG. 5B in a conduit accepting position.
Figure 5F:
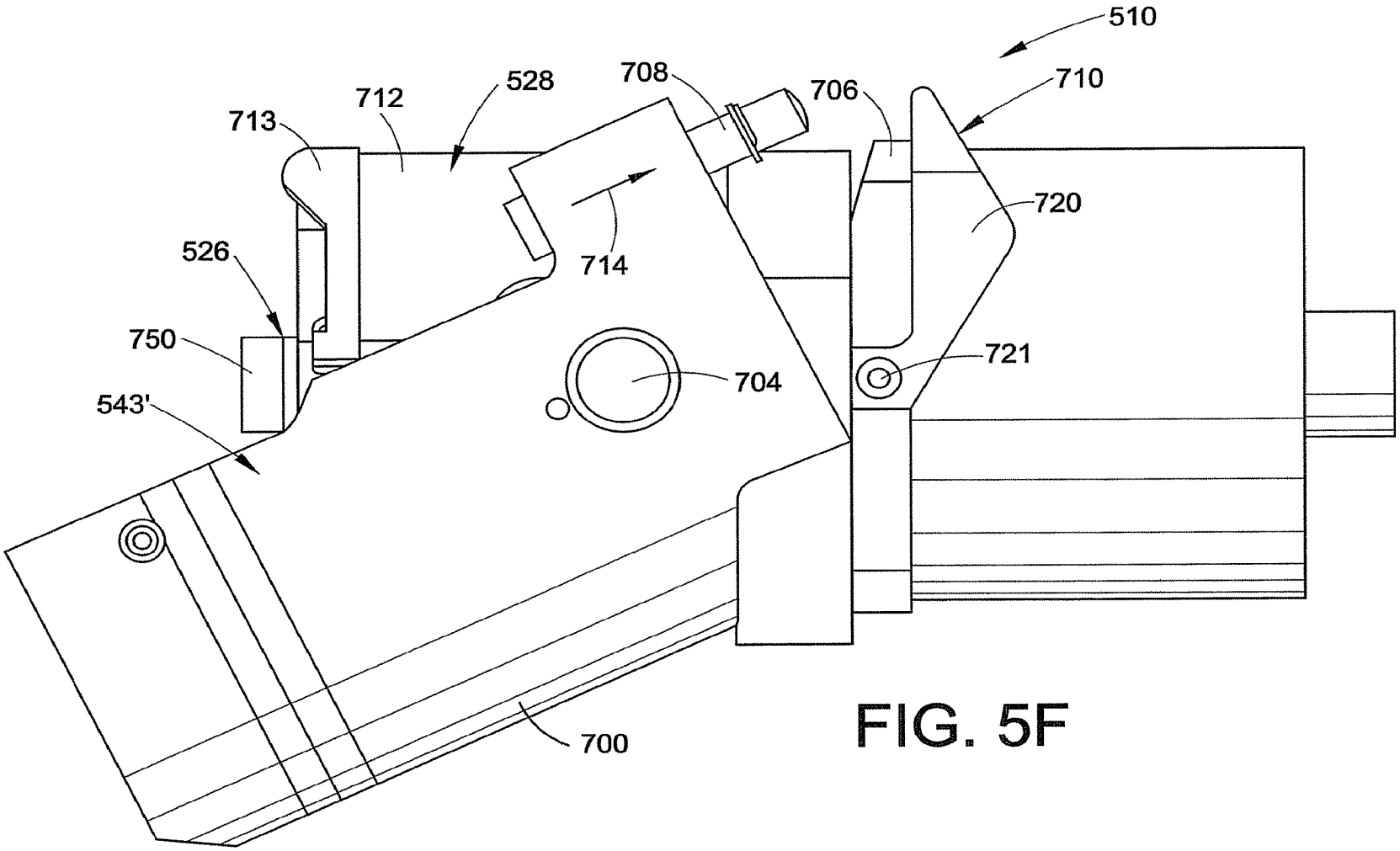
FIG. 5F is a side view of the clamping device shown in FIG. 5E.
Figure 5G:
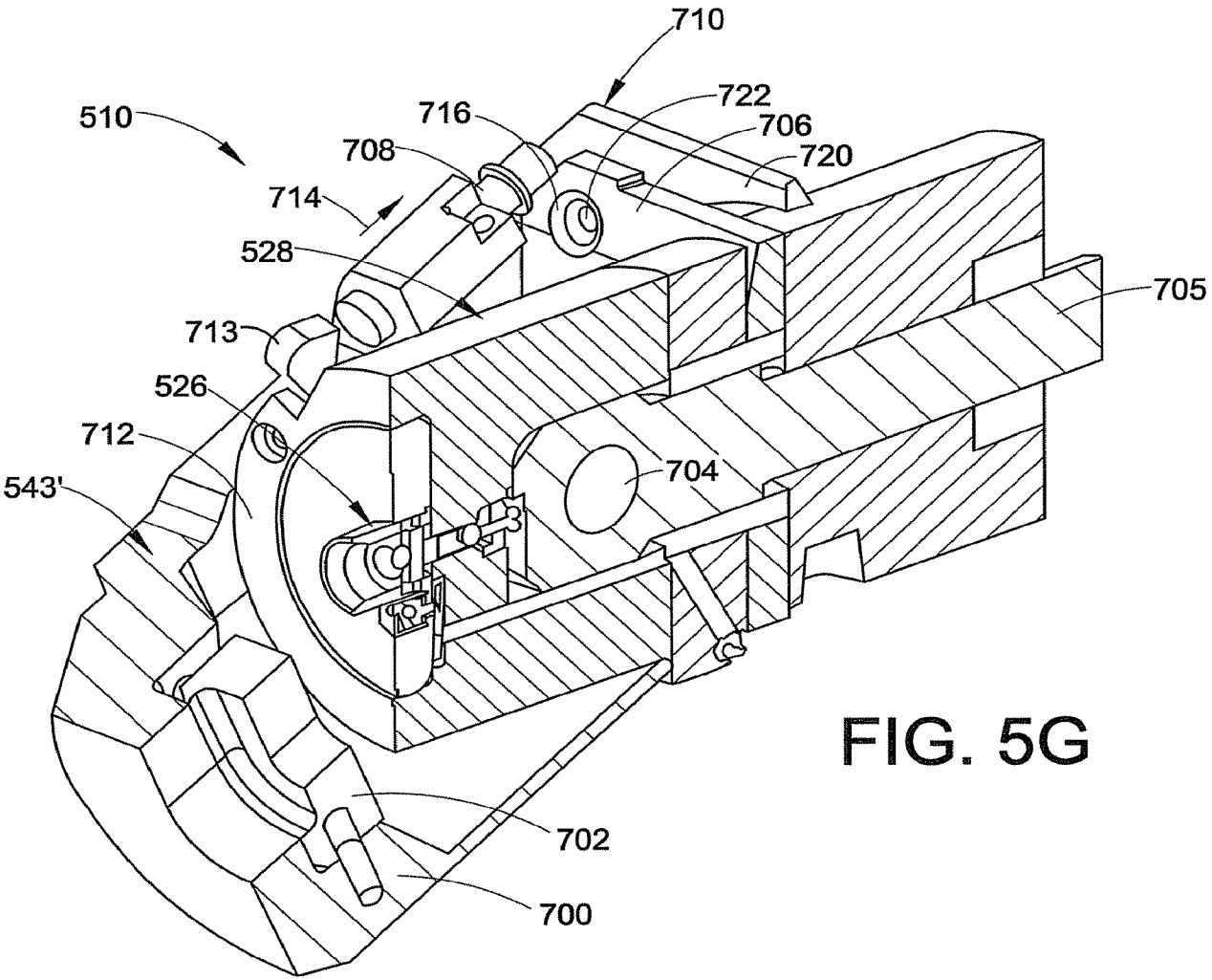
FIG. 5G is a sectioned perspective view of the clamping device shown in FIG. 5B.

In the example illustrated by FIGS. 5B-5G, the clamping device 528 includes a modified clamping assembly 543' that is pivotable between an installation position (FIGS. 5B-5D) and a conduit accepting/removal position (FIGS. 5E-5G). The clamping assembly 543' includes a holding member 700, a nut engagement member 702, a pivot pin 704, a retention member 706, a pair of retention pins 708, and a release assembly 710. The nut engagement member 702 is secured to the holding member 700. A variety of different nut engagement members 702 can be used with the holding member 700 to allow the apparatus to install conduit gripping devices of fittings having a variety of different sizes and types of nuts. The holding member 700 is pivotally coupled to a piston 705 by the pivot pin 704 (see FIG. 5D).

An anvil support member 712 supports the anvil 526. For example, arms 713 may connect the anvil 526 to the anvil support member 712. The piston 705 moves the holding member 700 relative to the anvil support member 712 to perform the clamping operation. The anvil 526 in the embodiment illustrated by FIGS. 5B-5G includes a camming member 750 that engages the conduit gripping device during the installation operation and a base member 752 that supports the camming member 750. By making the anvil 526 from two pieces, when the camming member 750 becomes worn, it can be removed from the base member 752 and replaced.

The retention member 706 is fixed with respect to the anvil support member 712. The retention pins 708 are disposed in the holding member 700 and are spring loaded. The spring loading biases the pins 708 in the direction indicated by arrow 714 in FIGS. 5B and 5F. The retention pins 708 are accepted by openings 716 in the retention member 706 to latch the holding member 700 in the installation position illustrated by FIGS. 5B-5D. During the clamping operation, the holding member 700 is pulled by the piston 705 (FIG. 5D) and moves along the pins 708 toward the retention member 706.

The release assembly 710 includes a release handle 720 that is pivotally coupled to the retention member 706 at pivot 721. A pair of release pins 722 are connected to the release handle (see FIG. 5C). The release pins 722 are in alignment with the openings 716 and the retention pins 708. Referring to FIG. 5C, the release handle [520] *720* is pulled in the direction indicated by arrow 730 to disengage the holding member 700 from the retention member. More specifically, the release handle 720 presses the pins 722 against the retention pins 708, to press the retention pins out of the openings 716. Once the retention pins 708 are out of the openings 716, the holding member 700 can be moved to the position shown by FIGS. 5E-5G.

The modified clamping assembly 543' illustrated by FIGS. 5B-5G can be easily moved between the conduit accepting position (FIGS. 5E-5G) and installation position (FIGS. 5B-5D). This ease of use allows a single operator to easily place a conduit, conduit gripping device, and nut in the apparatus while the clamping assembly 543' is in the conduit accepting position/removal position, move the clamping assembly 543' to the installation position, move the conduit to the appropriate axial position in the clamping device 528 (which optionally causes the installation operation to occur), move the clamping assembly 543' back to the conduit accepting/removal position, and remove the completed pre-assembly. For example, an operator can use one or both hands to place a conduit, conduit gripping device, and nut in the apparatus while the clamping assembly 543' is in the conduit accepting position/removal position. Once in place, the operator can hold the conduit 514 with one hand and easily pivot the holding member up to the installation position with the other hand, where it latches in place. Next, the operator simply pushes the conduit axially into the apparatus 510 to the appropriate position, which optionally causes the installation operation to automatically commence. Once the installation operation is complete, the operator can hold the conduit of the finished assembly with one hand and disengage the holding member 700 with the handle 720 to return the clamping assembly 543' to the conduit accepting/removal position. Once in the conduit accepting/removal position, the finished assembly can easily be removed.

Figure 6:
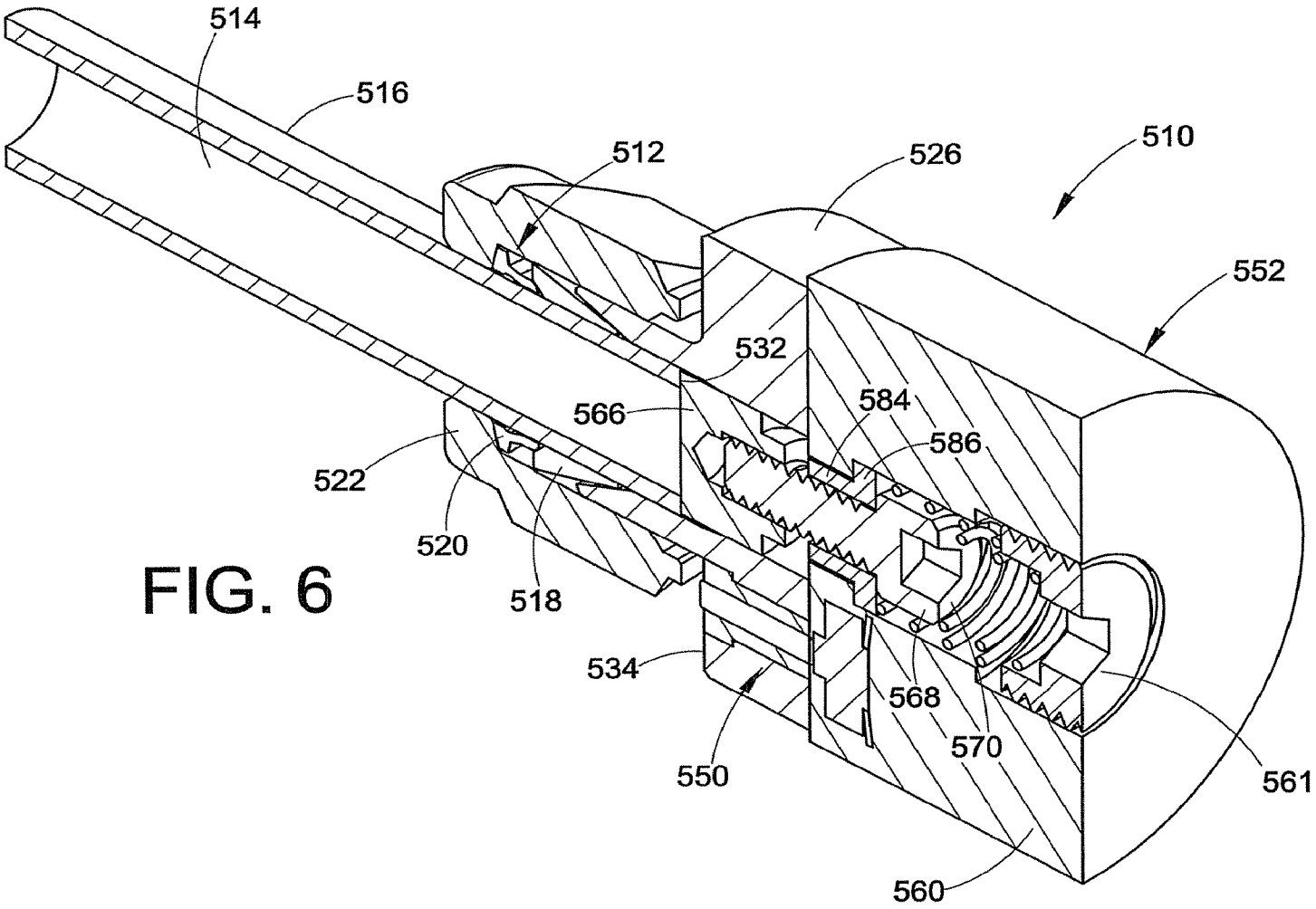
FIG. 6 is a sectioned perspective view of the apparatus as shown in FIG. 5.

The apparatus illustrated by FIGS. 5 and 6 also includes the first position sensor 550 positioned to sense a position of the fitting nut 522 relative to the anvil 526 and the second position sensor 552 positioned to sense a position of the end 532 of the conduit 514 relative to the anvil. In some applications, it may not be necessary to sense both the position of the fitting nut 520 and the position of conduit end 532. As such, the first position sensor 550 or the second position sensor 552 may be omitted.

The fitting nut position sensor 550 may take a wide variety of different forms. For example, in one embodiment the fitting nut position sensor 550 is a binary device that is configured to be in a first state before the fitting nut 522 reaches a predetermined position relative to the anvil 526 and to be in a second state once the fitting nut reaches the predetermined position. Examples of binary fitting nut positions sensors include, but are not limited to, switches, proximity sensors, hall effect sensors, inductive sensors, and the like. Any type of sensor capable of changing states when the fitting nut 522 reaches a predetermined position relative to the anvil 526 can be used.

In another embodiment the fitting nut position sensor 550 provides a continuous output that is indicative of the position of the fitting nut 522 relative to the anvil 526 for a portion of the stroke of the clamping device 528 or the entire stroke of the clamping device. A wide variety of different continuous output position sensors can be used as the fitting nut position sensor 550. For example, a linear variable displacement transducer can be used or some clamping presses include outputs that indicate the position of a clamping member. In this application, analog sensors, digital sensors that provide outputs at predetermined displacement intervals and/or time intervals, and multiple discrete switches arranged to sense multiple positions of the nut with respect to the anvil are considered to be continuous sensors.

In the example illustrated by FIGS. 5-8, the fitting nut position sensor 550 is a plunger type switch. The plunger type switch includes a pin or plunger 553, an insulating bushing 554, and a spring loaded contact 556. The contact pin or plunger 553 is positioned to be engaged by the fitting nut 522 and switch the spring loaded contact 556 from a first state to a second state when the fitting nut 522 is moved to within a predetermined distance of the stop surface 534. For example, the spring loaded contact 556 may close a circuit when the fitting nut 522 is moved to within 0.005 inches of the stop surface 534.

In one exemplary embodiment, the fitting nut position sensor 550 is adapted to be used with a variety of different sizes and/or types of nuts. This can be accomplished in a variety of different ways. For example, the position of the nut position sensor 550 may be adjustable and/or the nut position sensor may be sized and/or shaped to engage more than one size and/or type of nut.

Figure 8A:
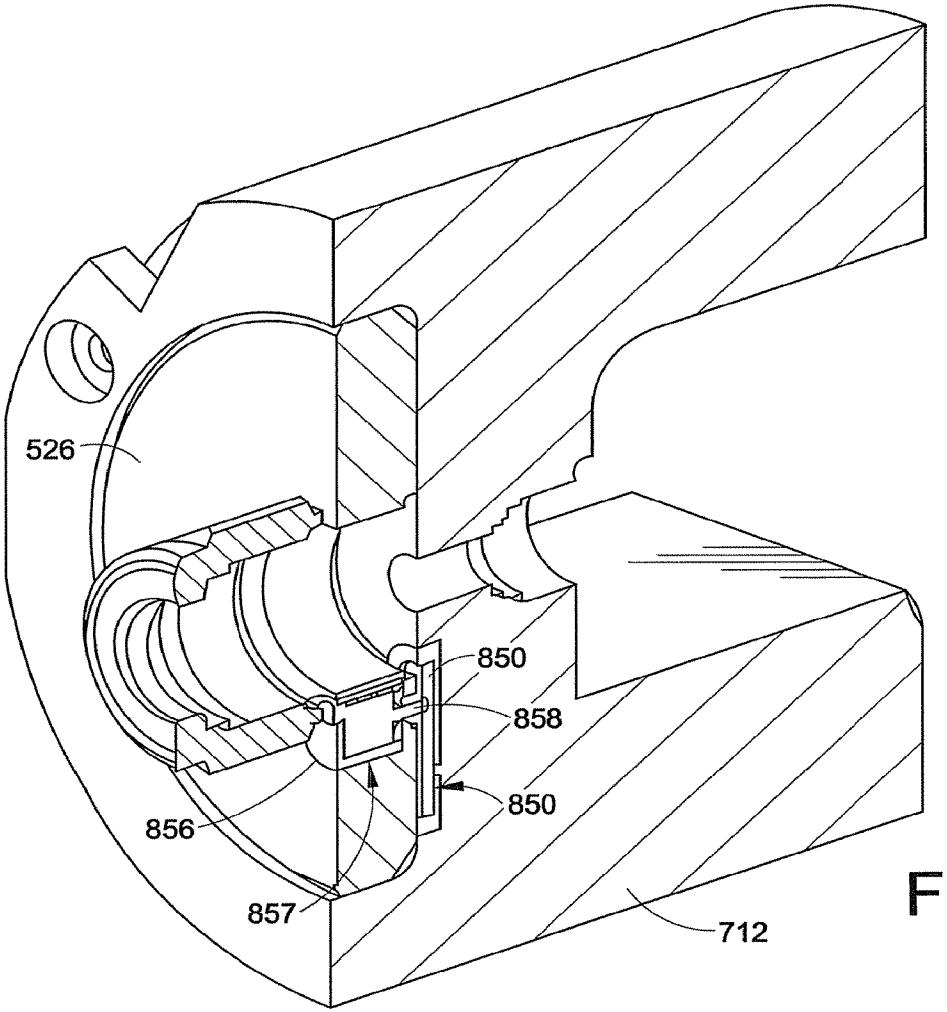
FIG. 8A is a sectioned perspective view illustrating an embodiment of an adjustable nut sensing arrangement.
Figure 8B:
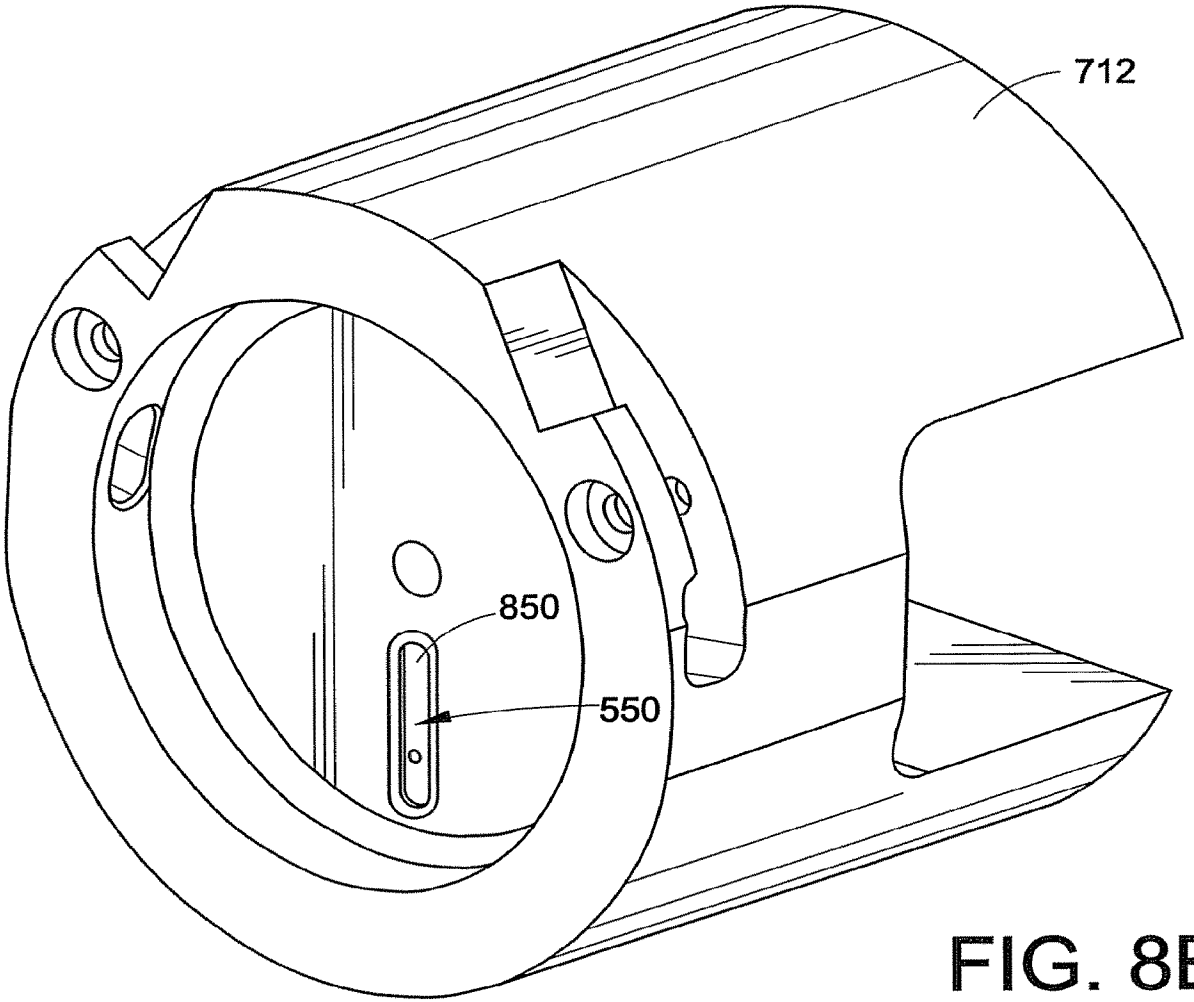
FIG. 8B is a perspective view illustrating an anvil support member that includes a component of an adjustable nut sensing arrangement.

In the example illustrated by FIGS. 8A and 8B, the nut position sensor 550 includes an elongated contactor 850 disposed in an anvil support member 712 and a pin assembly 857. The elongated contactor 850 is configured to mate with the pin assembly 857, which is secured in an opening 856 of anvil 526 (In the embodiment illustrated by FIG. 8A, a portion of the anvil that engages the ferrules and the ferrules are not shown to simplify the drawing). When the nut is in the proper installation position, the nut causes a pin 858 of the pin assembly 857 to contact the elongated contactor 850. The contact between the pin 858 and the elongated contactor 850 causes the position sensor 550 to provide an indication that the nut has reached the proper axial position. Different anvils 526 will be used with different fitting sizes. The position of the opening 856 in the anvil is selected to place the pin assembly 857 in alignment with both the nut 522 and the elongated contactor 850.

The conduit end position sensor 552 may take a wide variety of different forms. For example, in one embodiment the conduit end position sensor 552 is a binary device that is configured to be in a first state before the conduit end 532 reaches a predetermined position relative to the anvil 526 and to be in a second state once the conduit end reaches the predetermined position. In an exemplary embodiment, the predetermined position of the conduit end relative to the anvil 526 may be any position that is axially past the conduit gripping device 512, but not so far past the conduit gripping device that the conduit end 532 prevents the conduit gripping device from properly engaging the camming surface of the fitting body during pull-up. Examples of binary conduit end position sensors include, but are not limited to, switches, proximity sensors, hall effect sensors, inductive sensors, and the like. Any type of sensor capable of changing states when the conduit end 532 reaches a predetermined position relative to the anvil 526 can be used.

In another embodiment the conduit end position sensor 552 provides a continuous output that is indicative of the position of the conduit end 532 relative to the anvil 526 for a portion of the axial movement of the conduit end 532 into the anvil or all axial movement of the conduit end 532 into the anvil. A wide variety of different continuous output position sensors can be used as the conduit end position sensor 552. For example, a linear variable displacement transducer can be used. In this application, analog sensors, digital sensors that provide outputs at predetermined displacement intervals and/or time intervals, and multiple discrete switches arranged to sense multiple positions of the conduit end with respect to the anvil are considered to be continuous sensors.

In the embodiment illustrated by FIGS. 5-16, the conduit end position sensor 552 is configured to be in a first state when the conduit end 532 is outside the tapered conduit bottoming surface 536 and to be in a second state when the conduit end 532 is in the tapered conduit bottoming surface 536. The conduit end position sensor 552 is in the second state regardless of where in the tapered conduit bottoming surface 536 the conduit end 532 is positioned. In the illustrated embodiment, the conduit end position sensor 552 is also configured prevent the conduit end 532 from moving axially past the tapered conduit bottoming surface 536.

Figure 9:
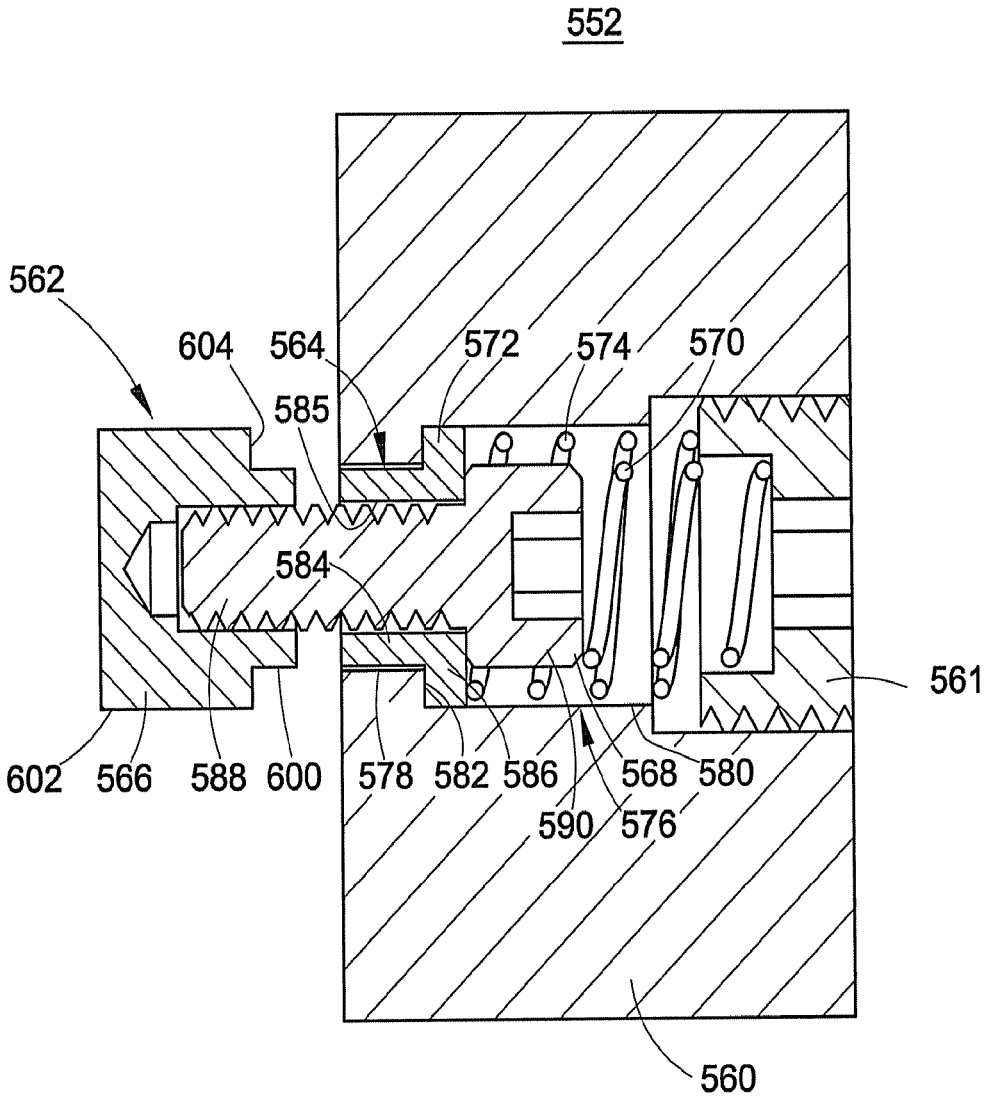
FIG. 9 is a cross-sectional view of a conduit sensor assembly of the anvil and sensor assembly as shown in FIG. 7.
Figure 10:
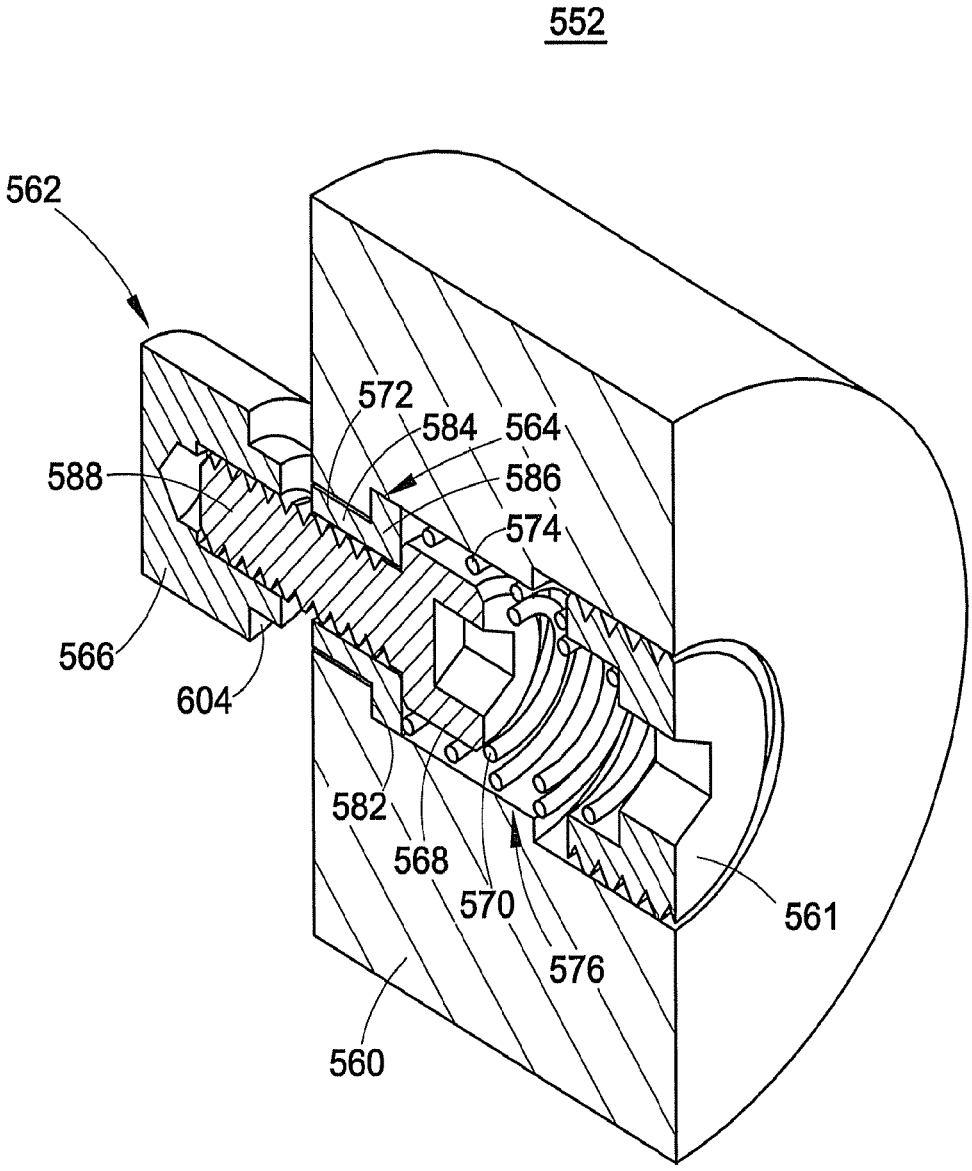
FIG. 10 is a sectioned perspective view of the conduit sensor assembly as shown in FIG. 9.

The conduit end position sensor 552 is assembled with the anvil 526. Referring to FIGS. 9 and 10, the conduit end position sensor 552 includes a base block 560, a backing member 561, a conduit end engagement assembly 562, and a contact assembly 564. The conduit end engagement assembly 562 includes a conduit end engagement member 566, a stop member 568, and a biasing member 570, such as a spring. The contact assembly 564 includes a contact 572 and a biasing member 574, such as a spring. Referring to FIG. 9, the base block 560 includes a stepped bore 576 having a first cylindrical portion 578 and a second cylindrical portion 580 that is diametrically larger than the first portion to define an annular stop shoulder 582 or step therebetween. The contact 572 includes a cylindrical contact portion 584 and a cylindrical stop flange 586 that extends radially outward from the cylindrical contact portion 584. A central bore 585 extends through the contact 572. The contact 572 is slideably disposed in the stepped bore 576 of the base block 560. The biasing member 574 is disposed in the second cylindrical portion 580 of the stepped bore 576 between the cylindrical stop flange 586 of the contact and the backing member 561. The biasing member 574 biases the cylindrical contact flange 586 into engagement with the stop shoulder 582 such that the contact portion 584 extends into the first cylindrical portion 578 of the stepped bore 576. The stop member 568 includes a threaded portion 588 and a head 590. The threaded portion 588 extends through the central bore 585 of the contact 572 with the head 590 disposed in the second cylindrical portion 580 of the stepped bore. The conduit end engagement member 566 is connected to the threaded portion 588 of the stop member 568. Referring to FIG. 13, the conduit end engagement member 566 is disposed in a bore 592 of the anvil 526. Referring to FIG. 7, the biasing member 570 biases the stop member 568 into engagement with the contact 572. The biasing member 574 is disposed around the biasing member 570 and the head 590 of the stop member 568. Referring to FIG. 9, the conduit engagement member 566 includes a stepped outer surface having a first cylindrical portion 600 and a second cylindrical portion 602 that is diametrically larger than the first portion to define an annular stop shoulder 604 or step therebetween. The conduit engagement member 566 is moveable toward the contact 572, until the conduit engagement member 566 engages the contact. When the conduit end engagement member 566 is spaced apart from the contact 572, the conduit end position sensor 552 is in a first state. When the conduit end engagement member 566 is in contact with the contact 572, the conduit end position sensor 552 changes to a second state. For example, a circuit may be closed when the conduit end engagement member 566 engages the contact 572.

FIGS. 5 and 11 illustrate operation of the conduit end position sensor 552. In FIG. 5, the conduit 514 is disposed in the bore [492] *592*, but the end 532 of the conduit has not yet reached the tapered conduit bottoming surface 536. In this position, the conduit end 532 is in contact with the conduit end engagement member 566, which is spaced apart from the contact 572. The conduit 514 will then be pressed further into the bore 592 of the anvil 526 as indicated by arrow 610. As the conduit 514 is advanced in the bore 592, the engagement member 566 is moved toward the contact 572 against the biasing force of the inner biasing member 570, while the outer biasing member 574 maintains the flange 586 of the contact 572 against the shoulder 582. At the point the conduit end 532 enters the tapered conduit bottoming surface 536, the engagement member 566 comes into contact with the contact 572. This contact between the engagement member 566 and the contact changes the state of the conduit end position sensor. Referring to FIG. 11, if the conduit end 532 is advanced further into the tapered conduit bottoming surface 536, the engagement member 566 remains in contact with the contact 572 and moves the contact 572 axially into the stepped bore 576 against the biasing forces of the biasing members 570, 574. The advancement of the conduit end 532 into the tapered conduit bottoming surface 536 may continue until the conduit end reaches the end 612 of the tapered conduit bottoming surface. When the conduit end reaches the end 612 of the tapered conduit bottoming surface 536, the annular stop shoulder 604 engages the block 560 to prevent further axial advancement of the conduit end 532.

Referring to FIG. 5, in one exemplary embodiment, an output device 620 is in communication with the first position sensor 550 and the second position sensor 552. The output device 620 is configured to output a first signal 621 or nut position signal that indicates whether the fitting nut 522 has reached the predetermined position relative to the anvil 526. The output device 620 is also configured to output a second signal or conduit end position signal 622 that indicates whether the conduit end 532 has reached the predetermined position relative to the anvil 526 or is in an acceptable range of predetermined positions relative to the anvil.

The output device 620 may take a wide variety of different forms. The output device 620 may be a single device that outputs a nut position signal 621 and the conduit end position signal 622 or two separate devices that output the nut position signal and the end position signal. The output signals may take a wide variety of different forms. The output signal(s) may be visual, audible, and/or tactile signals that indicate to an operator of the apparatus 510 whether or not the nut 522 and/or the conduit end 532 have reached their appropriate predetermined positions relative to the anvil 526. The output signal(s) may be wired or wireless signals that are used to automatically or semi-automatically control operation of the apparatus 510. For example, the conduit end position signal 622 may be used to prevent the clamping device 528 from operating, until the conduit end 532 is in an appropriate bottomed position in the anvil 526. Further, the conduit end position signal 622 may be used to automatically start operation of the clamping device 528 when the conduit end 532 is in an appropriate bottomed position in the anvil 526 Once the conduit end 532 is appropriately bottomed, the clamping device forces the nut 522 relatively toward the anvil 526 to compress the conduit gripping device 512 onto the conduit 514. The nut position signal 621 may be used to stop operation of the clamping device 528 when the nut 522 has reached the appropriate pre-assembly relative to the anvil 526 (i.e. an appropriate axial stroke has been achieved).

Figure 24:
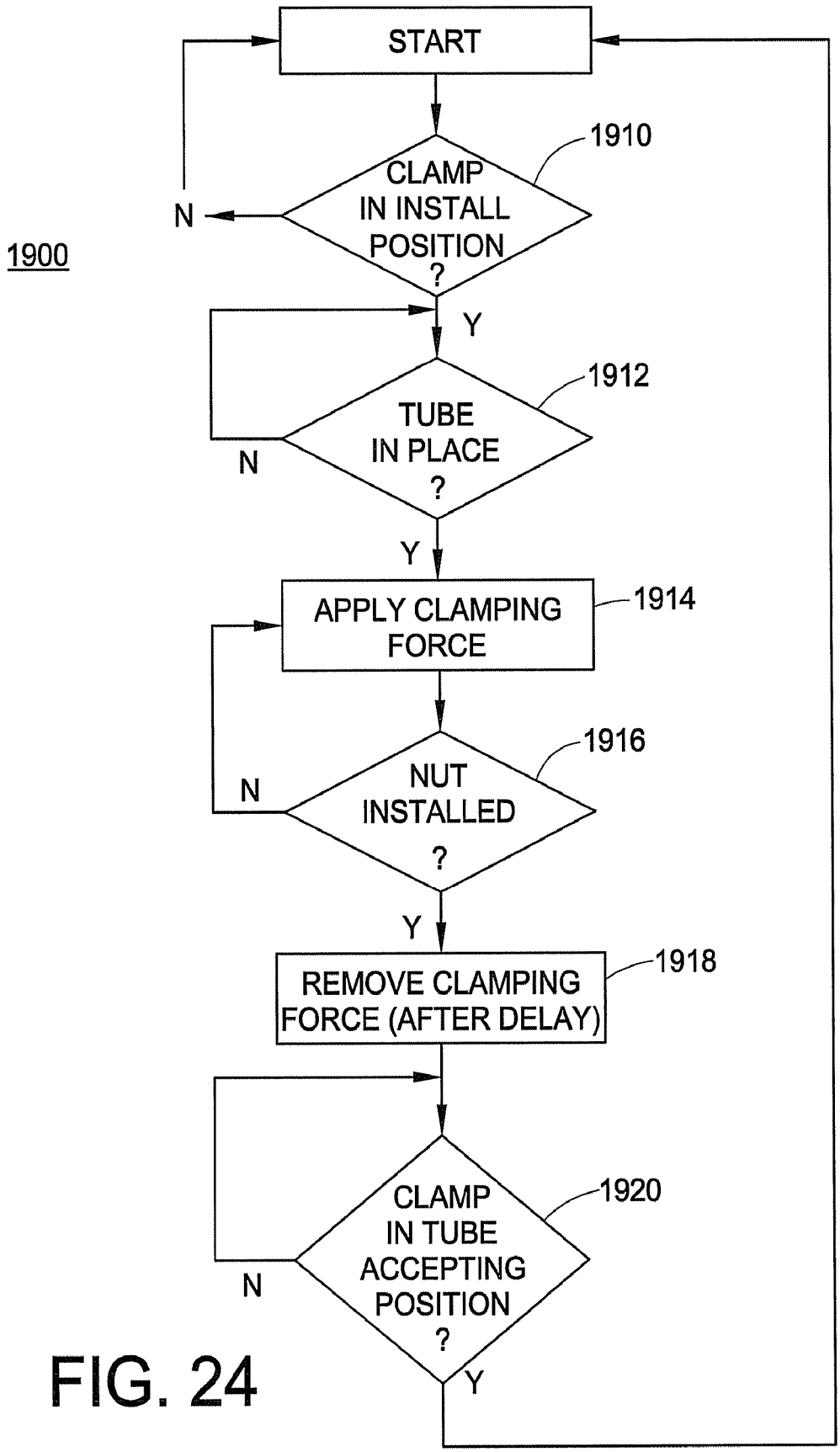
FIG. 24 is a flow chart illustrating a method of assembling a conduit gripping device on a conduit.

A wide variety of control algorithms and/or circuits can be used with the conduit end position sensor 552 and the nut position sensor 550 to control the installation of the conduit gripping device 512 onto the outer wall 516 of the conduit 514. FIG. 24 is a flow chart that illustrates one exemplary control algorithm 1900. In the embodiments of FIGS. 5A-5G, the clamping member 543 or clamping assembly 543' can be moved to a lowered, conduit accepting position that makes it easier to load the conduit 514, conduit gripping device 512, and nut 522 into the apparatus 510. In an exemplary embodiment, the installation operation cannot occur until the clamping member is returned to the installation position (see FIG. 5B).

Referring to FIG. 24, the method determines 1910 whether the clamping member 543 or clamping assembly 543' is in the installation position. If the clamping member 543 or clamping assembly 543' is not in the installation position, the method does not continue until movement of the clamping member or assembly to the installation position is sensed.

If the clamping member or assembly is in the installation position, the method determines 1912 whether the conduit 514 is in the proper axial position. This determination can be performed with the conduit end position sensor 552. If the conduit 514 is not in the proper position, the method does not continue until movement of the conduit to the correct position is sensed. Once the clamping member or assembly 543, 543' is in the installation position and the conduit 514 is in the proper position, a clamping force is applied 1914 to axially advance the clamping member or assembly 543 or 543' and install the conduit gripping device 512 onto the conduit 514. This application 1914 of clamping force may be automatically triggered or initiated by the conduit end position sensor 552 or a separate user input may be required (in addition to the input from the sensor 552) to apply 1914 the clamping force.

While the clamping force is being applied 1914, the method monitors 1916 whether the nut 522 has reached the axial position that corresponds to proper installation on the conduit (referred to as "nut installed" on the drawing). This monitoring 1916 can be performed with the nut position sensor 550. If the nut does not reach the proper installation position, the clamping force is maintained or continued. The clamping force may automatically be removed after a predetermined period of time after the clamping force is applied and the method does not sense that the conduit has reached the proper pre-installation position.

When the method determines that the nut 522 has reached the position that corresponds to proper installation on the conduit, the clamping force is removed 1918 and the clamping member 543 or clamping assembly 543' returns to its original axial position. After the installation, the clamping member 543 or clamping assembly 543' can be returned to the lowered conduit accepting position/removal position to allow the conduit gripping device, and nut installed on the conduit to be removed from the apparatus.

The method determines 1920 whether the clamping member 543 or clamping assembly 543' is moved to the conduit accepting/removal position after the removal 1918 of the clamping force. In the exemplary embodiment illustrated by FIG. 24, if the clamping member 543 or clamping assembly 543' is not moved to the conduit accepting/removal position after the removal 1918 of the clamping force, the method does not continue until movement of the clamping member to the accepting/removal position is sensed. This prevents the full clamping force from being applied to the conduit gripping device 512 again, after the nut 522 has reached the position that corresponds to proper installation on the conduit 514. Once the clamping member is in the lowered conduit accepting/removal position, another conduit, conduit gripping device, and nut can be positioned in the apparatus and the method can start 1901 again.

Figure 25:
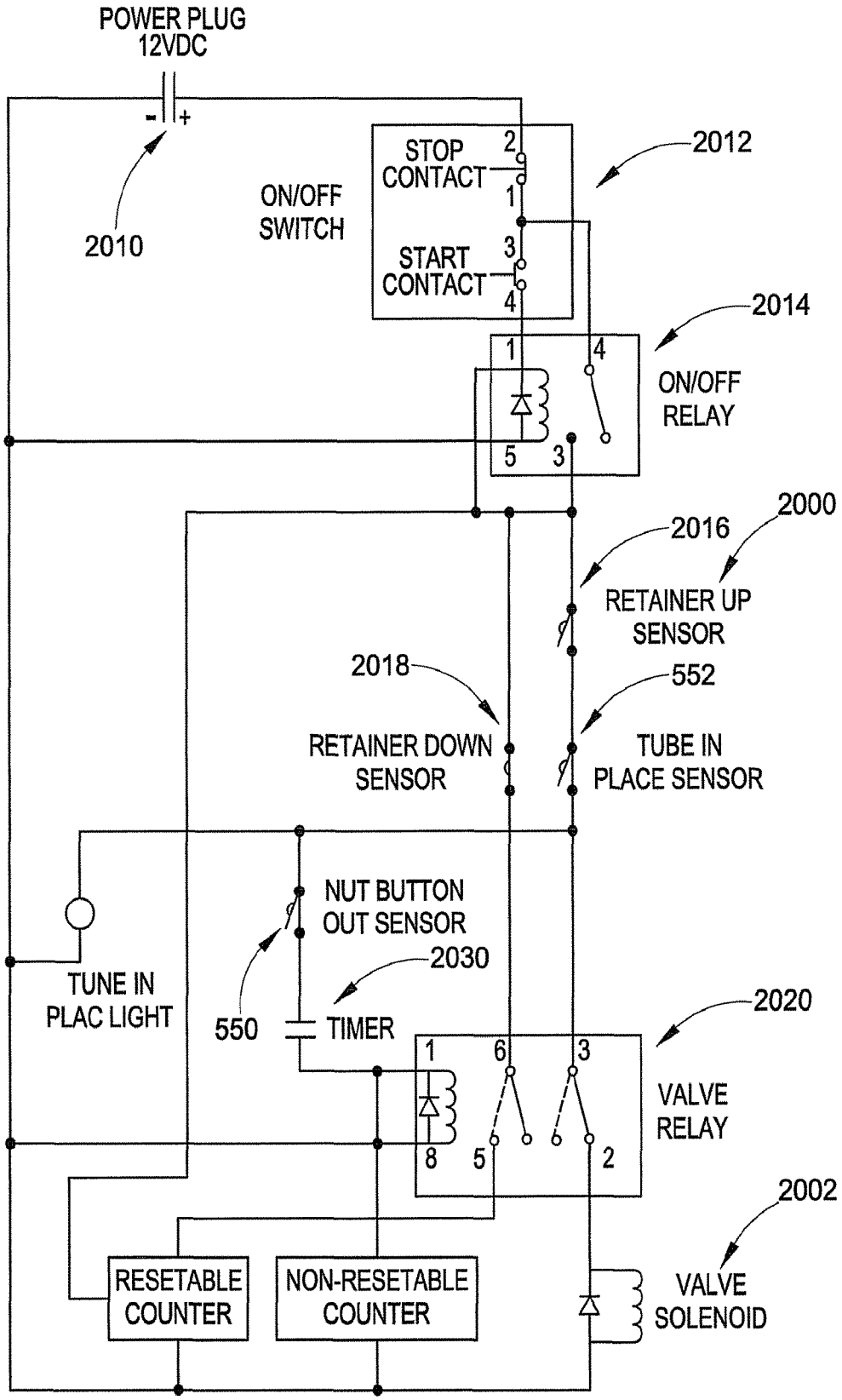
FIG. 25 is an electrical diagram of a circuit for assembling a conduit gripping device on a conduit.

The method illustrated by FIG. 24 can be performed in a wide variety of different ways. FIG. 25 is an electrical schematic of one circuit 2000 that can perform the method illustrated by FIG. 24. Electrical power is selectively supplied to the circuit 2000 by a power supply 2010. The electrical power is selectively applied to the circuit 2000 by a momentary switch 2012 that operates a relay switch 2014. However, any type of switch can be used. For example, the momentary switch and relay switch can be replaced with a single mechanical switch.

The circuit 2000 controls a valve solenoid 2002 that controls the clamping device. For example, the valve solenoid 2002 may selectively apply fluid under pressure to a fluid driven actuator, such as an air over hydraulic actuator. The circuit includes a conduit end position sensor 552, a nut position sensor 550, a first clamping member sensor 2016 that detects when the clamping member is in the clamping position, a second clamping member sensor 2018 that detects when the clamping member is in the conduit accepting position, and a valve relay 2020. The conduit end position sensor 552, the nut position sensor 550, the first clamping member sensor 2016, and the second clamping member sensor 2018 are schematically illustrated as switches, but any type of sensor may be used and the sensors may be different types from one another.

If the clamping member 543 or clamping assembly 543' is not in the clamping position, the first clamping member sensor 2016 prevents power from being supplied to the valve solenoid 2002. For example, the first clamping member sensor 2016 may be a switch that is open when the clamping member 543 or clamping assembly 543' is not in the clamping position. Once the clamping member 543 or clamping assembly 543' is in the clamping position, the first clamping member sensor 2016 changes state. For example, the first clamping member sensor 2016 may be a switch that is closed when the clamping member 543 or clamping assembly 543' is in the clamping position.

If the conduit is not properly positioned, the conduit end position sensor 552 prevents power from being supplied to the valve solenoid 2002. For example, conduit end position sensor 552 may be a switch that is open, and power cannot be supplied to the valve solenoid 2002. Once the clamping member 543 or clamping assembly 543' is in the clamping position and the conduit is properly positioned, power is applied to the valve solenoid 2002 to apply clamping force to axially advance the clamping member 543 or clamping assembly 543' and install the conduit gripping device on the conduit. The clamping force is applied until the relay 2020 contacts change positions. The solid lines illustrate the positions of the contacts of the relay 2020 that allow power to be applied to the solenoid valve. The broken lines show the position of the contacts of the relay 2020 that prevent power from being applied to the solenoid valve. The contacts of the relay 2020 will remain in the positions illustrated by solid lines, until the nut causes the nut position sensor 550 to sense movement of the nut 522 to the appropriate axial position and provides a path to the relay 2020. For example, the nut position sensor 550 may be a switch that closes upon movement of the nut 522 to the appropriate axial position.

Once the nut position sensor 550 provides a path to the relay 2020, the relay contacts will change to the positions shown in broken lines, after a delay determined by a timing device, such a as a capacitor 2030, to de-energize the solenoid valve 2002 and remove the clamping force. The contacts of the valve relay 2020 will remain in the positions indicated by the dashed lines, until the sensor 2018 detects that the clamping member 543 or clamping assembly 543' has been moved to the conduit accepting position. Movement of the clamping member 543 or clamping assembly 543' to the conduit accepting position causes sensor 2018 to close a path. For example, the sensor 2018 may be a switch that is closed by moving the clamping member 543 or clamping assembly 543' to the conduit accepting position, which causes the contacts of the relay 2020 to move back to the positions indicated by solid lines. Once the contacts have returned to the positions illustrated by solid lines, the circuit can be operated again to install another conduit gripping device and nut on a conduit.

It should be appreciated that the circuit can be configured in a wide variety of manners, other than as illustrated. A chassis or frame of the installation unit may be electrically connected to the common of the power source 2010. With this arrangement, connection of the conduit end position sensor 52, nut position sensor 50, clamping member switch 2016, clamping member switch 2018 and/or valve relay 2020 to common can be made via the frame or chassis. In this arrangement, one or more of the conduit end position sensor 552, nut position sensor 550, first clamping member switch 2016 and second clamping member switch 2018 may include only single lead wires that connect to other components of the circuit 2000 and connections to common made through a body of the sensor.

FIGS. 17-20 illustrate a second exemplary embodiment of an apparatus 1310 for installing a conduit gripping device 512 onto an outer wall 516 of a conduit 514. The apparatus 1310 includes an anvil 526, a clamping device 1328, and a load cell 1329. The anvil 526 may be as described with respect to the embodiment of FIGS. 5-16, and is therefore not described in detail again.

In the embodiment of FIGS. 17-20, the clamping device 1328 is an arrangement that forces the anvil 526 relatively toward the fitting nut 522. The illustrated clamping device 1328 axially forces the fitting nut 522 toward the anvil 526 without rotation of the nut. However, the illustrated clamping device 1328 can be replaced with a device that rotates the nut to axially force the nut toward the anvil 526. For example, the outer wall 538 can be provided with threads that mate with threads of the nut, with the clamping device 1328 configured to rotate the nut.

Figure 18:
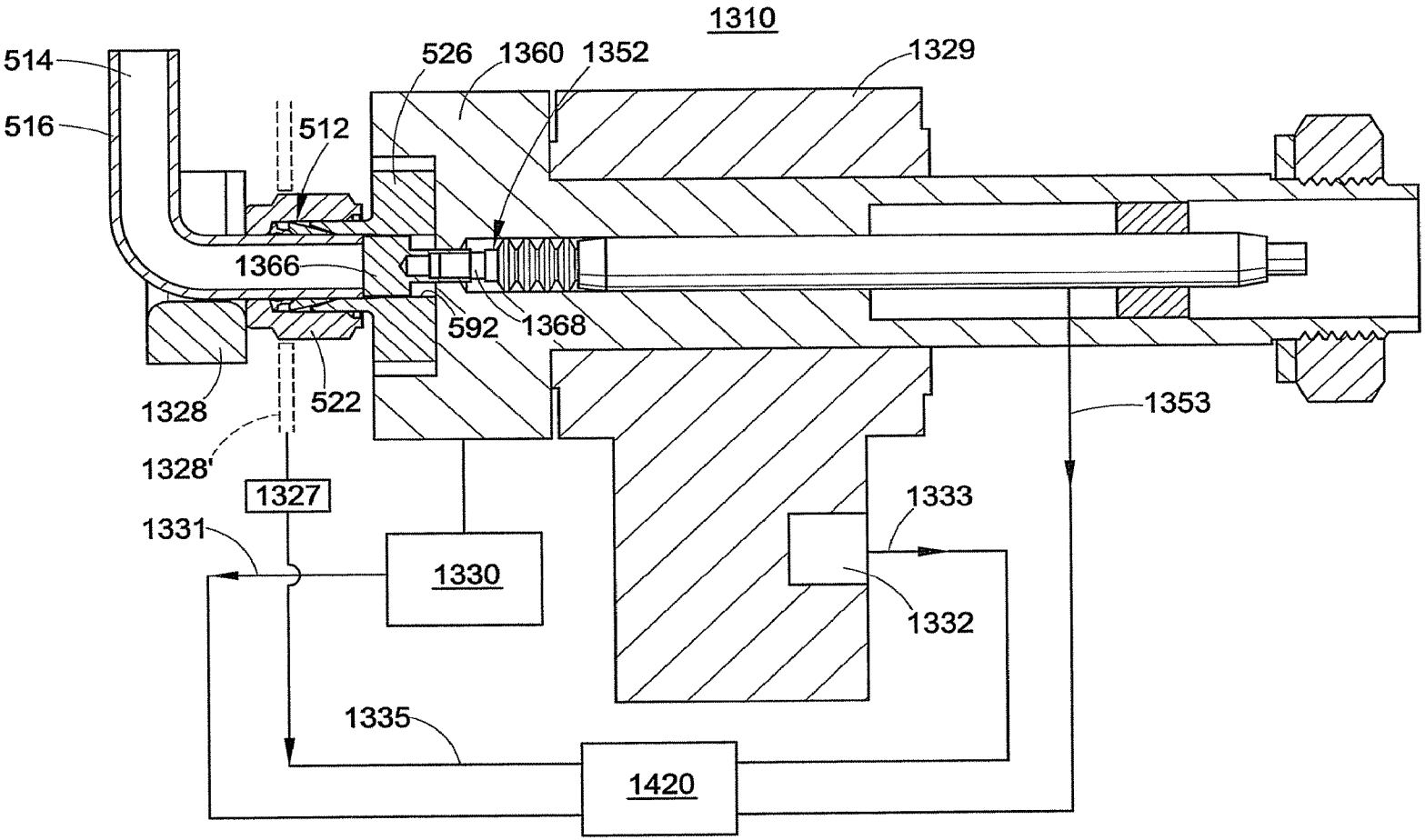
FIG. 18 is a sectioned perspective view of the apparatus as shown in FIG. 17.

Referring to FIG. 18, the clamping device 1328 may include an output 1330 that provides a clamping position output signal 1331. The clamping position output signal is indicative of the position of the fitting nut 522 relative to the anvil 526. In an exemplary embodiment, the clamping position output signal is continuous for a portion of the stroke or for the entire stroke of the clamping device 1328.

The load cell 1329 is configured to measure the load or clamping force applied by the clamping device 1328. Referring to FIG. 18, the load cell may include an output 1332 that provides a clamping force output signal 1333 that is indicative of the clamping force applied by the clamping device 1328. In another embodiment, the clamping device, when configured to rotate the nut (see ref. no. 1328' in FIG. 18 and FIG. 22) is configured to measure the torque applied to the nut. For example, a sensor 1327 (FIG. 18) may be included to measure the torque applied between the nut 522 and the anvil 526. Such a torque sensor 1327 may take a wide variety of different forms. This torque measurement may take the place of the clamping force measurement, or the torque measurement may be done in addition to the clamping force measurement. The torque measurement may also be communicated by an output signal 1335. In an exemplary embodiment, the clamping force output signal and/or torque output signal are continuous for a portion of the stroke or for the entire stroke of the clamping device 1328. In another embodiment, the clamping force output signal and/or the torque output signal may comprise one or more discrete outputs at different time intervals, displacements and/or torque values. The clamping force output signal 1333 and/or the torque output signal 1335 may be associated with the clamping position output signal 1331. This association allows the monitored clamping force and/or torque to be compared to an expected clamping force and/or torque along the stroke of the clamping device.

By continuously monitoring the nut position relative to the anvil and the clamping force and/or clamping torque at each position of the nut with respect to the anvil, a variety of condition(s) of the nut 522, conduit gripping device 512, and/or the anvil 526 can be determined. Prior to the clamping of the pre-installation operation or at the beginning of the clamping operation, proper fitting component quantity, type, orientation, and position can be detected, and the condition of the anvil can be detected. This may be achieved by applying a small portion of the clamping force and/or clamping torque with the clamping device 1328 and checking for errors before the full clamping force and/or clamping torque that would typically permanently deform one or more of the components is applied. This test can be used to determine whether the clamping operation will start at the correct position. For example, a clamping force and/or clamping torque that is lower than expected at the expected beginning of the stroke of the clamping device may indicate that one or more components (a conduit gripping device component for example) of the conduit gripping device is missing (See FIG. 1C for example) or is the wrong type of component or may indicate that the anvil is worn. This expected beginning of the stroke may be determined, because the total axial length of the components of the conduit gripping device, assembled in the correct order, in the correct orientation is known (See FIG. 1A for example). The detection of a clamping force and/or clamping torque before the expected beginning position may indicate that too many components are present, the wrong type of components are present, the orientation of one or more components is incorrect, or the position of one or more components is incorrect (See FIGS. 1D-1G for example).

Each conduit gripping device and conduit combination will have an expected displacement vs. force (or torque) curve for the stroke of the clamping device 1328. The actual displacement vs. force (or torque) for each clamping operation may be monitored to determine whether there is a potential problem with the conduit gripping device or the anvil. Further, each incorrect assembly will also have an expected displacement vs. force (or torque) curve. In one embodiment, when a potential problem is detected, for example, by detecting a deviation from the expected displacement vs. force (or torque) curve, the apparatus 1310 compares the measured displacement vs. force (or torque) with displacement vs. force (or torque) curves of known incorrect assemblies to identify the type of incorrect assembly.

The apparatus illustrated by FIGS. 17-20 also includes a continuous conduit end position sensor 1352 positioned to continuously sense a position of the end 532 of the conduit 514 relative to the anvil 526. The continuous conduit end position sensor 1352 may comprise, for example, a linear variable differential transformer. Referring to FIG. 18, the continuous conduit end position sensor 1352 provides a conduit position output 1353 that is indicative of the position of the end 532 of the conduit in the anvil 526. In one exemplary embodiment, the apparatus 1310 is configured to provide an alert or prevent operation of the clamping device 1328 if the conduit is not in a proper predetermined position in the anvil. For example, the alert may be provided or operation of the clamping device 1328 may be prevented if the conduit end 532 is outside the tapered conduit bottoming surface 536.

Figure 17:
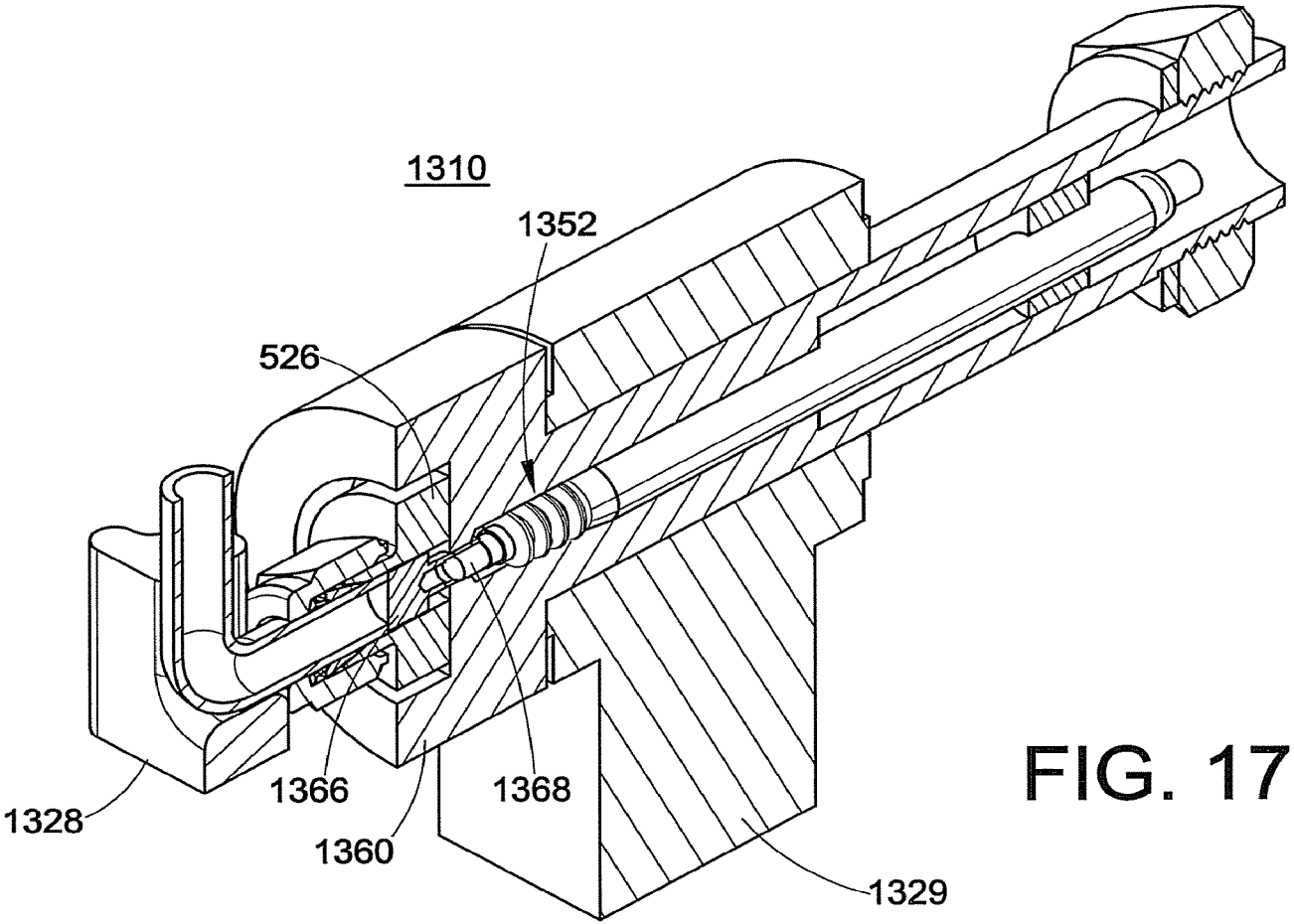
FIG. 17 is a cross-sectional view of a conduit gripping device disposed around a conduit in an apparatus for installing conduit gripping devices on conduits of a second exemplary embodiment.
Figure 17A:
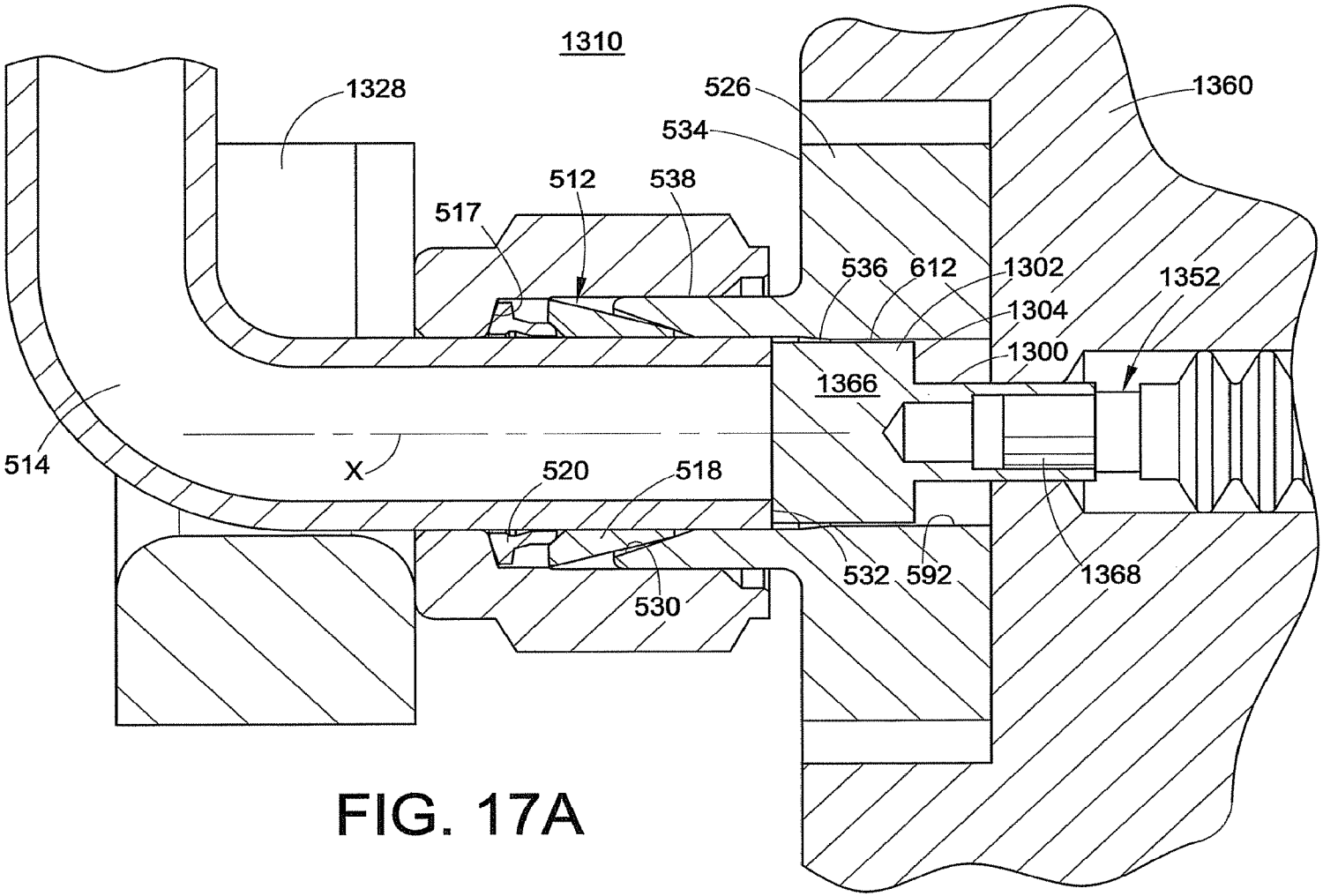
FIG. 17A is an enlarged portion of FIG. 17.

In the example illustrated by FIGS. 17-20, the conduit end position sensor 1352 is disposed in a base 1360 of the clamping device 1328. A conduit end engagement member 1366 is connected to a shaft 1368 of the conduit end position sensor 1352. The conduit end engagement member 1366 is disposed in the bore 592 of the anvil 526 (see FIG. 17A). The conduit engagement member 1366 includes a stepped outer surface having a first cylindrical portion 1300 and a second cylindrical portion 1302 that is diametrically larger than the first portion to define an optional annular stop shoulder 1304 or step therebetween.

Figure 19:
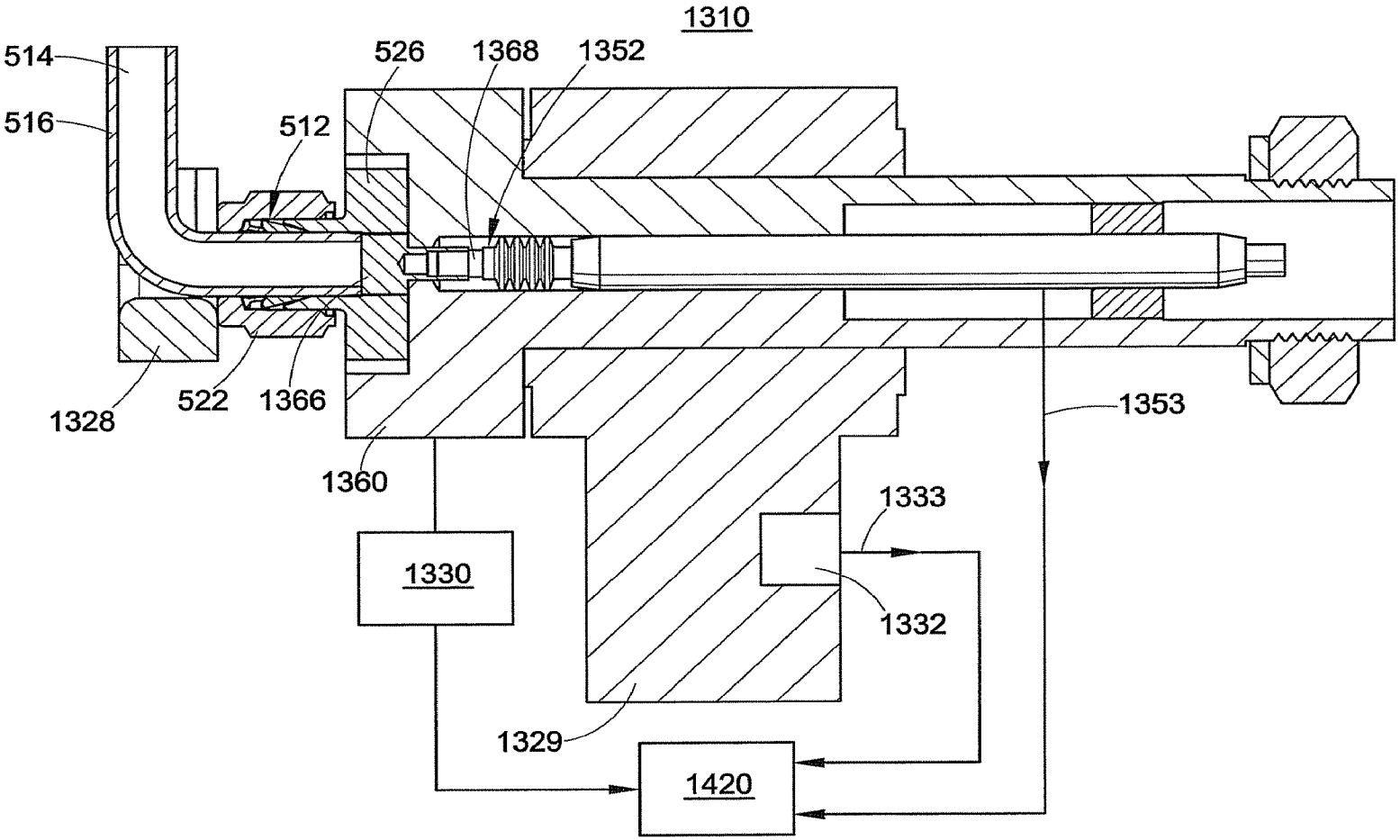
FIG. 19 is a cross-sectional view of the apparatus of FIG. 17 with the conduit in a bottomed position in an anvil of the apparatus.
Figure 19A:
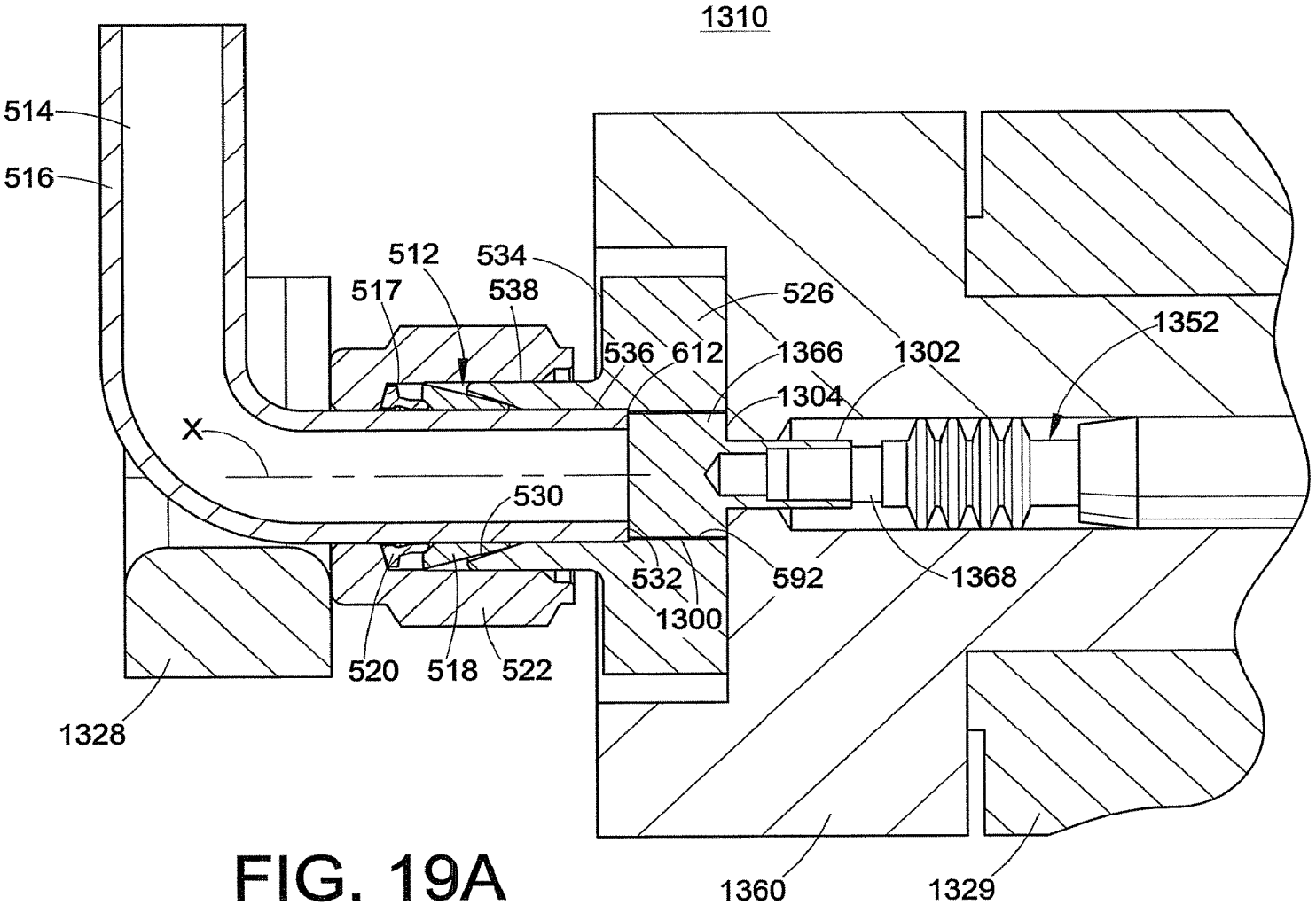
FIG. 19A is an enlarged portion of FIG. 17.
Figure 20:
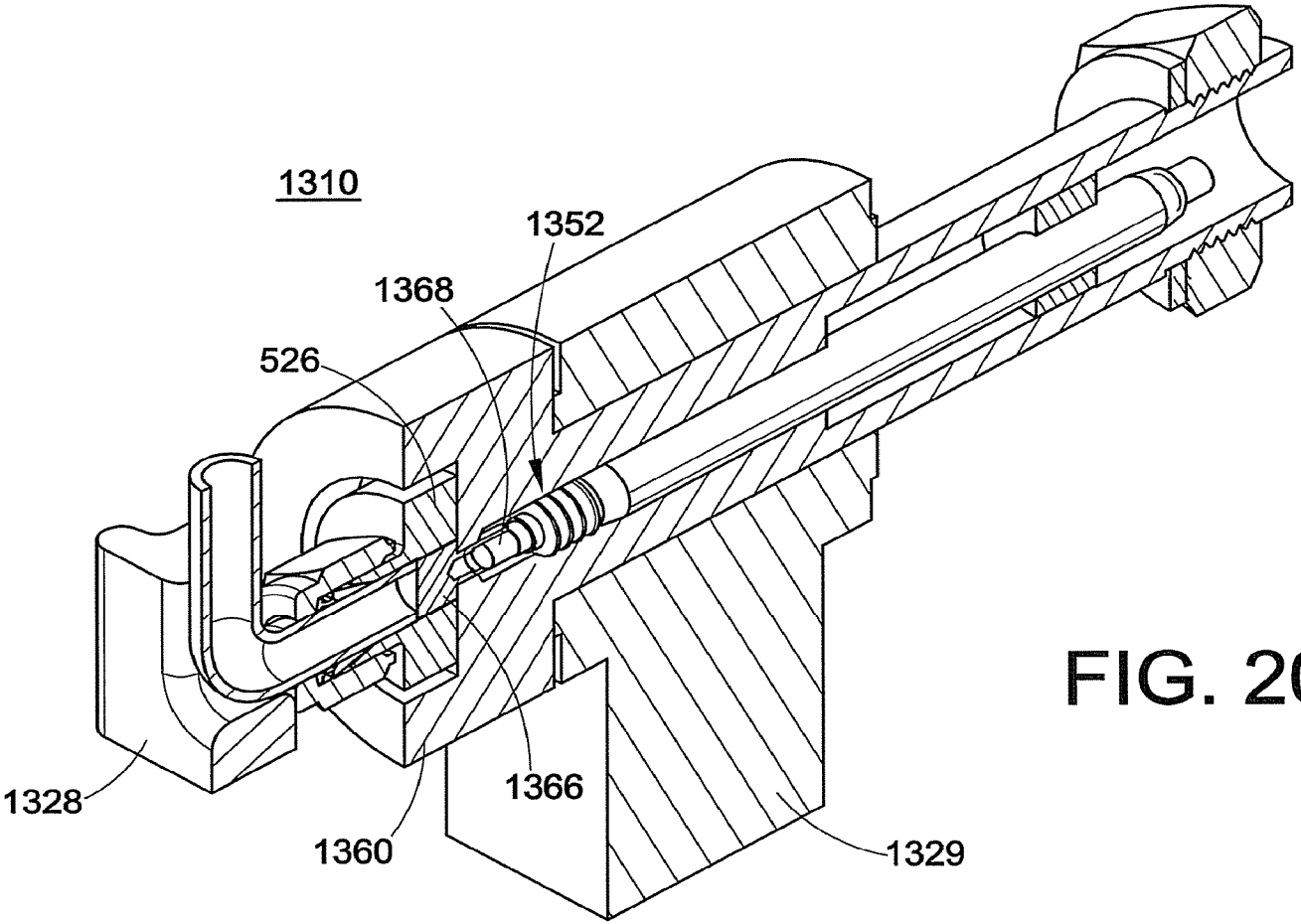
FIG. 20 is a sectioned perspective view of the apparatus as shown in FIG. 19.

Referring to FIG. 19A the conduit end 532 may be moved into the tapered conduit bottoming surface 536 until the conduit end reaches the end 612 of the tapered conduit bottoming surface (unless the tapered surface 536 prevents further insertion first). When the conduit end reaches the end 612 of the tapered conduit bottoming surface 536, the optional annular stop shoulder 1304 engages the block 60 to prevent further axial advancement of the conduit end 532.

Referring to FIG. 18, in one exemplary embodiment, an output device 1420 is in communication with one or more of the nut position output 1330 of the clamping device, the load cell 1329, the torque sensor 1327, and the conduit end position sensor 1352. In one exemplary embodiment, the output device 1420 comprises a processor or other logic applying device. The output device may use the nut position signal, clamping force signal and/or torque signal, and conduit end position signal in a wide variety of different ways. Proper insertion of the conduit can be determined before or during the clamping of the pre-installation operation, proper component quantity, type, and orientation can be determined before or during the clamping of the pre-installation operation, the condition of the anvil 526 can be determined before or during the clamping of the pre-installation operation, and sufficient nut stroke in the clamping of the pre-installation operation can be determined. The output device 1420 may count each instance of clamping of the pre-installation operation and may measure and record the extent of conduit insertion and/or nut stroke with each clamping. The output device 1420 can send an alert or block the progress or completion of a clamping of a pre-installation operation if the conduit insertion is insufficient or if the nut stroke is incomplete. By applying a slight load and/or torque before the clamping of the pre-installation operation, the output device 1420 can determine a starting position where clamping force and/or torque is first applied to verify proper component quantity, type, orientation, and position. The starting position can also be used to detect wear of the anvil. If the sensed starting position is incorrect, the output device 1420 may send an alert and/or stop or block the progress of the clamping of the pre-installation operation. Additional signals and sensors may provide input to the output device 1420. For example, the apparatus 1310 may include additional sensors that monitor conditions of the conduit gripping device, such as the position of the conduit gripping device on the conduit, the depth of the grip on the conduit, an amount of strain in a portion of the conduit gripping device and/or conduit, and a maximum strain of the conduit gripping device and/or conduit.

Figure 22:
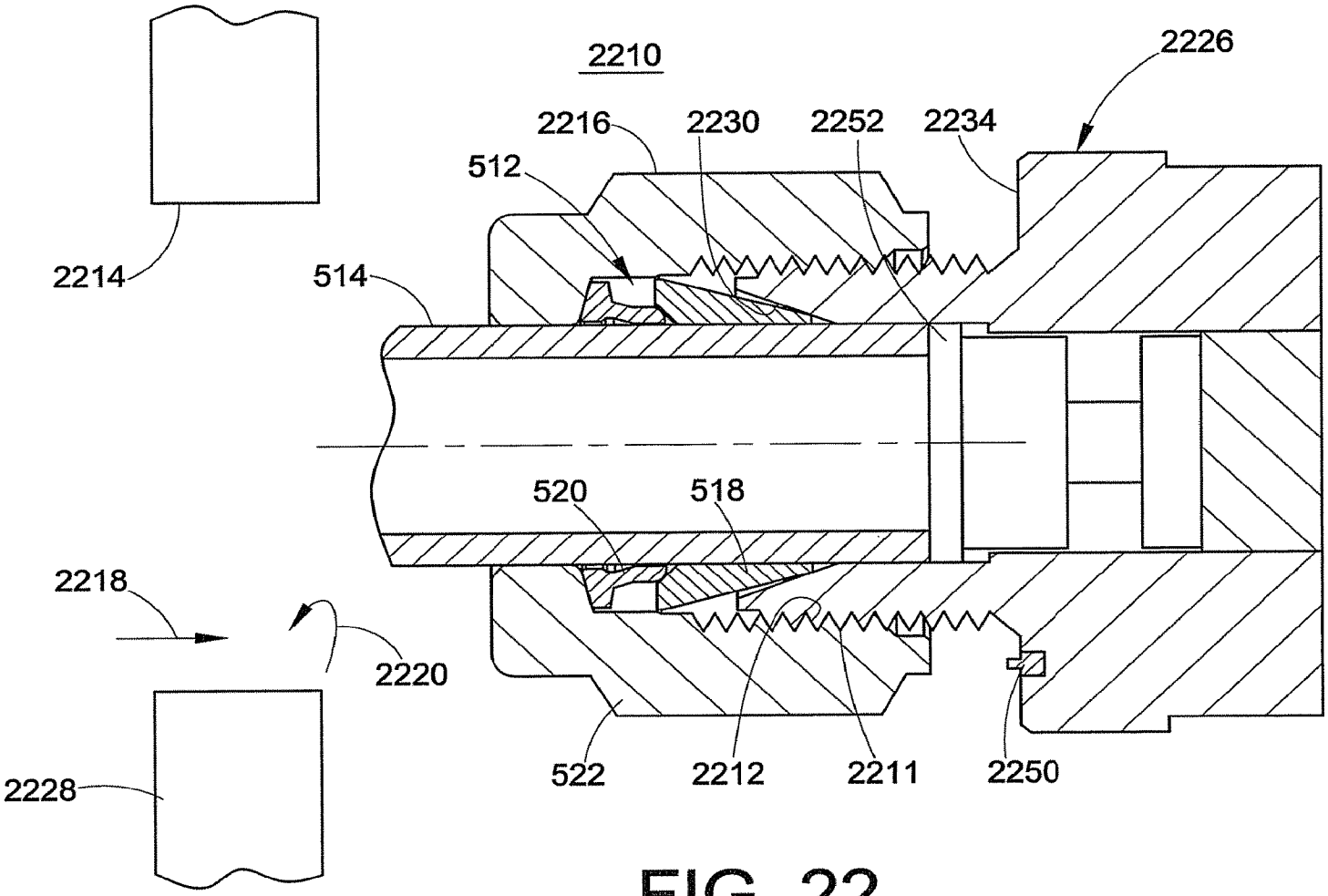
FIG. 22 is a cross-sectional view of a conduit gripping device disposed around a conduit in an apparatus for installing conduit gripping devices on conduits of another exemplary embodiment.

FIG. 22 illustrates an embodiment of an apparatus 2210 where the anvil 2226 includes threads 2211 that mate with the threads 2212 of the nut when the clamping device 2228 is a mechanism that rotates the fitting nut 22. When the anvil 2226 includes threads 2211, the clamping device 2228 may be a hand operated wrench or a powered wrench. The wrench may be any device that has a nut engaging surface or surfaces 2214 that are configured to engage and rotate a driven surface 2216 of the nut 22 as is well known in the art. In FIG. 22, arrow 2218 indicates that the wrench may be placed on the nut and arrow 2220 indicates that the wrench may be rotated to axially advance the nut 22. The wrench may include a handle, or may be a device, such as a socket that is rotated by a powered shaft. The wrench may be a torque wrench that rotates the fitting nut 22 onto the anvil 2226 until a predetermined torque required to further turn and axially advance the nut is reached. When the predetermined torque is reached, the torque wrench automatically stops turning the nut. The anvil may be configured to sharply increase the torque required to turn the nut when the nut has reached a predetermined stroke. For example, the anvil may have the positive stop surface 2234 as illustrated or the anvil may be otherwise configured to provide a torque rise when the predetermined stroke is reached.

In one exemplary embodiment, the torque wrench may be set to the same torque that is used when the conduit gripping device 512 and fitting nut 522 are pulled up with a fitting body. This use of the same torque for the preassembly and the final assembly may be accomplished with an anvil that has a positive stop surface or that is otherwise configured to provide a torque rise. Referring to FIG. 23C, the torque collar 2340 and the nut 522 are designed to produce a distinct torque value T1 due to the increasing load between the nut 522 and the torque collar 2340 that corresponds to a desired or needed axial displacement or stroke of the nut 522 relative to the body to effect proper pull-up. This occurs at a position P2 for the fitting 2310 in the complete pulled up position. The torque required to compress a conduit gripping device, such as the ferrules 518, 520, to the pulled up position P2 may vary significantly from fitting to fitting. In one exemplary embodiment, the torque collar 2340 is configured to provide a torque value T1 that is equal to or greater than a maximum expected torque required to compress the conduit gripping device, such as the ferrules 518, 520, and axially advance the fitting nut 522 to the pulled up position P2. This assures that the application of the torque T1 to the fitting 2310 will axially advance the nut 522 all the way to the position P2 where the nut engages the torque collar 2340. The torque collar 2340 engages the nut 522 while the predetermined torque T1 is applied to set the amount of compression of the conduit gripping device 512 to correspond to position P2.

Referring to FIGS. 22 and 23C, the axial advance or stroke of the nut during the preassembly process is less than the axial advance required to properly pull-up the fitting. For example, in FIG. 23C position P1 may represent a position when the fitting 2310 is in a finger-tight position after the preassembly process. At position P1, the conduit gripping device 512 is compressed by an amount that causes the conduit gripping device to grip onto the conduit. Position P2 is the pulled-up position. At the complete pulled up position P2, the conduit gripping device 512 is compressed by an amount that causes the conduit gripping device to grip and seal the conduit. The amount of compression of the conduit gripping device at the position P2 is greater than the amount of compression at the position P1. As a result, when the anvil has a positive stop surface 2234 that corresponds to the position P1, application of the predetermined torque T1 required to pull up the fitting to position P2 is sufficient to bring the nut into engagement with the positive stop surface 2234. Thus, the positive stop 2234 engages the nut 522 while the torque T1 is applied between the anvil 2226 and the nut 522 to set the amount of compression of the conduit gripping device 512. This assumes that the anvil 2226 has a configuration that is substantially the same as the fitting body 2312. For example, the camming mouth 2230 and threads 2211 of the anvil 2226 have substantially the same configuration (i.e. size, shape, coefficient of friction, etc.) as the camming mouth 2330 and threads of the fitting body 2312. When the torque T1 required to pull up the fitting 2310 to the pulled up position P2 is sufficient to bring the nut 522 on the anvil 2226 into engagement with the positive stop surface 2234, the same predetermined torque T1 can be used to preassemble the conduit gripping device and nut on the conduit and pull-up the fitting. This provides a number of advantages. For example, the same tool or type of tool with the same torque setting can be used for both the preassembly operation and pull-up of the fitting.

Also, as is described above, the torque collar 2340 may allow the fitting 2310 to be initially pulled up and remade multiple times to the same torque value. That is, after the fitting is pulled up at the position P2, the fitting can be disassembled, such that the nut 522 is separated from the body 2312 and then reassembled. In this embodiment, reapplication of the same torque T1 further axially advances the nut 522 with respect to the fitting body to the position P3. At the remake position P3, the conduit gripping device 512 is compressed by an amount that causes the conduit gripping device to grip and reseal the conduit. The amount of compression for the conduit gripping device 512 is greater at the remake position P3 than at the pull up position P2. The torque collar 2340 engages the nut 522 while the predetermined torque T1 is applied to set the amount of compression of the conduit gripping device 512 to correspond to position P3. In one exemplary embodiment, the same torque value is selected for preassembling the fitting, initial pull-up of the fitting, and one or more remakes of the fitting. This aspect has tremendous advantages for low cost implementation in that assemblers need only have a single torque wrench or other tool to preassemble the conduit gripping device and nut on the conduit, pull up the fitting, and remake the fitting.

After the fitting nut 22 reaches the predetermined stroke with respect to the anvil 2226, the wrench turns the nut in the opposite direction to remove the nut 522 from the anvil

2226, to allow the preassembly of the nut 22, conduit gripping device 512, and conduit 514 to be removed. The anvil 2226 can be used with or without the nut position sensor 2250 and/or the conduit end position sensor 2252. When included, the nut position sensor 2250 may provide an indication of the position of the nut 22 relative to the anvil 2226 and/or the conduit end position sensor 2252 may provide an indication of the position of the conduit end relative to the anvil 2226. When included, the nut position sensor 2250 and/or conduit end position sensor 2252 can be any of the nut position sensors or conduit end position sensors described in this application or any other sensors capable of detecting the position of the nut 522 relative to the anvil 2226 or the position of the conduit 514 relative to the anvil.

Figure 21:
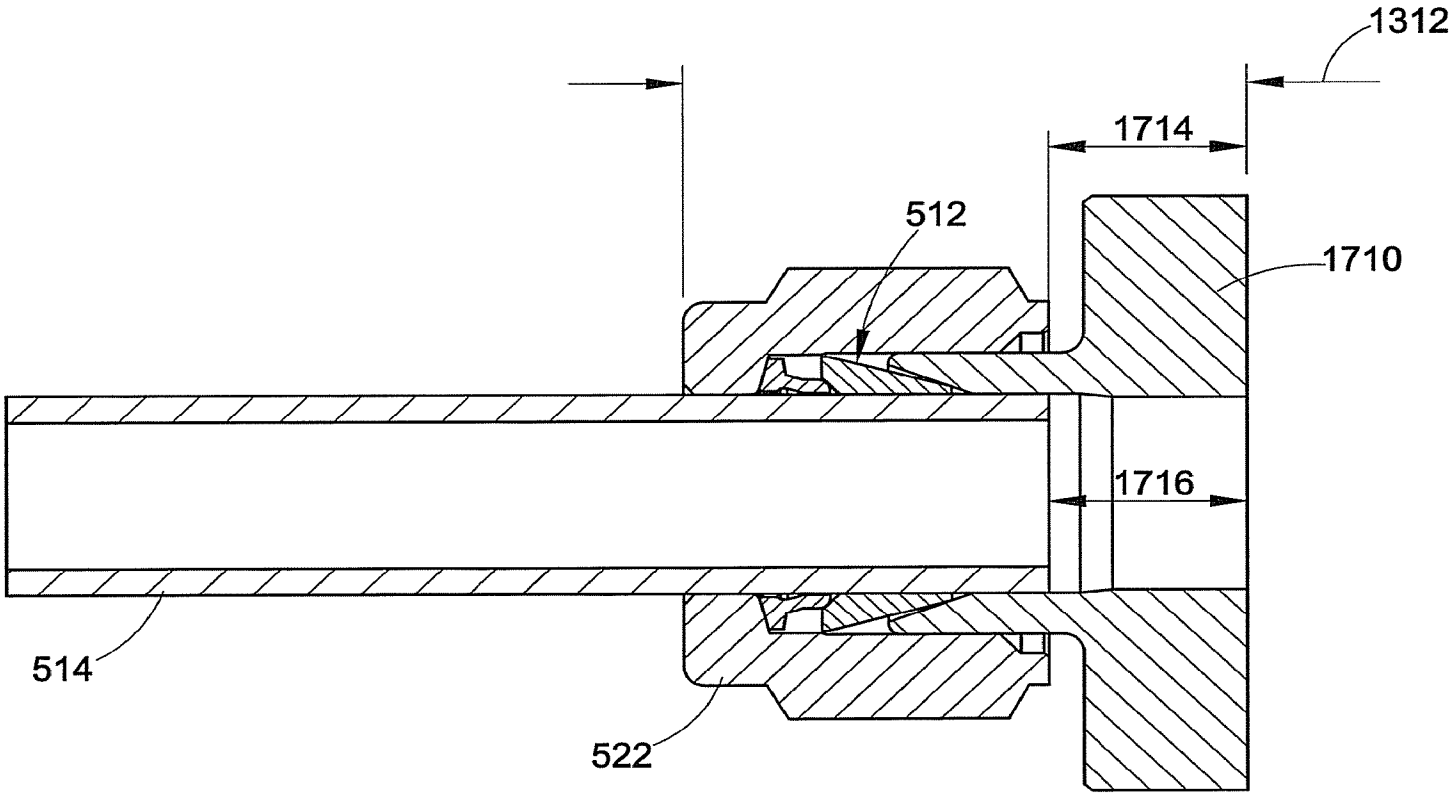
FIG. 21 is an illustration of a pre-installed fitting pre-assembly in a gauge.

Referring to FIG. 21, in one exemplary embodiment gauging of the nut 522, conduit gripping device 512, and conduit 514 is performed to ensure that the nut 522 and the conduit gripping device is properly pre-installed at the desired axial location on the conduit 514. The gauging is performed by assembling the pre-assembly (conduit 514, nut 522, and gripping device 512) in a gauging tool 1710. The gauging tool 1710 may be the anvil 526 of apparatus 510 or 1310 or the gauging tool may be a separate tool. A predetermined clamping force as indicated by arrows 1312 is applied to the nut 522 and the tool 1710 and the position of the nut 522 relative to the tool 1710 is measured, for example as indicated at 1714, and/or the position of the conduit end 532 relative to the tool is measured, for example as indicated at 1716. The clamping force 1312 is a force that is smaller than the force required to further compress the conduit gripping device 512 onto the conduit 514. For example, the clamping force may be 100 lbs. The gauging illustrated by FIG. 21 may be performed after the pre-assembly is removed from the apparatus 510 or apparatus 1310 or the apparatus 510 or the apparatus 1310 may be operated to perform the gauging after the pre-installation operation, but before the pre-assembly is removed.

The invention has been described with reference to the preferred embodiments. Modifications and alterations will occur to others upon a reading and understanding of this specification. It is intended to include all such modifications and alterations insofar as they come within the scope of the appended claims or the equivalents thereof.

The invention claimed is:

1. Apparatus for manually pre-installing a conduit gripping device of a fitting onto a conduit, the apparatus comprising:

a threaded tool comprising a camming surface, said [male] threaded tool being threadably joinable with a threaded nut having a drive surface, the conduit gripping device being positionable between said camming surface and the threaded nut drive surface when said threaded tool is joined with the [female] threaded nut, and

[a] *at least one* sensor that produces, in response to being actuated by one of the threaded nut and the threaded tool, an output that indicates when the threaded nut and the threaded tool have reached a predetermined [relative torque] *preinstallation position*, said *at least one* sensor being actuated by said one of said threaded nut and said threaded tool to produce said sensor output when a nut rotating mechanism is manually operated to axially advance said threaded nut relative to said threaded tool to said predetermined [relative torque] *preinstallation position* after said threaded tool is joined with said threaded nut.

2. The apparatus of claim 1, wherein the threaded tool comprises a male threaded tool threadably joinable with a female threaded nut.

3. The apparatus of claim 1, wherein the *at least one* sensor produces the output in response to resistance to threaded advancement of the nut, corresponding to [the] *a* predetermined relative torque *indicative of the predetermined preinstallation position*.

4. The apparatus of claim 1 wherein said predetermined [relative torque] *preinstallation position* corresponds with a predetermined relative axial stroke of the drive surface with respect to the camming surface, sufficient to cause the conduit gripping device to grip the conduit, said predetermined relative axial stroke being less than a full relative axial stroke when the pre-installed conduit gripping device is subsequently pulled-up with a complete fitting.

5. The apparatus of claim 4 wherein said threaded nut contacts a positive stop surface of said threaded tool at said predetermined relative axial stroke.

6. The apparatus of claim 5 wherein the *predetermined preinstallation position corresponds with a* predetermined relative torque [results] *resulting* from engagement between said threaded nut and said positive stop surface.

7. The apparatus of claim 1 wherein said *at least one* sensor comprises a torque sensor.

8. The apparatus of claim 7 *wherein the apparatus further comprises the nut rotating mechanism,* wherein the torque sensor is integrated with the nut rotating mechanism.

9. The apparatus of claim 1 *wherein the apparatus further comprises the nut rotating mechanism,* wherein said nut rotating mechanism comprises one of a hand operated wrench, a hand operated torque wrench, and a powered wrench.

10. The apparatus of claim 1 wherein said *at least one* sensor comprises at least one of the following: a switch, proximity sensor, hall effect sensor, inductive sensor, binary state sensor, linear variable displacement transducer, *strain sensor,* and analog sensor.

11. The apparatus of claim 1 wherein the threaded nut is retained on the conduit with the conduit gripping device after said threaded nut and said threaded tool are advanced to said predetermined relative torque.

12. Apparatus for manually pre-installing a conduit gripping device of a fitting onto a conduit, the apparatus comprising:

a threaded tool comprising a camming surface *and a conduit receiving bore*, said threaded tool being manually joinable with a threaded nut having a drive surface, the *camming surface being tapered to radially compress the conduit gripping device when the* conduit gripping device [being positionable] *is positioned* between said camming surface and the threaded nut drive surface [when] *and* said threaded tool is joined with *and axially advanced relative to* the threaded nut, and

[a] *at least one* sensor [that produces] *including a conduit end engagement member disposed in the conduit receiving bore and configured to produce*, in response to being actuated by the end of the conduit, an output that indicates when said camming surface and said end of the conduit have reached a predetermined relative axial position[, said sensor being actuated by said end of the conduit to produce said sensor output after said male threaded tool is joined with said female threaded nut].

13. The apparatus of claim 12, wherein the threaded tool comprises a male threaded tool threadably joinable with a female threaded nut.

14. The apparatus of claim 12, wherein the *at least one* sensor produces the output in response to contact with the end of the conduit.

15. The apparatus of claim 12 wherein *the apparatus further comprises a nut rotating mechanism, wherein* said nut rotating mechanism comprises one of a hand operated wrench, a hand operated torque wrench, and a powered wrench.

16. The apparatus of claim 12 wherein said *at least one* sensor comprises at least one of the following: a switch, proximity sensor, hall effect sensor, inductive sensor, binary state sensor, linear variable displacement transducer, *strain sensor,* and analog sensor.

17. The apparatus of claim 12 wherein the predetermined relative axial position corresponds to a bottomed condition of the conduit end in the threaded tool.

18. The apparatus of claim 12 wherein the *at least one* sensor is biased to permit axial advance of the conduit end beyond the predetermined relative axial position.

19. Apparatus for manually pre-installing a conduit gripping device of a fitting onto a conduit, the apparatus comprising:

a threaded tool comprising a camming surface, said threaded tool being manually joinable with a threaded nut having a drive surface, the conduit gripping device being positionable between said camming surface and the threaded nut drive surface when said threaded tool is joined with the threaded nut, and one or more sensors that produce, in response to being actuated by at least one of the threaded nut and the threaded tool, an output related to an assembly condition of the conduit gripping device positioned between said camming surface and said drive surface, said one or more sensors producing said output when a nut rotating mechanism is manually operated to axially advance said camming surface relative to said drive surface to a relative axial position after said [male] threaded tool is joined with said [female] threaded nut.

20. The apparatus of claim 19, wherein said sensor output identifies when at least one component of the conduit gripping device is installed in an improper orientation between said camming surface and said drive surface.

21. The apparatus of claim 19, wherein said sensor output identifies when at least one component of the conduit gripping device is missing from between said camming surface and said drive surface.

22. The apparatus of claim 19, wherein the relative axial position corresponds to engagement of a first portion of the conduit gripping device with the drive surface and engagement of a second portion of the conduit gripping device with the camming surface.

23. The apparatus of claim 19, wherein the threaded tool comprises a male threaded tool threadably joinable with a female threaded nut.

24. The apparatus of claim 19, wherein the one or more sensors produces the output in response to contact with at least one of the threaded nut and the threaded tool.

25. The apparatus of claim 19 wherein *the apparatus further comprises the nut rotating mechanism, wherein* said nut rotating mechanism comprises one of a hand operated wrench, a hand operated torque wrench, and a powered wrench.

26. The apparatus of claim 19 wherein said one or more sensors comprises at least one of the following: a switch, proximity sensor, hall effect sensor, inductive sensor, binary state sensor, linear variable displacement transducer, *strain sensor,* and analog sensor.

*27. The apparatus of claim 1, further comprising an output device in communication with the at least one sensor, the output device being configured to wirelessly transmit a sensor signal corresponding to the sensor output.*

*28. The apparatus of claim 27, wherein the output device is configured to wirelessly transmit the sensor signal.*

*29. Apparatus for manually pre-installing a conduit gripping device of a fitting onto a conduit, the apparatus comprising:*

*a threaded tool comprising a camming surface, said threaded tool being threadably joinable with a threaded nut having a drive surface, the conduit gripping device being positionable between said camming surface and the threaded nut drive surface when said threaded tool is joined with the threaded nut, and*

*a spring-loaded gauging mechanism that provides an indication when the threaded nut and the threaded tool have reached a predetermined preinstallation position, said gauging mechanism being actuated by said one of said threaded nut and said threaded tool when a nut rotating mechanism is manually operated to axially advance said threaded nut relative to said threaded tool to said predetermined preinstallation position after said threaded tool is joined with said threaded nut;*

*wherein the spring-loaded gauging mechanism comprises one of a spring-loaded mechanical gauge and a spring-loaded electrical sensor switch.*

* * * * *